(12) United States Patent
Uranaka et al.

(10) Patent No.: US 6,421,536 B1
(45) Date of Patent: Jul. 16, 2002

(54) COMMUNICATION SYSTEM

(75) Inventors: Hiroshi Uranaka; Noritoshi Ogasawara, both of Tokyo; Kenji Takagi, Kanagawa; Hidenori Ishii, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/287,684

(22) Filed: Apr. 7, 1999

(30) Foreign Application Priority Data

Apr. 7, 1998 (JP) .......................... 10-094310
Dec. 9, 1998 (JP) .......................... 10-350084

(51) Int. Cl.$^7$ .............................. H04Q 7/20
(52) U.S. Cl. .................. 455/417; 455/414; 455/426; 379/211.02
(58) Field of Search ................... 455/422, 426, 455/417, 445, 414; 379/211.02

(56) References Cited

U.S. PATENT DOCUMENTS

| 5,054,051 A | | 10/1991 | Hoff |
| 5,239,521 A | | 8/1993 | Blonder |
| 5,712,903 A | * | 1/1998 | Bartholomew et al. ....... 379/89 |
| 5,742,670 A | * | 4/1998 | Bennett ....................... 379/142 |
| 5,757,904 A | | 5/1998 | Anderson |
| 5,812,953 A | * | 9/1998 | Griffith et al. ............... 455/550 |
| 6,055,430 A | * | 4/2000 | Cooper et al. ............... 455/445 |
| 6,157,648 A | * | 12/2000 | Voit et al. ................... 370/401 |
| 6,205,139 B1 | * | 3/2001 | Voit ............................ 370/389 |
| 6,215,790 B1 | * | 4/2001 | Voit et al. ................... 370/401 |
| 6,285,750 B1 | * | 9/2001 | Brachman et al. ...... 379/211.02 |

FOREIGN PATENT DOCUMENTS

| JP | 588079 | 11/1993 |
| JP | 6-113000 | 4/1994 |
| JP | 9-224093 | 8/1997 |

* cited by examiner

Primary Examiner—Edward F. Urban
Assistant Examiner—Marceau Milord
(74) Attorney, Agent, or Firm—Ratner & Prestia

(57) ABSTRACT

A communication system includes an exchange, one or a plurality of telephones connected to the exchange via a telephone circuit network, and one or a plurality of computers connected to the exchange at least via the telephone circuit network. Among those telephones and computers, a first telephone is correlated with a first computer. The first telephone sends the first computer a first call reception state report indicating a call reception state of the first telephone via a first route. When receiving the first call reception state report, the first computer sends the exchange a prescribed telephone circuit control instruction for a call directed to the first telephone. When receiving the prescribed telephone circuit control instruction, the exchange performs a telephone circuit control for the call directed to the first telephone according to the prescribed telephone circuit control instruction.

44 Claims, 56 Drawing Sheets

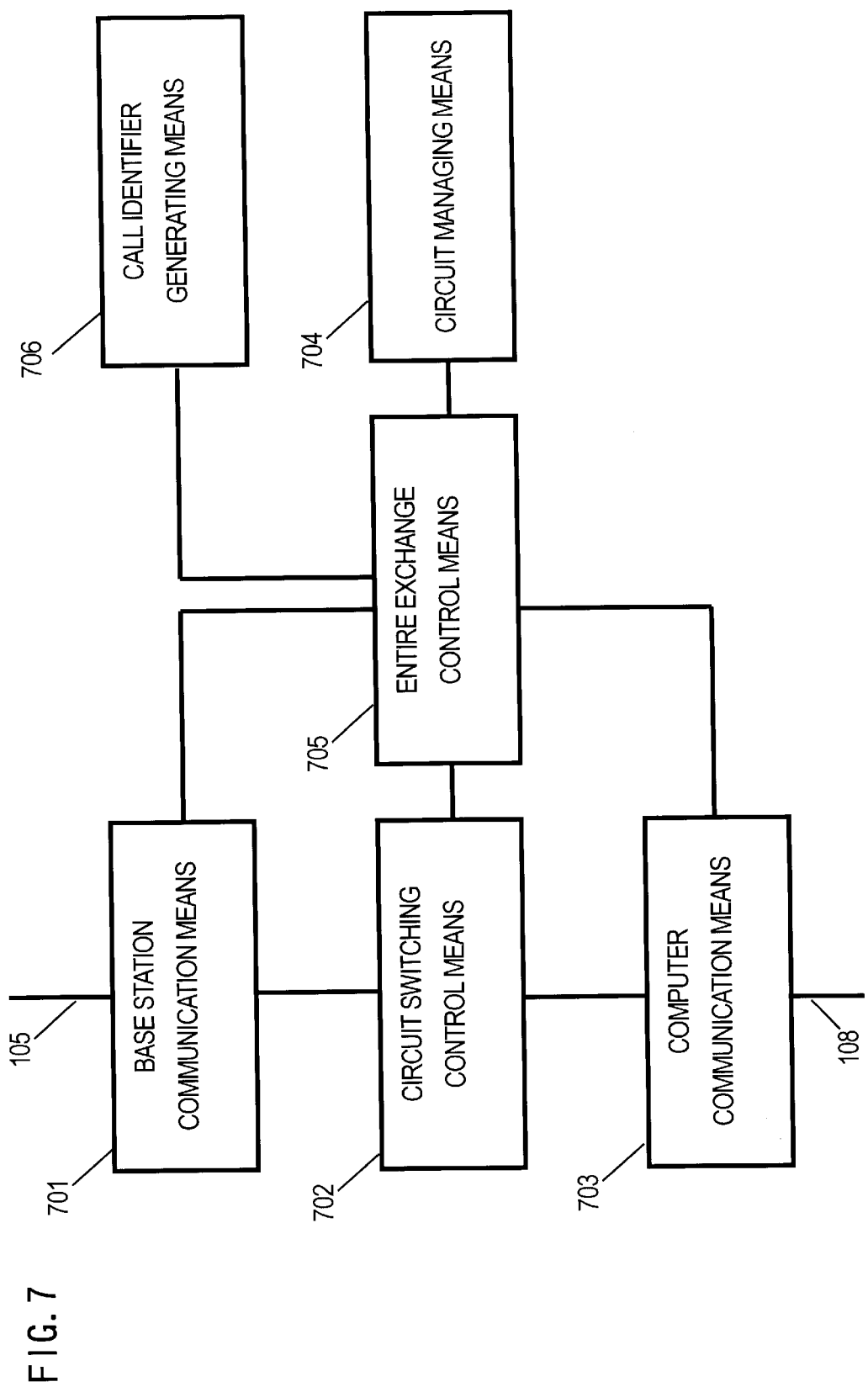

FIG. 8A

CALL RECEPTION STATE REPORT 502

- 801: CALL RECEPTION STATE REPORT IDENTIFIER
- 802: CELLULAR TELEPHONE TELEPHONE NUMBER
- 803: ADDITIONAL INFORMATION
- 808: CALL IDENTIFIER

FIG. 8B

RECEPTION CALL CONVERSION REQUEST 503

- 804: RECEPTION CALL CONVERSION REQUEST IDENTIFIER
- 805: CELLULAR TELEPHONE TELEPHONE NUMBER
- 806: COMPUTER ADDRESS
- 807: ADDITIONAL INFORMATION
- 809: CALL IDENTIFIER

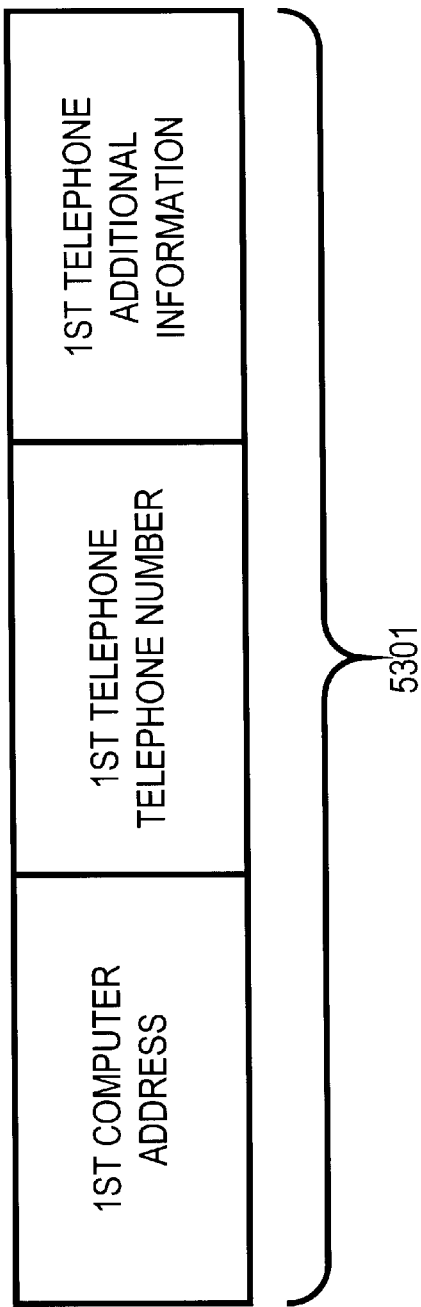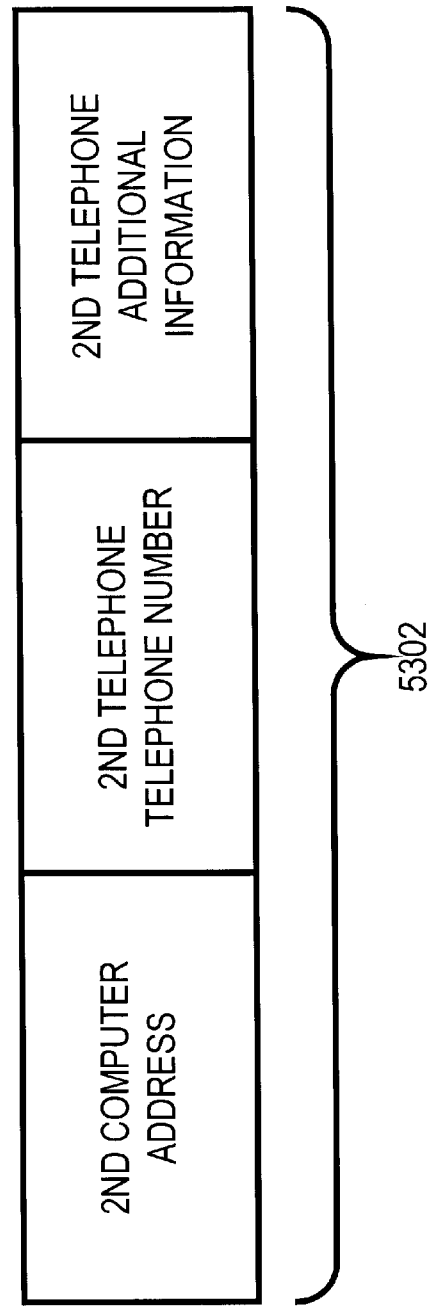
FIG. 45A
FIG. 45B

COMMUNICATION SYSTEM

BACKGROUND OF THE INVENTION

1. Field of the Invention

The present invention relates to a communication system including an exchange and one or a plurality of telephones and one or a plurality of computers that are connected to the exchange by a telephone circuit network.

2. Description of the Related Art

In recent years, because of the development of computers and computer networks, the CTI (Computer Telephony Integration) technology that unites a telephone network and a computer network has made a great advance.

For example, the CSTA (Computer Supported Telecommunications Application) of ECMA (European Computer Manufacturers Association) is a well-known example of the CTI technology. The CSTA is provisions corresponding to the application layer of an OSI (open systems interconnection) reference model between a telephone network and a computer network.

On the other hand, in recent years, because of the spread of cellular telephones and other factors, the radio communications technology has also made great progress. As for the radio communications, not only the voice communication technology but also the data communication technology has advanced. And the technology to provide an easy-to-use environment to a user at an arbitrary location as also advanced. An example of the technology to provide an easy-to-use environment to a user is an exchange system that utilizes a scheme in which a user can respond to a call with a nearby extension telephone by utilizing a cordless paging-only child machine (refer to Japanese Unexamined UM Publication No. Hei. 5-88079, for example).

This conventional exchange system will be described below with reference to FIG. 54, which is a block diagram showing its configuration.

As shown in FIG. 54, a base station 3302 is connected to an exchange 3301. A paging-only child machine 3303 performs a radio communication with the base station 3302, and is capable of making a communication by faint radio waves. An extension telephone 3304 is connected to the exchange 3301 and communicates with the paging-only child machine 3303 by faint radio waves.

Reference numeral 3305 denotes a communication channel between the exchange 3301 and the base station 3302. Reference numeral 3306 denotes a radio communication channel between the base station 3302 and the paging-only child machine 3303. Reference numeral 3307 denotes a communication channel by faint radio waves between the paging-only child machine 3303 and the extension telephone 3304. Reference numeral 3308 denotes a communication channel between the exchange 3301 and the extension telephone 3304.

The operation of the above conventional exchange system will be described below.

In the conventional exchange system, when a call arrives at the paging-only child machine 3303, a call-responsive signal is sent from the paging-only child machine 3303 to the extension telephone 3304 via the communication channel 3307 by faint radio waves. The extension telephone 3304 sends a transfer request to the exchange 3301 in accordance with the received call-responsive signal.

The exchange 3301 performs a control of converting the call to the paging-only child machine 3303 to a call to the extension telephone 3304 in accordance with the transfer request.

However, in the above exchange system based on the conventional radio communications technology, a simple process is executed in which the extension telephone 3304 is informed of call reception by the paging-only child machine 3303 and then sends a transfer request to the exchange 3301. The exchange system executes only telephone-related processes and no means are provided that enables a communication between the exchange 3301 and a computer. There are problems that it is impossible to cause a computer to display the telephone number of a caller, and that it is impossible to cause a computer, rather than the extension telephone 3304, to respond to a call. In particular, at present, because of the spread of various kinds of communication other than voice communication, such as data communication and image communication, a technique that allows a computer to respond to a call received by a cellular telephone is necessary. It is problematic that no means for allowing a communication between an exchange and a computer is available in the prior art.

The conventional CTI technology has a problem that the correspondence between telephones and computers are predetermined and no consideration is given to a scheme in which the user of a cellular telephone controls the cellular telephone from an arbitrary computer. That is, no combination of conventional techniques enables the user of a cellular telephone to have an arbitrary computer display the telephone number of a caller or have it respond to a call.

With the advancement of the CTI technology, a technique of performing a communication control between computers in accordance with a circuit switching state rather than simply controlling circuit switching by a computer, as exemplified by the technical concept disclosed in Japanese Unexamined Patent Publication No. Hei. 8-321889. This publication describes a method of setting a shared working space in doing a voice communication by telephone to perform cooperative work by using computers.

The above conventional communication system will be described below with reference to FIG. 55, which is a block diagram showing its configuration.

In FIG. 55, reference numeral 6201 denotes a wide area network; 6202, a local area network; 6203, a first server; 6204, a first router; 6205, a first computer; 6206, an exchange; and 6207, a first telephone connected to the exchange 6206. Reference numeral 6208 denotes a local area network; 6209, a second server; 6210, a second router; 6211, a second computer; and 6212, a second telephone. That is, the conventional communication system is configured in such a manner that the computers, the servers, and the routers are connected to the local area networks and the routers allow the computers and the servers to communicate with each other via the wide area network.

The operation of the above conventional communication system will be described with reference to FIG. 56.

In the conventional communication system, at step 6301, when receiving a request for connecting the first telephone 6207 and the second telephone 6212, the exchange 6206 connects the first telephone 6207 and the second telephone 6212 to each other.

Then, at step 6302, the exchange 6206 informs the first server 6203 that it has connected the first telephone 6207 and the second telephone 6212 to each other.

The first server 6203 holds a corresponding relationship between the telephones and the computers. Therefore, upon reception of the notice of the connection between the first telephone 6207 and the second telephone 6212 from the exchange 6206, at step 6303 the first server 6203 associates the first telephone 6207 and the second telephone 6212 with the addresses of the corresponding computers.

Then, at step 6304, the first server 6203 executes a process of starting a session between the first computer 6205 and the second computer 6211. As a result, a shared working space for cooperative work of the users of the first telephone 6207 and the second telephone 6212 is provided on the screens of the first computer 6205 and the second computer 6211.

However, in the conventional communication system disclosed in the publication No. Hei. 8-321889, since a server starts a session between computers, the load on the server increases as the number of sessions increases. Further, since a server starts a session, to add a new function, for example, a function of enabling an image communication between computers, it is necessary to add a new sever function. This means a problem that the system extendability is low.

Further, in the technical concept of the publication No. Hei. 8-321889, a session between computers is started merely based on call control information sent from an exchange. For example, this publication does not refer to a computer-to-computer communication control scheme to be employed in a case where the start timing of a communication between computers is irrelevant to a telephone call control, for example, in a case where the user of a computer determines the start of a communication between computers after a connection is established between telephones. In addition to the function that the user can start, of his own free will, a communication between computers after establishment of a voice communication, the function that when a trouble occurs in a communication between computers, a communication between those. computers can be restarted automatically if a telephone connection is established is very important in computer networks that are generally less reliable than telephone networks. That is, there is a problem that the function of merely starting a session between computers based on call control information sent from an exchange is insufficient for computer-to-computer communication controls.

SUMMARY OF THE INVENTION

In view of the above problems in the art, an object of the present invention is to provide a communication system using a cellular telephone which enables an arbitrary computer to respond to a call or display information relating to a received call and which enables not only voice communication but also data communication and image communication.

Another object of the invention is to provide a communication system in which the server load is decreased because a session between computers is started by those computers, it is not necessary to add a new server function in adding a new function such as a function of enabling an image communication, and a session between computers can be established with no link to a telephone call control.

The invention provides a communication system comprising an exchange; N telephones connected to the exchange via a telephone circuit network, where N is an integer; and M computers connected to the exchange at least via the telephone circuit network, where M is an integer, wherein a first telephone that is one of the N telephones is correlated with a first computer that is one of the M computers; the first telephone sends the first computer a first call reception state report indicating a call reception state of the first telephone via a first route; the first computer, when receiving the first call reception state report, sends the exchange a prescribed telephone circuit control instruction for a call directed to the first telephone; and the exchange, when receiving the prescribed telephone circuit control instruction, performs a telephone circuit control for the call directed to the first telephone according to the prescribed telephone circuit control instruction.

The prescribed telephone circuit control instruction may be a reception call conversion request for requesting conversion of the call directed to the first telephone to a call to the first computer.

The communication system may be configured in such a manner that the first telephone comprises telephone faint radio wave communication means for performing a communication by faint radio waves, that the first computer comprises computer faint radio wave communication means for performing a communication by faint radio waves, and that the first route is formed by the telephone faint radio wave communication means and the computer faint radio wave communication means.

The first telephone may be a cellular telephone that is connected to the telephone circuit network by a radio communication.

The cellular telephone may comprise a main body having a cellular telephone user interface for performing display, and a wrist band for mounting the main body on a wrist, the wrist band being mounted with cellular telephone faint radio wave communication means for communicating with the first computer by faint radio waves. The cellular telephone faint radio wave communication means may be located on the side of the palm of a hand when the wrist band of the cellular telephone is mounted around the wrist like a wrist watch. The telephone faint radio wave communication means may be provided in a handset of the fixed telephone.

The communication system may be configured as follows. A second telephone that is one of the N telephones and different from the first telephone is correlated with a second computer that is one of the M computers and different from the first computer; and the exchange sends out a first circuit state report relating to circuit switching between the first telephone and the second telephone. The communication system further comprises circuit state reporting means for receiving the first circuit state report, and for sending the first computer a second circuit state report formed by adding an address of the second computer to the first circuit state report; and a data communication network for enabling a data communication at least between the first computer and the second computer among the M computers. The first computer starts, when receiving the second circuit state report, a data communication with the second computer via the data communication network by using the address of the second computer that is accommodated in the second circuit state report.

The communication system may be configured as follows. There exist a third telephone that is one of the N telephones and different from the first telephone and a third computer that is one of the M computers and different from the first computer; the third computer sends the exchange a state report request that accommodates a telephone number of the third telephone; and the exchange sends out, when receiving the state report request, a third circuit state report for the first telephone and the third telephone in a state that the first telephone and the third telephone are in a circuit-connected state. The communication system further comprises circuit state reporting means for receiving the third circuit state report, and for sending the third computer a fourth circuit state report formed by adding an address of the first computer to the third circuit state report; and a data communication network for enabling a data communication at least between the first and third computers among the M computers. The third computer starts, when receiving the fourth circuit state report, a data communication with the first computer via the data communication network by using the address of the first computer that is accommodated in the fourth circuit state report. A typical operation mode is such that a voice communication is performed between the first telephone and third telephone while a video communication is performed between the first computer and third computer.

The communication system may be configured in such a manner that the third computer comprises a telephone faint radio wave communication means for performing a communication by faint radio waves, that the third computer comprises a computer faint radio wave communication means for performing a communication by faint radio waves, and that the third telephone informs the third computer of the telephone number of the third telephone via a route formed by the telephone faint radio wave communication means and the computer faint radio wave communication means.

The communication system may be configured as follows. The communication system further comprises an office apparatus having an office apparatus faint radio wave communication means for performing a communication by faint radio waves. There exist a fourth telephone that is one of the N telephones and different from the first telephone and a fourth computer that is one of the M computers and different from the first computer; the fourth telephone comprises a telephone faint radio wave communication means for performing a communication by faint radio waves; the office apparatus performs an information data communication with the fourth telephone via a route formed by the telephone faint radio wave communication means and the office apparatus faint radio wave communication means; and the fourth telephone performs an information data communication with the fourth computer, whereby an information data communication is performed between the office apparatus and the fourth computer.

BRIEF DESCRIPTION OF THE DRAWINGS

FIG. 7 is a block diagram showing a configuration of an exchange in a communication system according to a second embodiment of the invention;

FIGS. 8A and 8B are format diagrams of a call reception state report and a reception call conversion request, respectively, used in the communication system according to the second embodiment;

FIGS. 45A and 45B are format diagrams of information managed by a monitoring information managing means of a state notification apparatus in the communication system according to the 10th embodiment;

DETAILED DESCRIPTION OF THE PREFERRED EMBODIMENTS

Embodiments of the present invention will be hereinafter described with reference to the accompanying drawings.

Embodiment 1

A communication system according to a first embodiment of the invention will be described below.

First, the configuration of the communication system according to the first embodiment will be described with reference to FIG. 1, which is a block diagram showing its example configuration.

Figure 1:
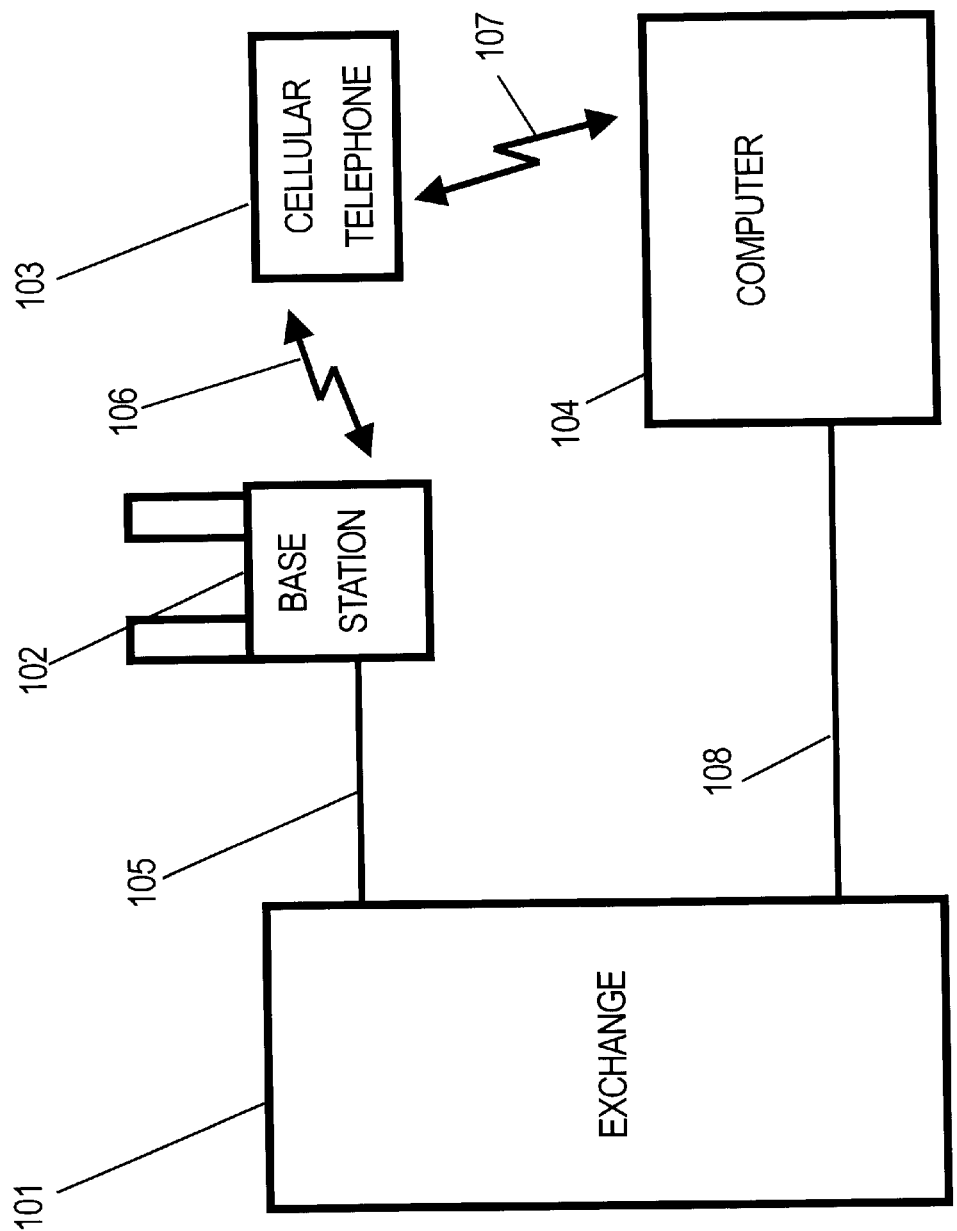
FIG. 1 is a block diagram showing a configuration of a communication system according to a first embodiment of the present invention.

As shown in FIG. 1, a base station 102 is connected to an exchange 101. A cellular telephone 103 performs a radio communication with the base station 102, and is capable of making a communication by faint radio waves. A computer 104 is connected to the exchange 101 and communicates with the cellular telephone 103 by faint radio waves.

Reference numeral 105 denotes a communication channel between the exchange 101 and the base station 102. Reference numeral 106 denotes a communication channel between the base station 102 and the cellular telephone 103. Reference numeral 107 denotes a communication channel by faint radio waves between the cellular telephone 103 and the computer 104. Examples of communication by faint radio waves are communication by infrared light and communication by millimeter waves. Reference numeral 108 denotes a communication channel between the exchange 101 and the computer 104. An example of communication using the communication channel 108 is wired network communication of an Ethernet or RS232C. The effects of the invention can still be obtained by radio data communication.

Next, a detailed configuration of the cellular telephone 103 will be described with reference to FIG. 2, which is a block diagram showing its example configuration.

Figure 2:
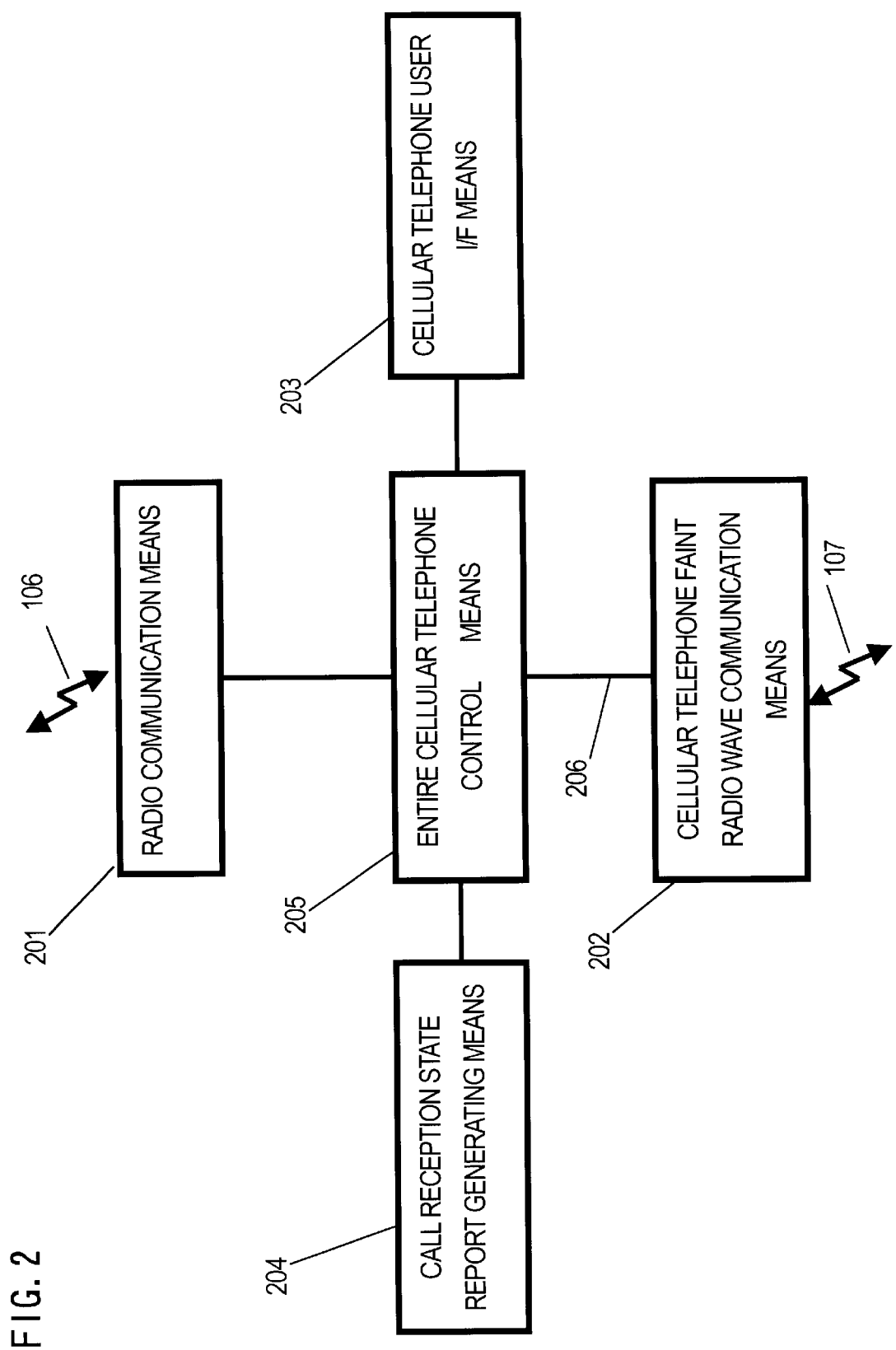
FIG. 2 is a block diagram showing a configuration of a cellular telephone in the communication system of FIG. 1.

In FIG. 2, reference numeral 201 denotes a radio communication means for performing a radio communication with the base station 102. Reference numeral 202 denotes a cellular telephone faint radio wave communication means for communicating with the computer 104 by faint radio waves. Reference numeral 203 denotes a cellular telephone user interface means as a user interface of the cellular telephone 103. Reference numeral 204 denotes a call reception state report generating means for generating a call reception state report indicating that a call has arrived at the cellular telephone 103. Reference numeral 205 denotes an entire cellular telephone control means for controlling the entire cellular telephone 103. Reference numeral 206 denotes a communication channel between the entire cellular telephone control means 205 and the cellular telephone faint radio wave communication means 202.

A detailed configuration of the computer 104 will be described below with reference to FIG. 3, which is a block diagram showing its example configuration.

Figure 3:
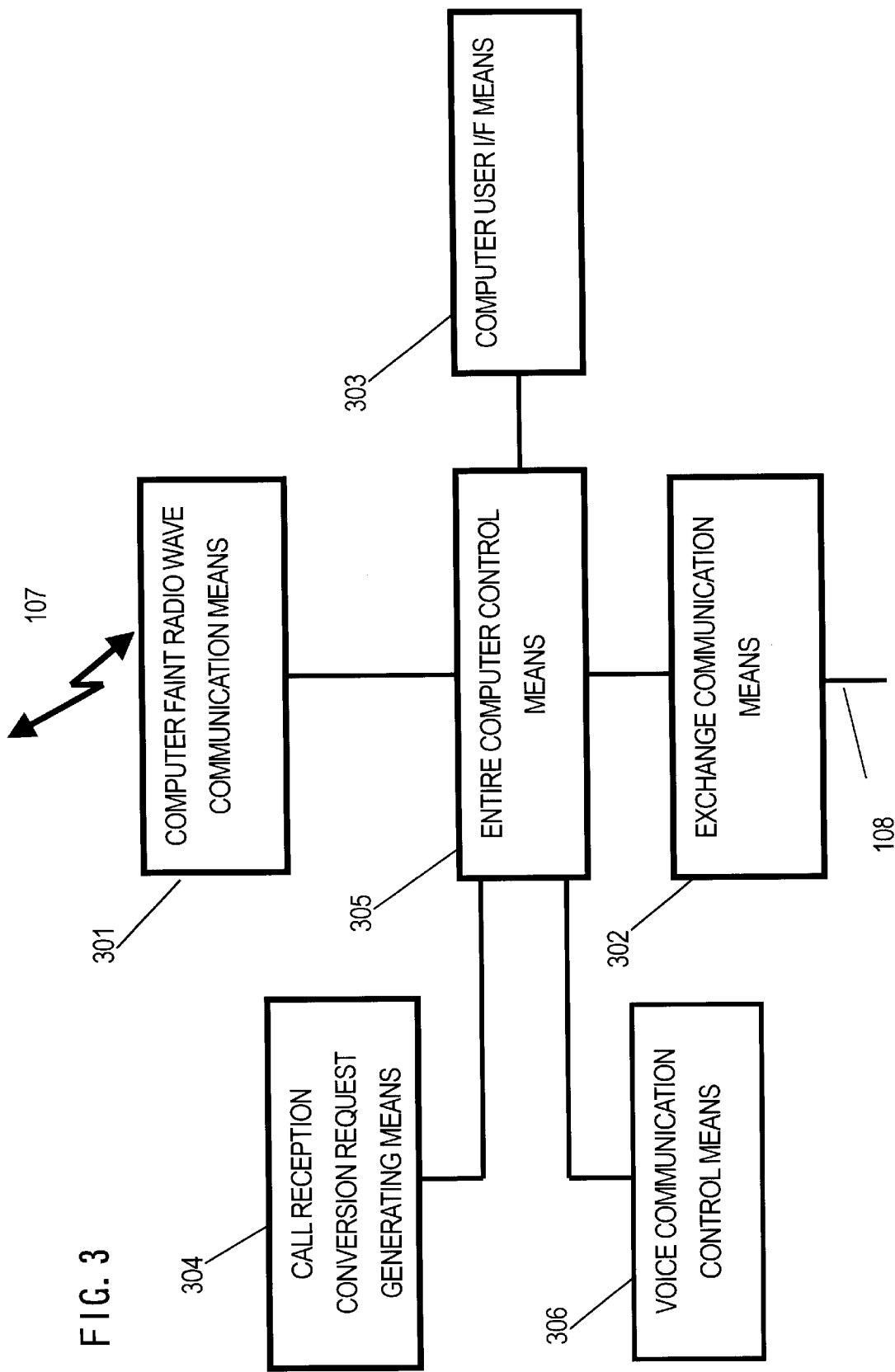
FIG. 3 is a block diagram showing a configuration of a computer in the communication system of FIG. 1.

In FIG. 3, reference numeral 301 denotes a computer faint radio wave communication means for communicating the cellular telephone 103 by faint radio waves. Reference numeral 302 denotes an exchange communication means for communicating with the exchange 101. Reference numeral 303 denotes a computer user interface means as a user interface of the computer 104. Reference numeral 304 denotes a reception call conversion request generating means for generating a request for conversion of a call directed to the cellular telephone 103 to a call to the computer 104. Reference numeral 305 denotes an entire computer control means for controlling the entire computer 104. Reference numeral 306 denotes a voice communication control means.

Further, a detailed configuration of the exchange 101 will be described with reference to FIG. 4, which is a block diagram showing its example configuration.

Figure 4:
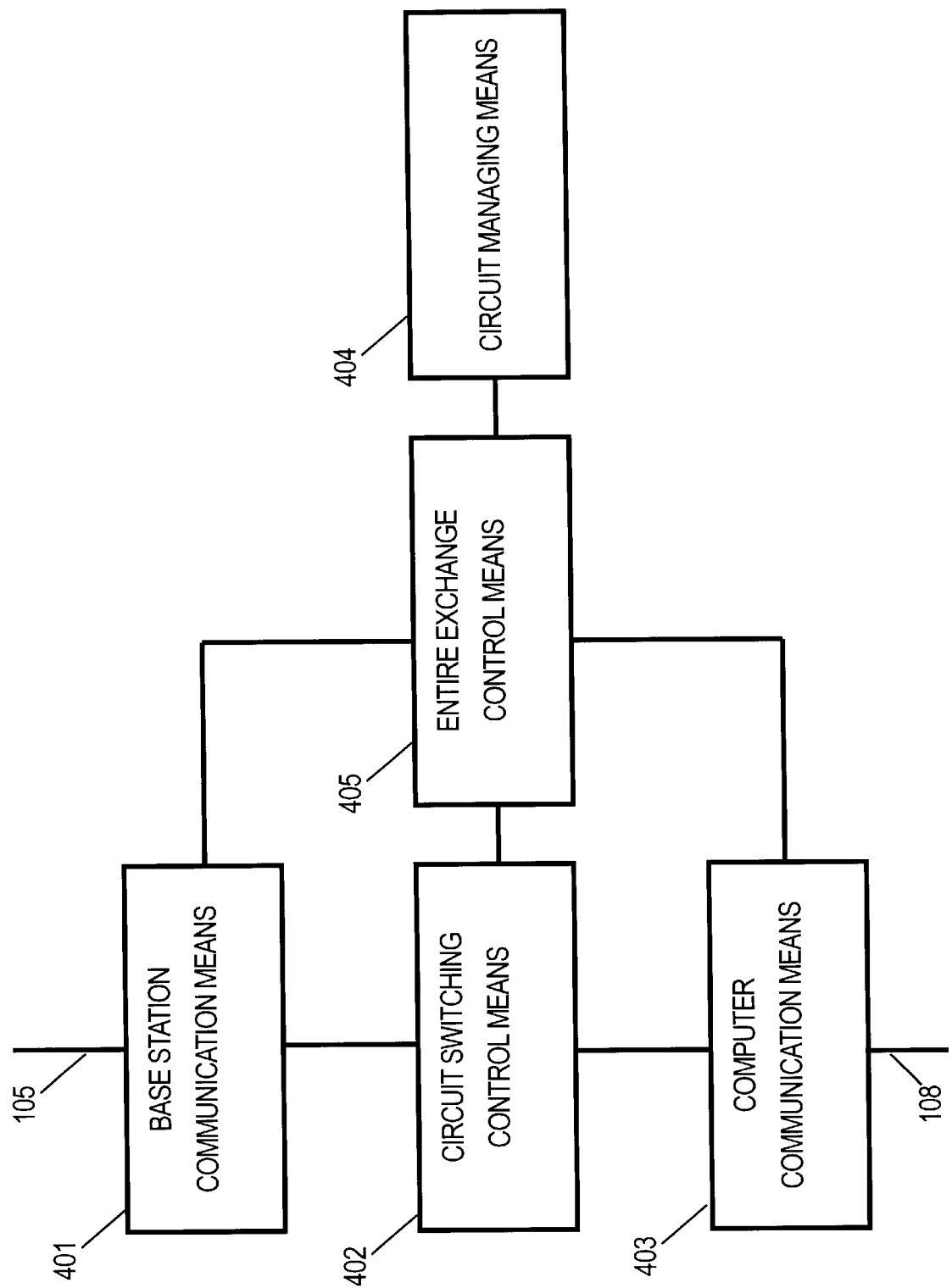
FIG. 4 is a block diagram showing a configuration of an exchange in the communication system of FIG. 1.

In FIG. 4, reference numeral 401 denotes a base station communication means for communicating with the base station 102. Reference numeral 402 denotes a circuit switching control means for performing a circuit switching control of the entire exchange 101. Reference numeral 403 denotes a computer communication means for communicating with the computer 104. Reference numeral 404 denotes- a circuit managing means for managing the states of call destinations and circuits. Reference numeral 405 denotes an entire exchange control means for controlling the entire exchange 101.

Figure 5:
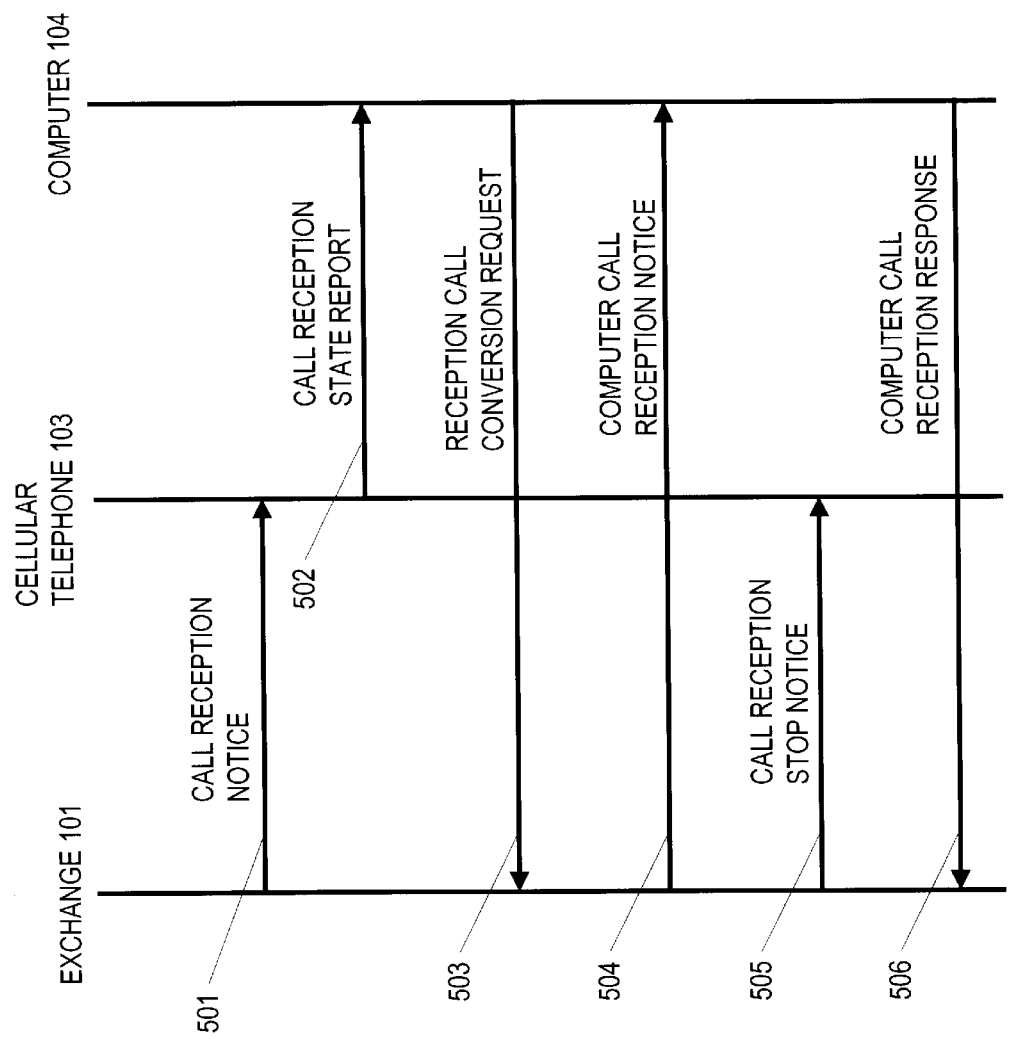
FIG. 5 is a signal diagram showing the operation of the communication system according to the first embodiment.

The operation of the communication system according to the first embodiment will be described below with reference to FIG. 5, which is a signal diagram of the communication system according to the first embodiment. In the following, to facilitate the description, the operation of the communication system will be described with assumptions that the communication channel 108 is an Ethernet and a voice communication between the exchange 101 and the computer 104 is performed by using IP packets.

When receiving a call directed to the cellular telephone 103, the exchange 101 sends a call reception notice 501 to the cellular telephone 103 via the base station 102. To facilitate the description, the base station 102 is omitted in FIG. 5. Actually, the signal 501 is sent from the exchange 101 to the base station 102 via the communication channel 105 and then transmitted from the base station 102 to the cellular telephone 103 via the communication channel 106.

Upon reception of the call reception notice 501, the cellular telephone 103 generates a call reception state report 502 indicating reception of the call reception notice 501 and sends it to the computer 104 via the communication channel 107 by faint radio waves.

Upon reception of the call reception state report 502, the computer 104 generates a reception call conversion request 503 for requesting conversion of a call directed to the cellular telephone 103 to a call to the computer 104 and sends it to the exchange 101 via the communication channel 108.

Upon reception of the reception call conversion request 503, the exchange 101 performs two operations. As the first operation, the exchange 101 converts the call directed to the cellular telephone 103 to a call to the computer 104 and sends a computer call reception notice 504 to the computer 104. Based on the computer call reception notice 504, the computer 104 starts a call reception operation such as making a display or outputting a beep sound.

As the second operation, the exchange 101 sends the cellular telephone 103 a call reception stop notice 505 indicating that the call directed to the cellular telephone 103 has been stopped. Based on the call reception stop notice 505, the cellular telephone 103 performs a call reception stop operation such as stopping a beep sound.

If the user of the computer 104 performs a manipulation to respond to the received call by using the computer user interface means 303 after the reception of the computer call reception notice 504, the computer 104 sends a computer call reception response 506 to t he exchange 101. Thereafter, a voice communication using the computer 104 is possible.

The above operation will be described below in more detail.

First, operations performed by the exchange 101 in sending a call reception notice 501 will be described. In the exchange 101, when detecting a call directed to the cellular telephone 103, the circuit switching control means 402 informs the entire exchange control means 405 of the detection. The entire exchange control means 405 controls the base station communication means 401 to have it send a call reception notice 501 to the cellular telephone 103 via the communication channel 105. Further, the entire exchange control means 405 informs the circuit managing means 404 of the sending of the call reception notice 501 and has it manage the received call. In the first embodiment, to facilitate the description, a description of a telephone that calls the cellular telephone 103 is omitted. It is easily understood that a telephone that calls the cellular telephone 103 may be any kind of telephone as long as it can request the exchange 101 to effect a call to the cellular telephone 103.

Second, operations performed by the cellular telephone 103 after the reception of the call reception notice 501 will be described. The cellular telephone 103 receives the call reception notice 501 with the radio communication means 201 via the communication channel 106. The radio communication means 201 outputs the received call reception notice 501 to the entire cellular telephone control means 205. Based on the received call reception notice 501, the entire cellular telephone control means 205 controls the cellular telephone user interface means 203 to have it output a beep sound, for example, to thereby notify the user of the call reception. At the same time, the entire cellular telephone control means 205 outputs the received call reception notice 501 to the call reception state report generating means 204. Based on the received call reception notice 501, the call reception state report generating means 204 generates a call reception state report 502 indicating that the cellular telephone 103 has been rendered in a call reception state and outputs it to the entire cellular telephone control means 205. The entire cellular telephone control means 205 outputs the received call reception state report 502 to the cellular telephone faint radio wave communication means 202, which then sends the call reception state report 502 to the computer 104 via the communication channel 107.

Third, operations performed by the computer 104 after the reception the call reception state report 502 will be described. In the computer 104, the computer faint radio wave communication means 301 receives the call reception state report 502 via the communication channel 107. The computer faint radio wave communication means 301 outputs the received call reception state report 502 to the entire computer control means 305. The entire computer control means 305 outputs the received call reception state report 502 to the reception call conversion request generating means 304. Based on the received call reception state report 502, the reception call conversion request generating means 304 generates a reception call conversion request 503 for requesting conversion of the call directed to the cellular telephone 103 to a call to the computer 104 and outputs it to the entire computer control means 305. Upon reception of the reception call conversion request 503 from the reception call conversion request generating means 304, the entire computer control means 305 performs two operations. As the first operation, the entire computer control means 305 outputs the received reception call conversion request 503 to the exchange communication means 302, which then sends the reception call conversion request 503 to the exchange 101 via the communication channel 108. As the second operation, the entire computer control means 305 requests the voice communication control means 306 to activate itself. As a result, the voice communication control means 306 is rendered in a state of waiting for input of a computer call reception notice 504 from the exchange 101.

Fourth, operations performed by the exchange 101 after the reception of the reception call conversion request 503 will be described. In the exchange 101, the computer communication means 403 receives the reception call conversion request 503 via the communication channel 108 and outputs it to the entire exchange control means 405. The entire exchange control means 405 collates the received reception call conversion request 503 with the information relating to the call directed to the cellular telephone 103 that is managed by the circuit managing means 404, and converts the call directed to the cellular telephone 103 to a call to the computer 104. Specifically, the entire exchange control means 405 sends a computer call reception notice 504 to the computer 104 via the computer communication means 403 and sends a call reception stop notice 505 to the cellular telephone 103 via the base station communication means 401.

Fifthly, operation performed by the computer 104 after the reception of the computer call reception notice 504 will be described. In the computer 104, the exchange communication means 302 receives the computer call reception notice 504 via the communication channel 108 and outputs it to the entire computer control means 305. The entire computer control means 305 outputs the information received from the exchange 101 to the voice communication control means 306. Based on the received computer call reception notice 504, the voice communication control means 306 requests the entire computer control means 305 to perform a call reception operation. The entire computer control means 305 controls the computer user interface means 303 to have it display the fact that a call has been received, output a beep sound, or perform a like operation.

Among the operations described above in detail, an example of the method for collating a reception call conversion request 503 with information relating to a received call that is managed by the circuit managing means 404 will be described below.

First, example formats of the call reception state report 502 and the reception call conversion request 503 will be described with reference to FIGS. 6A and 6B.

Figure 6A:
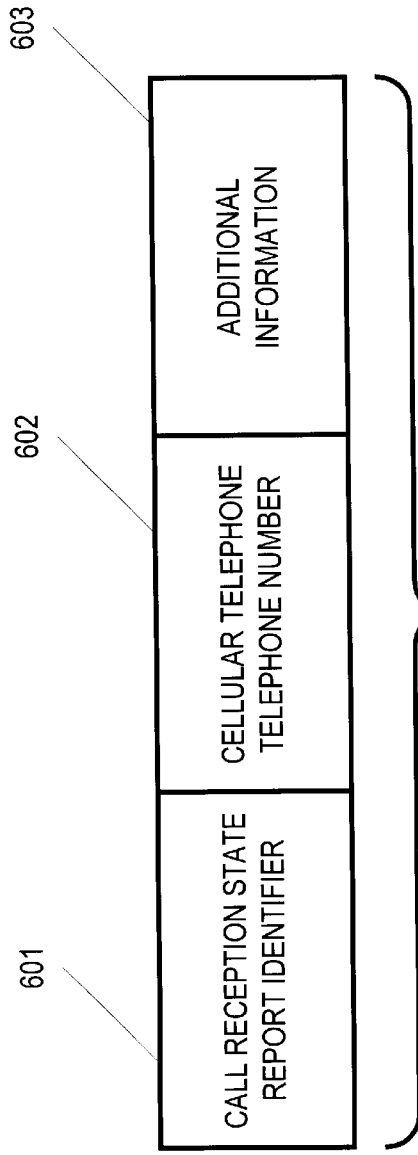
FIGS. 6A and 6B are format diagrams of a call reception state report and a reception call conversion request, respectively, used in the communication system according to the first embodiment.
Figure 6B:
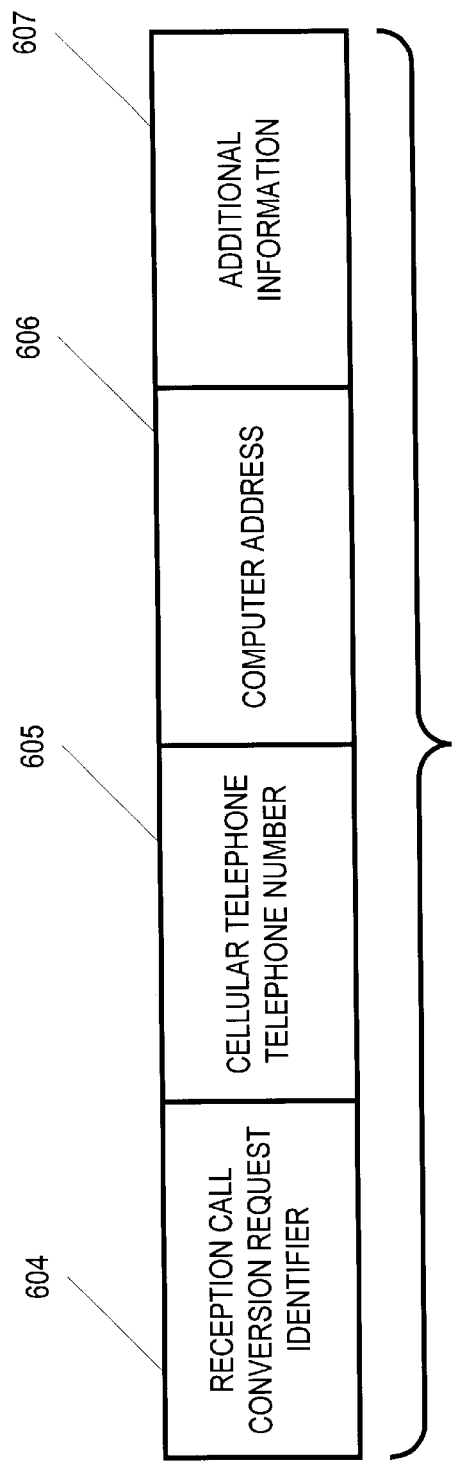

FIGS. 6A and 6B show example formats in which the call reception state report 502 is composed of three fields 601–603 and the reception call conversion request 503 is composed of four fields 604–607.

Field 601 accommodates a call reception state report identifier indicating that the information sent from the cellular telephone 103 to the computer 104 is a call reception state report. Field 602 accommodates the telephone number of the cellular telephone 103. Field 603 accommodates additional information of the call reception state report 502. Examples of additional information to be accommodated in field 603 are calling party number information of the caller who have called the cellular telephone 103, information indicating whether the call directed to the cellular telephone 103 is a voice call or a packet communication call, information indicating the line speed of the circuit of the call directed to the cellular telephone 103, and the address of the exchange 101.

Field 604 accommodates a reception call conversion request identifier indicating that the information sent from the computer 104 to the exchange 101 is a reception call conversion request. Field 605 accommodates the telephone number of the cellular telephone 103 that has sent a call reception state report 502 to the computer 104 by faint radio waves. Actually, the telephone number is one obtained from the value accommodated in field 602 of the received call reception state report 502. Field 606 accommodates the address of the computer 104, an example of which is an IP address. Field 607 accommodates additional information of the reception call conversion request 503. Examples of additional information to be accommodated in field 607 are information indicating whether the call directed to the cellular telephone 103 is a voice call or a packet communication call, and a TCP or UDP port number to be used when the computer 104 and the exchange 101 perform a TCP/IP communication or a UDP/IP communication.

An example of the method for collating a reception call conversion request 503 and information relating to a call directed to the cellular telephone 103 that is managed by the circuit managing means 404 will be described below.

As described above, by causing field 602 of a call reception state report 502 to accommodate the telephone number of the cellular telephone 103, the computer 104 can acquire the telephone number of the cellular telephone 103 that has sent the call reception state report 502. This makes it possible to cause fields 605 and 606 of a reception call conversion request 503 to accommodate the telephone number of the cellular telephone 103 and the address of the computer 104, respectively. Since the exchange 101 manages, with the circuit managing means 404, the information relating to the call directed to the cellular telephone 103, it can be collated with the telephone number of the cellular telephone 103 that is accommodated in field 605 of the reception call conversion request 503. If the two telephone numbers are the same, a communication between the exchange 101 and the computer 104 can be started by using the address of the computer 104 accommodated in field 606.

Items that have not been described above will be described below.

First, an example of operations that are performed after the computer 104 receives a computer call reception notice 504 will be described.

After the computer 104 has received a computer call reception notice 504, if the user of the computer 104 manipulates the computer user interface means 303 to respond to the call, the manipulation information is supplied to the voice communication control means 306 via the entire computer control means 305. The voice communication control means 306 generates a call reception response request for requesting the exchange 101 to respond to the call and outputs it to the entire computer control means 305. The entire computer control means 305 outputs the received call reception response request to the exchange communication means 302, which then sends it to the exchange 101 via the communication channel 108.

In the exchange 101, the computer communication means 403 receives the call reception response request and outputs it to the entire exchange control means 405. Based on the received call reception response request, the entire exchange control means 405 controls the circuit switching control means 402 to have it connect the computer communication means 403 with the line that has carried the call first directed to the cellular telephone 103 and then transferred to the computer 104. Thereby transmission and reception of voice data between the exchange 101 and the computer 104 is enabled. Actually, the computer communication means 403 converts voice data that is supplied from the circuit switching control means 402 to a form that allows a communication with the computer 104 and outputs it to the communication channel 108. An example of the conversion performed by the computer communication means 403 is such that PCM data of 64 kbps is subjected to voice compression and then converted to IP packets. On the other hand, the computer communication means 403 converts data that is sent from the computer 104 via the communication channel 108 to voice data and outputs it to the circuit switching control means 402.

In the computer 104, the exchange communication means 108 receives voice data from the exchange 101 and outputs it to the voice communication control means 306 via the entire computer control means 305. The voice communication control means 306 issues a request to the entire computer control means 305, which, in response, causes the computer user interface means 303 to output the received voice data. On the other hand, the voice communication control means 306 receives, via the entire computer control means 305, voice data that is input from the computer user interface means 303 and sends it to the exchange 101 via the entire computer control means 305 and the exchange communication means 302.

As for the termination of a voice communication, the voice communication control means 306 detects the end of a voice communication and outputs a request to the entire computer control means 305, which causes the computer user interface means 303 to notify the user of the end of the voice communication and stops the operation.

Second, as for the operation of the cellular telephone 103, it can perform a communication without using the computer 104. In this case, a communication is realized in such a manner that the entire cellular telephone control means 205 controls the cellular telephone user interface means 203 and the radio communication means 201 so as to make a communication with the exchange 101.

Third, operations of the invention that are performed in cases other than a voice communication will be described. As easily understood from the above description, the invention is not merely directed to voice communication; for example, when a call for a packet communication directed to the cellular telephone 103 can actually be received by the computer 104. For example, this can easily be realized in the following manner. A packet communication control means is provided in the computer 104 in addition to the voice communication control means 306. The additional information field 603 (see FIG. 6A) of the call reception state report 502 is adapted to accommodate information indicating whether the call directed to the cellular telephone 103 is a voice call or a packet communication call. In the computer 104, the voice communication control means 306 or the packet communication control means is activated based on this information. The configuration and operation of this type are not limited to the selection between a voice communication and a packet communication. Selection between a voice communication and an image communication as in a visual telephone can be realized in a similar manner.

Further, the following control can easily be realized. That is, when a call directed to the cellular telephone 103 is a packet communication call, a packet communication is performed between the computer 104 and the exchange 101. When a call directed to the cellular telephone 103 is a voice call, the computer 104 merely displays information relating to the call such as a calling party number and the voice call is actually processed by the cellular telephone 103.

Fourth, a procedure of starting a communication between the computer 104 and the exchange 101 will be described. For example, the operation of the first embodiment is realized in the following manner. That is, for transmission of a reception call conversion request 503 from the computer 104 to the exchange 101, the computer 104 starts a TCP/IP communication with the exchange 101. At the same time, the entire computer control means 305 activates the voice communication control means 306 and waits for the start of a TCP/IP or UDP/IP communication from the exchange 101 to the computer 104 for transmission of voice data from the exchange 101. At this time, the port number to be used when a communication from the exchange 101 to the computer 104 is started can be specified by causing the additional information field 607 (see FIG. 6B) of a reception call conversion request 503 to accommodate a TCP or UDP port number.

Further, when a packet communication or an image communication as described above is performed, information on the details of a communication such as protocol information or a communication speed may be accommodated in the additional information field 607 of a reception call conversion request 503 and a communication between the exchange 101 and the computer 104 may be performed based on that information. This type of operation can easily be realized. Instead of the operation that the exchange 101 starts a communication with the computer 104, the computer 104 may start a communication with the exchange 101 after receiving a response to a reception call conversion request 503 from the exchange 101. This type of operation can also be realized easily.

Still further, when receiving a call reception state report 502, the computer 104 may starts the above-described procedure of starting a communication with the exchange 101 after performing log-in of the user of the cellular telephone 103 based on the telephone number of the cellular telephone 103 or a computer log-in name that is accommodated in the additional information field 603. This type of operation can also be realized easily.

As described above, the communication system according to the first embodiment is provided with a base station; a cellular telephone that sends out, by faint radio waves, a call reception state report indicating that the cellular telephone has been rendered in a call reception state when receiving a call reception notice indicating call arrival from the base station by a radio communication; a computer that sends out a reception call conversion request for requesting conversion of the call to the cellular telephone when receiving the call reception state report from the cellular telephone by faint radio waves; and an exchange that converts the call to the cellular telephone to a call to the computer when receiving the reception call conversion request from the computer.

With the above configuration, the invention provides the following seven advantages.

First, since the cellular telephone has the radio communication means and the user interface means, a call can be processed by the cellular telephone alone.

Second, since the cellular telephone and the computer conmnunicate with each other by faint radio waves and the computer sends a reception call conversion request to the exchange, the computer, which is superior in user interface to the cellular telephone, can respond to and process a call that was originally directed to the cellular telephone.

Third, since the computer responds to a call directed to the cellular telephone and an actual call is thereafter processed by the computer, power consumption that would otherwise occur in the cellular telephone to process the call can be prevented.

Fourth, by adding the address information of the computer to a reception call conversion request that is sent from the computer to the exchange, the exchange determines the computer to communicate with based on the address information accommodated in the reception call conversion request. Therefore, the exchange can determine the computer that should respond to a call directed to the cellular telephone at the time of the call reception.

Fifthly, by adding the address information of the computer to a reception call conversion request that is sent from the computer to the exchange, the exchange determines the computer to communicate with based on the address information accommodated in the reception call conversion request. Therefore, it is not necessary for the exchange to manage information relating to the addresses of computers such as a corresponding relationship between the addresses of computers and the telephone numbers of cellular telephones until occurrence of call reception.

Sixthly, since information indicating whether a call directed to the cellular telephone is a voice call, a packet communication call, or an image communication call is added to a call reception state report that is sent from the cellular telephone to the computer, not only a voice communication but also a packet communication or an image communication can be performed between the exchange and the computer.

Seventhly, by adding information of a protocol to be used for a communication between the computer and the exchange to a reception call conversion request that is sent from the computer to the exchange, a protocol to be used for not only a voice communication but also a packet communication or an image communication between the exchange and the computer can be determined at the time of call reception.

Eighthly, a communication protocol for a communication to send the exchange a reception call conversion request from the computer that is about to perform a voice communication can be made different from a communication protocol for the voice communication by the voice communication control means' communicating with the exchange. For example, it is possible to perform a communication for sending a reception call conversion request according to TCP and perform a voice communication according to UDP.

Ninthly, since the voice communication control means of the computer is activated after reception of a call reception state report from the cellular telephone, the voice communication control means need not be operational while no voice call is processed. This lowers the processing capacity required for the computer.

Although the first embodiment is directed to the case where the communication protocol for a communication between the exchange and the computer is UDP, TCP, or IP, it is easily understood that other communication protocols can also provide the advantages of the invention.

Although in the first embodiment a call reception stop notice 505 is sent from the exchange 101 to the cellular telephone 103, an operation can easily be realized that the sending of a call reception stop notice 505 is omitted and both of the cellular telephone 103 and the computer 104 are caused to perform call reception operations. In this case, a control can easily be realized that the cellular telephone 103 processes a call if it has made a response and the computer 104 processes a call if the computer 104 has made a response.

Although the first embodiment employs the cellular telephone 103, a configuration and an operation can easily be realized in which the cellular telephone 103 is replaced by a pager having a faint radio wave communication means and the exchange 101 informs the pager of only arrival of a call and an actual voice communication is performed by the computer 104 or the above-described telephone.

In the first embodiment, when receiving a call reception state report 502, the entire computer control means 305 of the computer 104 causes the reception call conversion request generating means 304 to generate a reception call conversion request 503 and requests the voice communication control means 306 to activate itself. However, an operation can easily be realized that at the time of reception of a call reception state report 502 the entire computer control means 305 requests the voice communication control means 306 to activate itself and generate a reception call conversion request 503. In this case, an operation can also be realized easily that the voice communication control means 306 requests the exchange 101 to establish a communication channel for a voice communication.

In the first embodiment, the computer 104 makes a transition to a call reception operation after receiving a computer call reception notice 504. However, an operation can easily be realized that the computer 104 makes a transition to a call reception operation at a time point when it receives a call reception state report 502. In this case, an operation can easily be realized that the computer 104 displays a calling party number on the screen as a call reception operation by causing the additional information field 603 (see FIG. 6A) of a call reception state report 503 to accommodate the calling party number.

Although in the first embodiment the exchange 101 sends out a computer call reception notice 504 after receiving a reception call conversion request 503 from the computer 104, an operation can easily be realized that the exchange 101 does not cause the computer 104 to perform a call reception operation and, instead, the exchange 101 executes both of a reception call conversion process and a call responding process upon reception of a reception call conversion request 503 and immediately allows a voice communication.

Although in the first embodiment the computer 104 issues a reception call conversion request 503, the following configuration and operation can easily be realized. That is, the cellular telephone 103 is provided with a reception call conversion request generating means for generating a reception call conversion request and an address request generating means for generating an address request for requesting transmission of the address of the computer 104. The computer 104 is provided with an address responding means for sending back its own address when receiving an address request. When receiving a call, the cellular telephone 103 sends an address request to the computer 104 by faint radio waves, generates a reception call conversion request based on an address response that is sent from the computer 104, and sends the reception call conversion request to the exchange 101 via the communication channel 106 by a radio communication.

Further, the following operation can easily be realized. That is, instead of the operation that the cellular telephone 103 sends an address request to the computer 104 only when receiving a call, the cellular telephone 103 sends an address request at an arbitrary time point when it can communicate with the computer 104 by faint radio waves, which enables an operation that the cellular telephone 103 requests the exchange 101 to convert a call directed to the cellular telephone 103 to a call to the computer 104 as well as an operation that a notice of arrival of a call directed to the cellular telephone 103 is sent to both of the cellular telephone 103 and the computer 104.

Still further, by setting a telephone number corresponding to the computer 104 and causing the exchange 101 to manage a corresponding relationship between the address of the computer 104 and the telephone number corresponding to the computer 104, the computer 104 can send back, as an address response, the telephone number corresponding to the computer 104. This can be realized easily.

In this case, since the telephone number is accommodated, as the address of the computer 104, in a reception call conversion request that is sent from the cellular telephone 103, it is easily understood that it is not necessary to change the communication protocol for a radio communication even when the address format of the computer 104 is changed, which means superior extendability.

It is easily understood that the advantages of the invention can still be obtained by each of a configuration in which the exchange 101 is made a private branch exchange and the base station 102 is made a base station of a private radio network and a configuration in which the exchange 101 is made a station exchange of a public network and the base station 102 is made a base station of a public radio network. In a configuration in which the exchange 101 is made a private branch exchange and the base station 102 is made a base station of a public network, it is easily understood that a station exchange of the public network should exist between the exchange 101 and the base station 102. Further, in a configuration in which the exchange 101 is made a station exchange of a public network and the base station 102 is made a base station of a private radio network, it is easily understood that a private branch exchange of the private radio network should exist between the exchange 101 and the base station 102.

Although in the first embodiment the computer 104 issues a reception call conversion request 503, the following operation can easily be realized. That is, the computer 104 issues a call reception report request for requesting the exchange 101 to send back information relating to a call directed to the cellular telephone 103 such as the telephone number of a caller of the call. The cellular telephone 103 processes a voice call and the computer 104 merely displays the information relating to the call such as the calling party number. In this case, it is easily understood that the computer 104 should be equipped with a call reception report request generating means.

Although in the first embodiment the exchange 101 acquires the address of the computer 104 by causing field 606 of a reception call conversion request 503 to accommodate the address of the computer 104, an operation can easily be realized that the exchange 101 acquires it in the form of an address of the computer 104, such as an IP packet sender address, that is sent as part of a communication protocol when a reception call conversion request 503 is sent from the computer 104 to the exchange 101.

Embodiment 2

A communication system according to a second embodiment of the invention will be described below. The second embodiment is different from the first embodiment in the detailed configuration of the exchange 101.

A detailed configuration of the exchange 101 according to the second embodiment will be described with reference to FIG. 7, which is a block diagram showing its example configuration.

Means 701–705 shown in FIG. 7 are the same as the means 401–405 shown in FIG. 4 (first embodiment) and hence are not described here. Reference numeral 706 denotes a call identifier generating means for generating, upon reception of a call, a call identifier for identification of a circuit that carries the call.

The operation of the communication system according to the second embodiment will be described below. Although a signal diagram for description of the operation of the second embodiment should be the same as the signal diagram of FIG. 5 (first embodiment), in the second embodiment each of the call reception notice 501, the call reception state report 502, and the reception call conversion request 503 includes a call identifier that is generated by the call identifier generating means 706.

First, the call identifier that is included in the call reception state report 502 and the reception call conversion request 503 will be described with reference to FIGS. 8A and 8B. FIGS. 8A and 8B show example formats of the call reception state report 502 and the reception call conversion request 503, respectively.

Since fields 801–807 shown in FIGS. 8A and 8B are the same as fields 601–607 shown in FIGS. 6A and 6B, they are not described here. Field 808 of the call reception state report 502 accommodates a call identifier and field 809 of the reception call conversion request 503 accommodates a call identifier.

Next, the operation of the second embodiment will be described starting from operations performed by the exchange 101 in sending a call reception notice 501. In the exchange 101, when the circuit switching control means 702 detects a call directed to the cellular telephone 103, it informs the entire exchange control means 705 of the detection. The entire exchange control means 705 issues a call identifier generation request to the call identifier generating means 706 and thereby acquires a call identifier. Then, the entire exchange control means 705 controls the base station communication means 701 to have it send a call reception notice including the call identifier to the cellular telephone 103 via the communication channel 105. Further, the entire exchange control means 705 outputs the call identifier and information indicating the issuance of the call reception notice 501 to the circuit managing means 704 to have it manage the circuit and the call identifier.

When receiving the call reception notice 501 including the call identifier, the cellular telephone 103 generates a call reception state report 502 accommodating the call identifier in field 808 (see FIG. 8A) and sends it to the computer 104.

When receiving the call reception state report 502 including the call identifier, the computer 104 generates a reception call conversion request 503 accommodating the call identifier in field 809 (see FIG. 8B) and sends it to the exchange 101. Since the operations of the respective means in the above description are the same as those in the first embodiment except for the involvement of the call identifier, they are not described here.

Finally, operations performed by the exchange 101 after reception of the reception call conversion request 503 will be described. In the exchange 101, the computer communication means 703 receives the reception call conversion request 503 including the call identifier via the communication channel 108 and outputs it to the entire exchange control means 705. The entire exchange control means 705 collates the call identifier of the received reception call conversion request 503 with the call identifier of the call directed to the cellular telephone 103 that is managed by the circuit managing means 704. Then, the entire exchange control means 705 sends a computer call reception notice 504 to the computer 104 via the computer communication means 703 to convert the call to the cellular telephone 103 to a call to the computer 104, and sends a call reception stop notice 505 to the cellular telephone 103 via the base station communication means 701.

As described above, in the communication system according to the second embodiment, the exchange is provided with the call identifier generating means for generating a call identifier and the call identifier is incorporated in a call reception notice, a call reception state report, and a reception call conversion request to make it possible to collate the reception call conversion request that is sent from the computer with a call directed to the cellular telephone.

With the above configuration, the invention provides the following two advantages.

First, by collating a call identifier that is generated upon reception of a call directed to the cellular telephone with a call identifier included in a reception call conversion request, correspondence between the reception call conversion request that is sent from the computer and the call directed to the cellular telephone can be checked. Therefore, circuits, a program, a memory, etc. for checking such correspondence can be reduced in scale or size.

Second, a call identifier is generated upon reception of a call, sent from the exchange to the base station, and then returned to the exchange via the cellular telephone and the computer. Because of high confidentiality, this type of call identifier enables authentication of a reception call request that is sent from the computer to the exchange.

In the second embodiment, the structure of the call identifier has not been described. It is easily understood that the call identifier may be in any form, that is, it may be data, a character string, a symbol string, a number string, or the like, as long as it allows collation by the exchange, and that the call identifier may have any size.

Embodiment 3

A communication system according to a third embodiment of the invention will be described below.

First, the configuration of a communication system according to the third embodiment will be described with reference to FIG. 9, which is a block diagram showing its example configuration.

Figure 9:
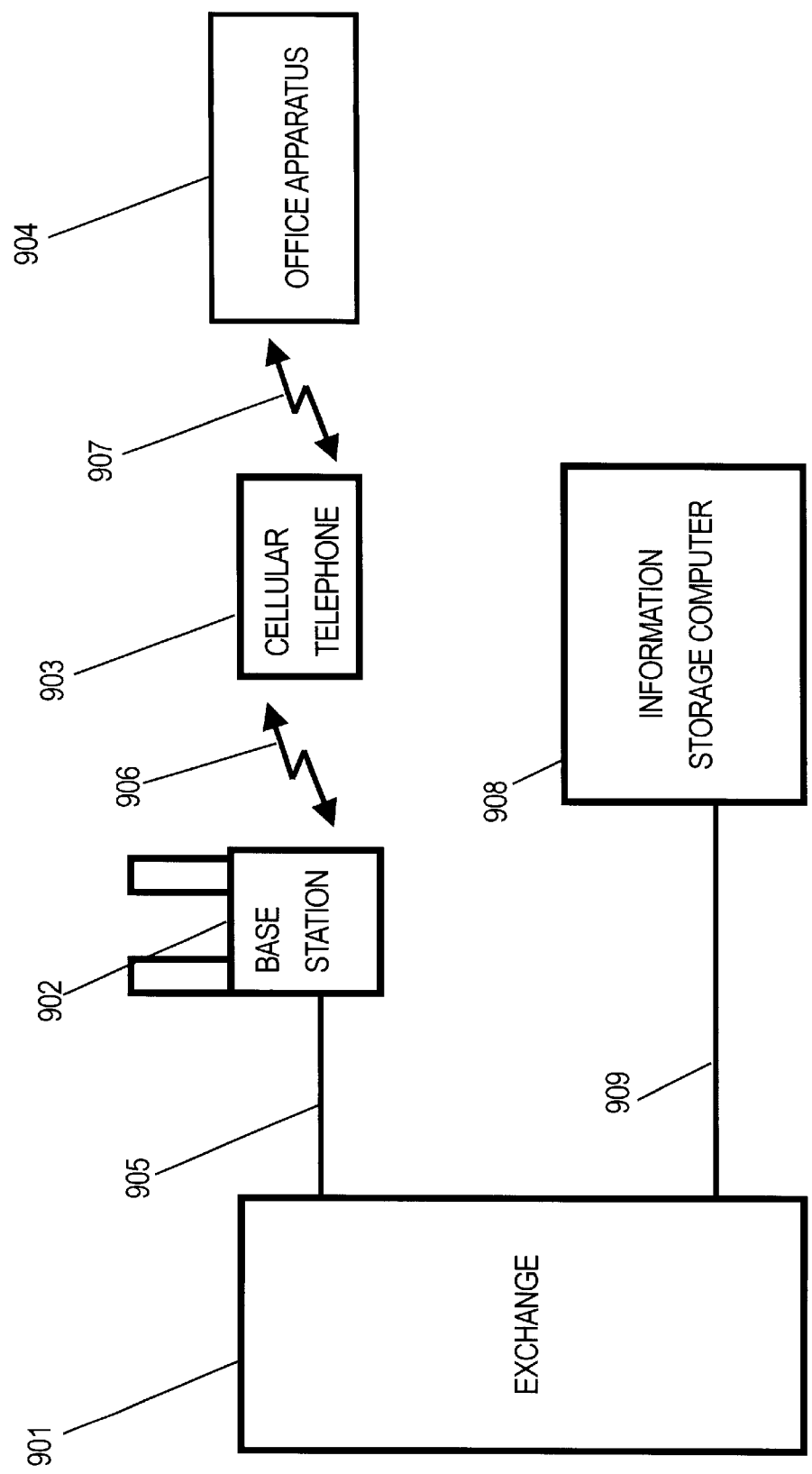
FIG. 9 is a block diagram showing a configuration of a communication system according to a third embodiment of the invention.

Components 901–902 shown in FIG. 9 are the same in configuration as the components 101–102 shown in FIG. 1 (first embodiment) and hence are not described here.

Reference numeral 904 denotes an office apparatus that communicates with the cellular telephone 903 by faint radio waves. Examples of the office apparatus 904 are an electronic blackboard, a copier, and a fax machine. Communication channels 905–907 are the same in configuration as the communication channels 105–107 shown in FIG. 1 (first embodiment) and hence are not described here. Although in the first embodiment the communication channel 107 is located between the cellular telephone 103 and the computer 104, in the third embodiment the communication channel 907 is located between the cellular telephone 903 and the office apparatus 905. Reference numeral 908 denotes an information storage computer that stores information to be transmitted to or from the office apparatus 904 via the cellular telephone 903. Reference numeral 909 denotes a communication channel between the information storage computer 908 and the exchange 901.

Next, a detailed configuration of the cellular telephone 903 will be described with reference to FIG. 10, which is a block diagram showing its example configuration.

Figure 10:
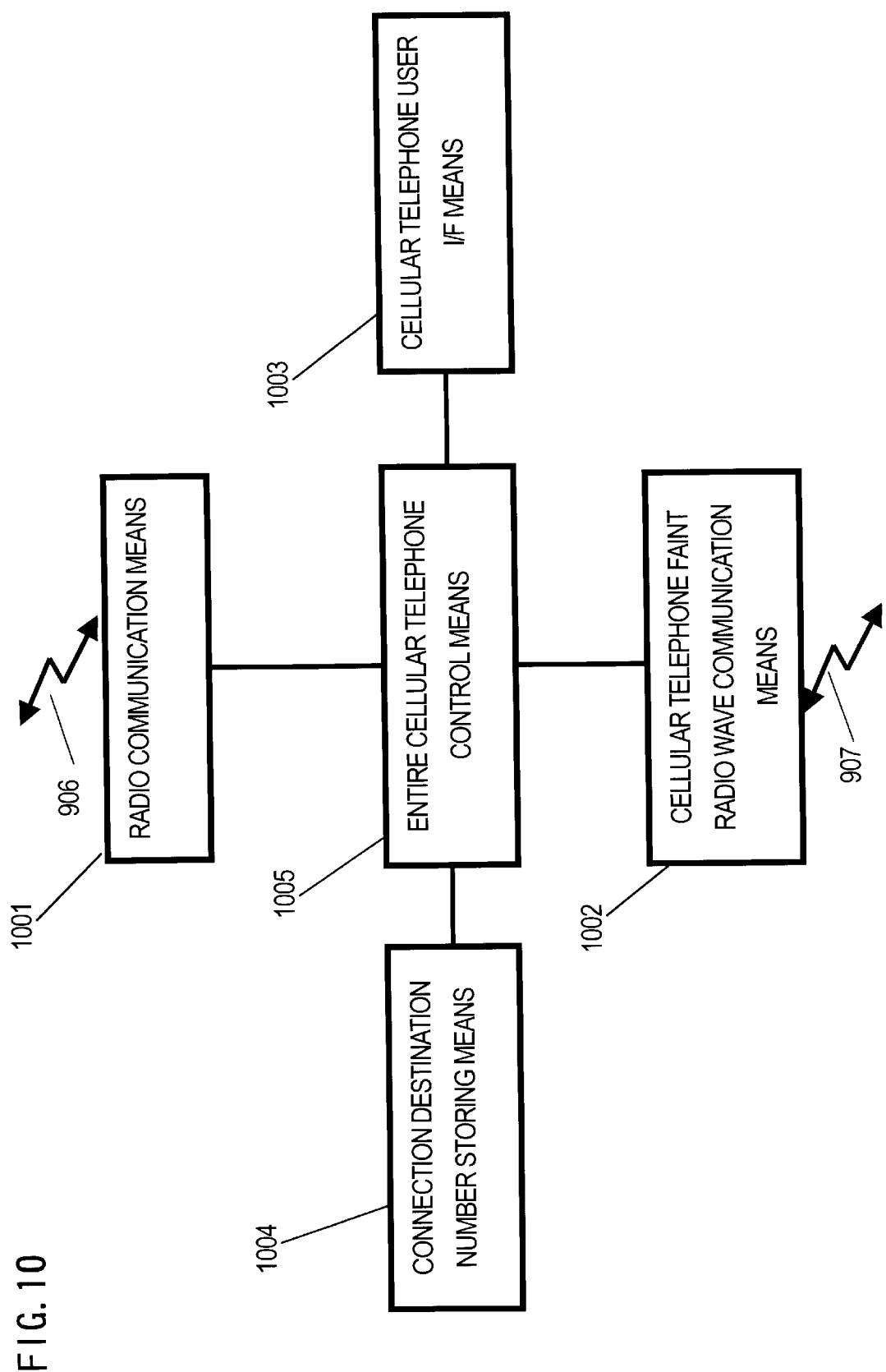
FIG. 10 is a block diagram showing a configuration of a cellular telephone in the communication system of FIG. 9.

In FIG. 10, reference numeral 1001 denotes a radio communication means for performing a radio communication with the base station 902. Reference numeral 1002 denotes a cellular telephone faint radio wave communication means for communicating with the office apparatus 904 by faint radio waves. Reference numeral 1003 denotes a cellular telephone user interface means as a user interface of the cellular telephone 903. Reference numeral 1004 denotes a connection destination number storing means for storing information necessary to communicate with the information storage computer 908 such as a telephone number to be dialed first to communicate with the information storage computer 908 or the address of the information storage computer 908. Reference numeral 1005 denotes an entire cellular telephone control means for controlling the entire cellular telephone 903.

Next, a detailed configuration of the information storage computer 908 will be described with reference to FIG. 11, which is a block diagram showing its example configuration.

Figure 11:
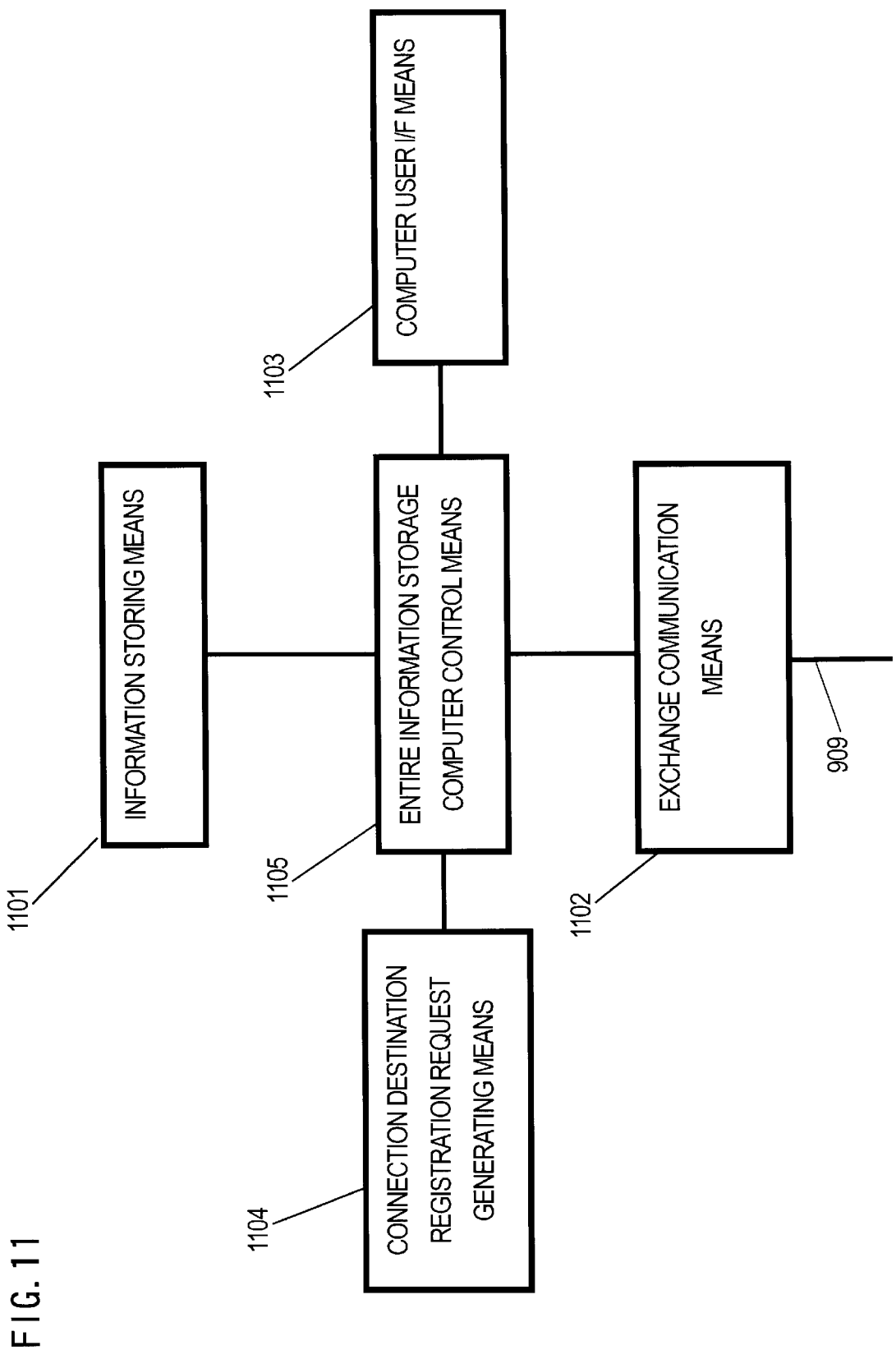
FIG. 11 is a block diagram showing a configuration of an information storage computer in the communication system of FIG. 9.

In FIG. 11, reference numeral 1101 denotes an information storing means for storing information to be transmitted to the office apparatus 904 or received from the office apparatus 904. Reference numeral 1102 denotes an exchange communication means for communicating with the exchange 901. Reference numeral 1103 denotes a computer user interface means as a user interface of the information storage computer 908. Reference numeral 1104 denotes a connection destination registration request generating means for generating a connection destination registration request for requesting the exchange 901 to register a telephone number to be dialed to communicate with the information storage computer 908. Reference numeral 1105 denotes an entire information storage computer control means for controlling the entire information storage computer 908.

A detailed configuration of the exchange 901 will be described with reference to FIG. 12, which is a block diagram showing its example configuration.

Figure 12:
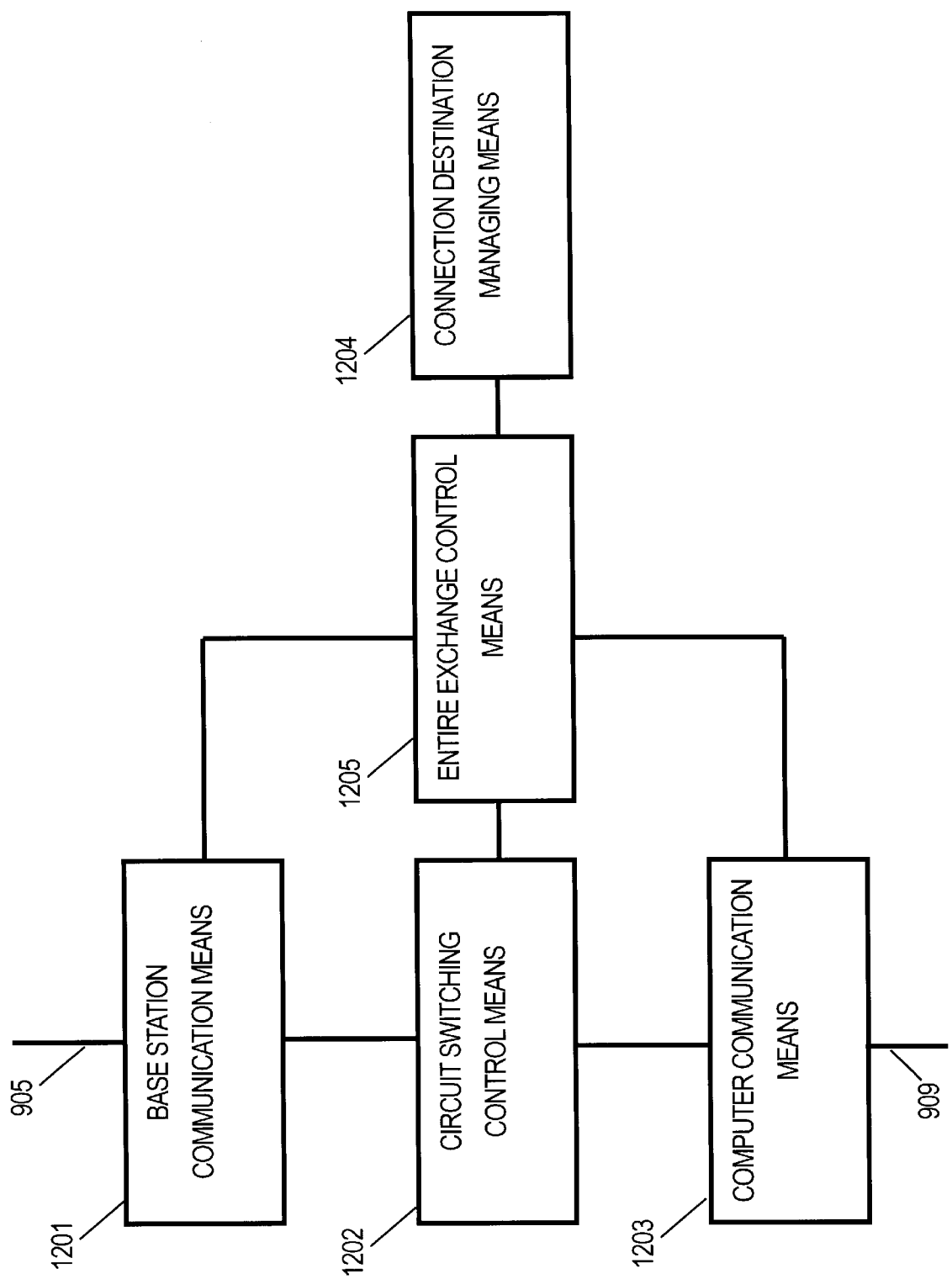
FIG. 12 is a block diagram showing a configuration of an exchange in the communication system of FIG. 9.

Since means 1201–1203 and 1205 shown in FIG. 12 are the same as the means 401–403 and 405 shown in FIG. 4 (first embodiment), they are not described here. Reference numeral 1204 denotes a connection destination managing means for managing a connection destination registration request that is sent from the information storage computer 908.

Figure 13:
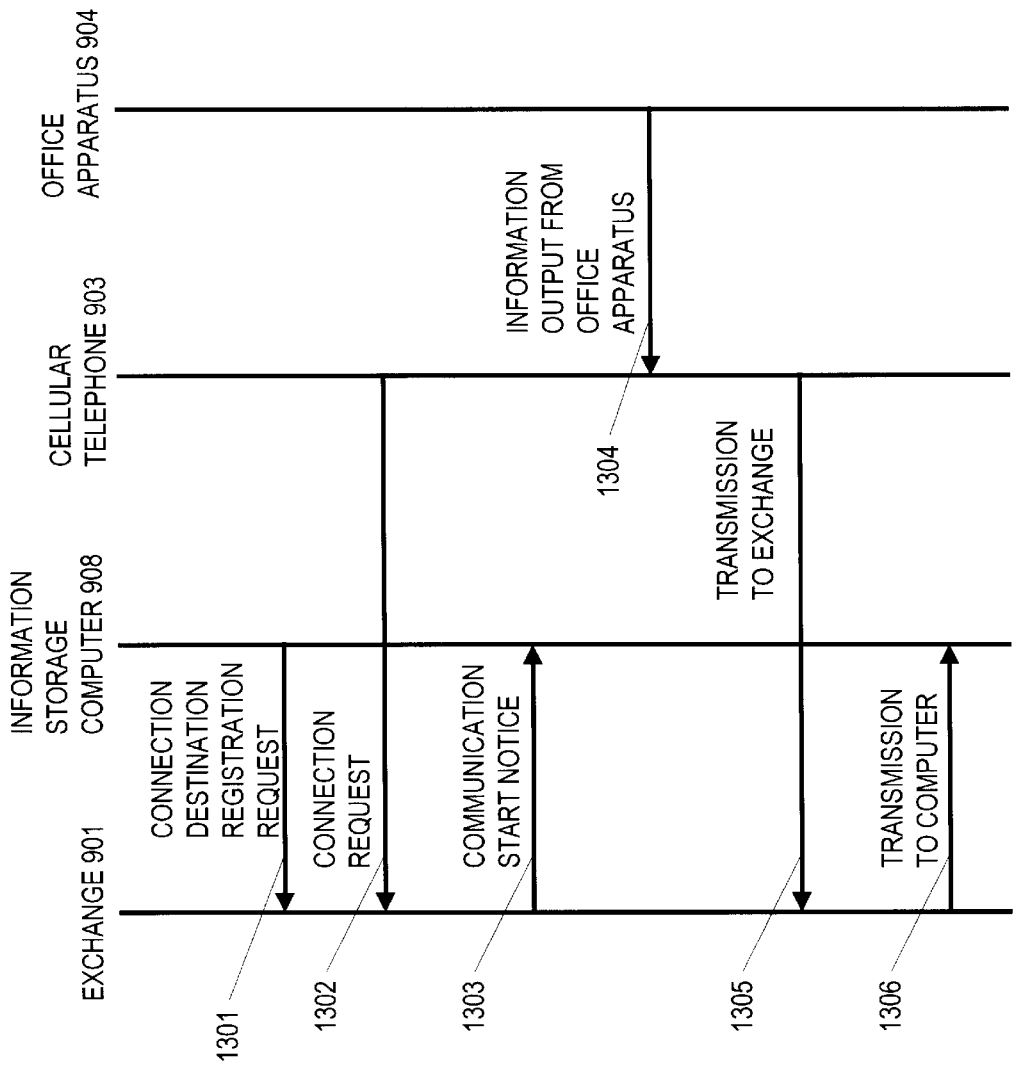
FIG. 13 is a signal diagram showing the operation of the communication system according to the third embodiment.

The operation of the communication system according to the third embodiment will be described below with reference to FIG. 13, which is an example signal diagram of the communication system. In the following description, to facilitate the description, the office apparatus 904 is assumed to be an electronic blackboard and the description is directed a case where digital data obtained by scanning a text or a table drawn on the electronic blackboard is stored in the information storage computer 908 via the cellular telephone 903.

Figure 14:
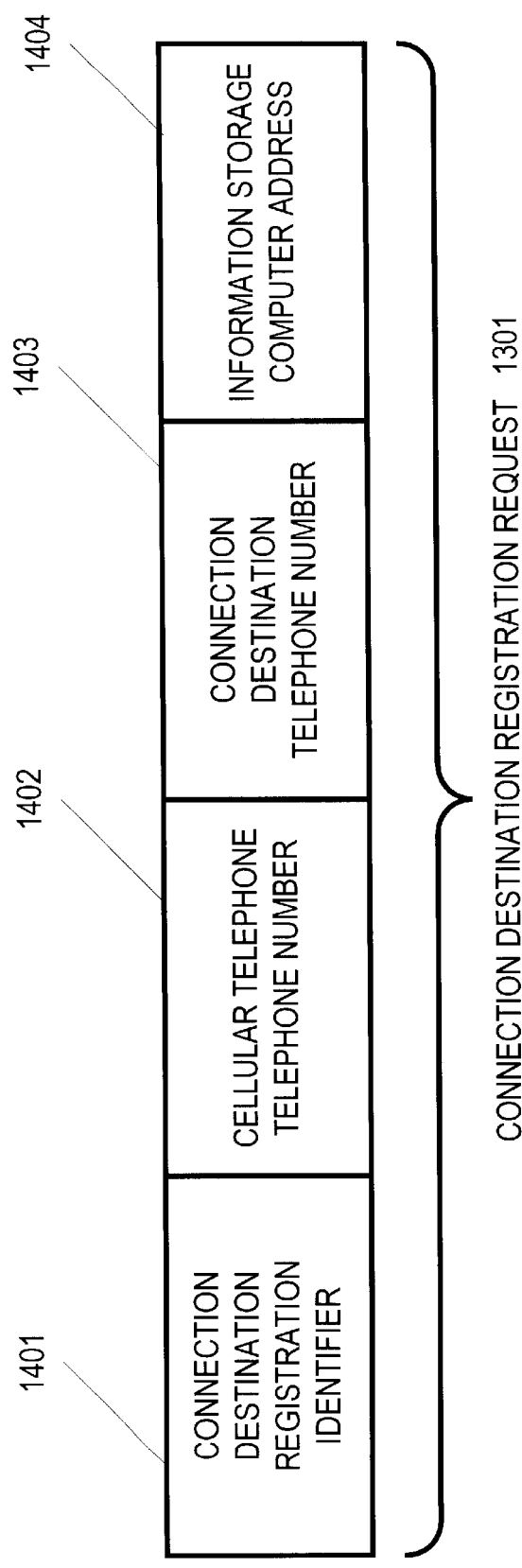
FIG. 14 is a format diagram of a connection destination registration request used in the communication system according to the third embodiment.

First, the information storage computer 908 sends the exchange 901 a connection destination registration request 1301 for requesting the exchange 901 to register information that is necessary for the cellular telephone 903 to communicate with the information storage computer 908. FIG. 14 shows an example of the contents of the connection destination registration request 1301. As shown in FIG. 14, the connection destination registration request 1301 includes a connection destination registration identifier 1401 indicating that this request is a connection destination registration request, the telephone number 1402 of the cellular telephone 903, a connection destination telephone number 1403 that is input to the cellular telephone 903 to establish a connection from the cellular telephone 903 to the information storage computer 908, and an information storage computer address 1404 that is necessary for the exchange 901 to communicate with the information storage computer 908.

For example, the connection destination registration request 1301 is generated when the entire information storage computer control means 1105 has judged that the user has requested registration by using the computer user interface means 1103 of the information storage computer 908. In this case, the entire information storage computer control means 1105 requests the connection destination registration request generating means 1104 to generate a connection destination registration request 1301 and the generated connection destination registration request 1301 is sent from the exchange communication means 1102 to the exchange 901. The connection destination registration request 1301 is sent to the computer communication means 1203 of the exchange 903 via the communication channel 909, supplied to the connection destination managing means 1204 via the entire exchange control means 1205, and managed by the connection destination managing means 1204. After the registration of the connection destination, if the connection destination telephone number 1403 (see FIG. 14) is input to the cellular telephone 903, a state is established that the cellular telephone 903 and the information storage computer 908 can communicate with each other.

Next, operations that are performed when the user of the cellular telephone 903 stores information that is input from the office apparatus 904 by faint radio waves in the information storage computer 908 will be described.

When a connection destination telephone number 1403 (see FIG. 14) has been input to the cellular telephone 903, a connection request 1302 is sent from the cellular telephone 903 to the exchange 901 via the communication channel 906, the base station 902, and the communication channel 905.

For example, the connection request 1302 is generated when the entire cellular telephone control means 1005 has judged that the user has requested a connection by using the cellular telephone user interface means 1003. The same telephone number as the connection destination telephone number 1403 (see FIG. 14) is stored in the connection destination number storing means 1004. Therefore, the entire cellular telephone control means 1005 acquires the telephone number stored in the connection destination number storing means 1004 and starts a connecting operation for the acquired telephone number.

In the exchange 901, the base station communication means 1201 receives the connection request 1302 and outputs it to the entire exchange control means 1205. The entire exchange control means 1205 confirms that the telephone number of the destination of the connection request coincides with the connection destination telephone number 1403 (see FIG. 14) that is managed by the connection destination managing means 1204, and then controls the base station communication means 1201, the circuit switching control means 1202, and the computer communication means 1203 to perform a circuit control so as to enable a communication between the cellular telephone 903 and the information storage computer 908 and sends the information storage computer 908 a communication start notice 1303 indicating a communication with the cellular telephone 903 will be started.

After a communication channel between the cellular telephone 903 and the information storage computer 908 has been established, information 1304 is sent from the office apparatus 904 to the cellular telephone via the communication channel 907 by faint radio waves. Where the office apparatus 904 is an electronic blackboard, for example, a specific example operation is such that a button on the electronic blackboard is depressed, whereupon a text or a table drawn on the electronic blackboard is digitized by scanning and data obtained by the scanning is sent to the cellular telephone 903 by faint radio waves.

The information 1304 that has been output from the office apparatus 904 is input to the cellular telephone 903, specifically, the cellular telephone faint radio wave communication means 1002. Then, the information 1304 is converted by the entire cellular telephone control means 1005 to a form suitable for a radio communication and sent from the radio communication means 1001 to the exchange 901 via the communication channel 906, the base station 902, and the communication channel 905 (indicated by reference numeral 1305).

In the exchange 901, the base station communication means 1201 receives the information and sends it to the information storage computer 908 via the circuit switching control means 1202 and the computer communication means 1203 (indicated by reference numeral 1306).

In the information storage computer 908, the exchange communication means 1102 receives the information that has been sent from the exchange 901 and the entire information storage computer control means 1105 outputs it to the information storing means 1101. As a result, the information that was output from the office apparatus 904 is stored in the information storage computer 908. Where the office apparatus 904 is an electronic blackboard, for example, data obtained by digitizing a text or a table drawn on the electronic blackboard is stored in the information storage computer 908.

Although the operation of the embodiment has been described for the case where each of the cellular telephone 903 and the information storage computer 908 is provided in single, each of them may be provided in plurality. For example, where the office apparatus 904 is an electronic blackboard, a plurality of users can store the contents on the electronic blackboard in different information storage computers. This can be done in such a manner that after each user has established a communication channel between his cellular telephone and the associated information storage computer, information is simultaneously sent from the office apparatus 904 to the respective cellular telephones by faint radio waves and then stored in the respective information storage computers for which the communication channels have been established.

In this case, the following configuration can easily be realized. For example, when two users have different cellular telephones 903, that is, first and second cellular telephones, the base station 902 and the exchange 901 for the first cellular telephone are a base station of a private radio communication network and a PBX and the base station 902 and the exchange 901 for the second cellular telephone are a base station of a private radio communication network and a PBX between which a public network exists.

Although in the third embodiment information that is output from the office apparatus 904 is stored in the information storage computer 908, information may be sent from the information storage computer 908 to the office apparatus 904. For example, assume a case where the office apparatus 904 is a copier having a screen display function. After a communication channel is established between the cellular telephone 903 and the information storage computer 908, document data stored in the information storage computer 908 is acquired by the cellular telephone 903 and then transmitted to the copier by faint radio waves, whereby the document data can be copied.

As described above, the communication system according to the third embodiment is provided with an office apparatus that communicates with a cellular telephone by faint radio waves; the cellular telephone having a connection destination number storing means for storing the connection destination telephone number of a communication channel to be established for input/output of information with the office apparatus; an information storage computer having an information storing means for storing information to be sent to the office apparatus or received from it and a connection destination registration request generating means for generating a connection destination registration request for requesting registration of information necessary to communicate with the cellular telephone; and an exchange having a connection destination managing means for managing the connection destination registration request and for establishing a communication channel between the cellular telephone and the information storage computer when receiving a call from the cellular telephone.

With the above configuration, the invention provides the following four advantages.

First, since the cellular telephone and the office apparatus communicate with each other by faint radio waves and the cellular telephone and the information storage computer communicate with each other via the exchange, information that is output from the office apparatus can be stored in the information storage computer or information stored in the information storage computer can be sent to the office apparatus.

Second, by receiving information that is output from a single office apparatus with a plurality of cellular telephones, the information that is output from the single office apparatus can be stored in different information storage computers. For example, where the office apparatus is an electronic blackboard, information obtained by digitizing a text or a table drawn on the electronic blackboard can be stored in computers of users who own cellular telephones.

Third, since a connection destination registration request is sent from the information storage computer, input/output of information between the office apparatus and the information storage computer can be performed if the cellular telephone side merely stores the telephone number of the connection destination. For example, assume that a PPP connection is to be established between the cellular telephone and the exchange and a communication using an IP address is to be performed between the exchange and the information storage computer. In this case, if the connection destination telephone number, the telephone number of the cellular telephone, and the IP address of the information storage computer are added to a connection destination registration request that is sent from the information storage computer, when a call is made from the cellular telephone to the designated connection destination telephone number, the exchange can add the IP address of the information storage computer to information that is sent from the cellular telephone. That is, even if the cellular telephone does not store the IP address of the information storage computer, information from the office apparatus can be stored in the information storage computer.

Fourth, since a connection destination registration request is sent from the information storage computer, each user of a cellular telephone can designate an information storage computer or a storage location of an information storage computer for information input/output by means of a connection destination telephone number. For example, a user of a cellular telephone can designate, as an information storage computer to be used a computer, he is using by means of a connection destination telephone number and can also designate a storage location, for example, his directory of the information storage computer, by means of an ISDN sub-address number.

In the third embodiment, the operation of registering a connection destination telephone number in the connection destination number storing means 1004 of the cellular telephone 903 has not been described. It is easily understood that a connection destination telephone number can be input by using the cellular telephone 903 itself, specifically, the cellular telephone user interface means 1003, or from the information storage computer 908 via the cellular telephone faint radio wave communication means 1002.

Although in the third embodiment information is output from the office apparatus 904 after a circuit connection has been established between the cellular telephone 903 and the exchange 901, another method is possible in which a packet communication that does not require a circuit connection is performed between the cellular telephone 903 and the exchange 901. In this case, it is easily understood that if packets including the address of the information storage computer are generated by the cellular telephone 903 or the office apparatus 904, transmission and reception of information can be performed between the office apparatus 904 and the information storage computer 908.

Embodiment 4

A communication system according to a fourth embodiment of the invention will be described below.

First, the configuration of a communication system according to the fourth embodiment will be described with reference to FIG. 15, which is a block diagram showing its example configuration.

Figure 15:
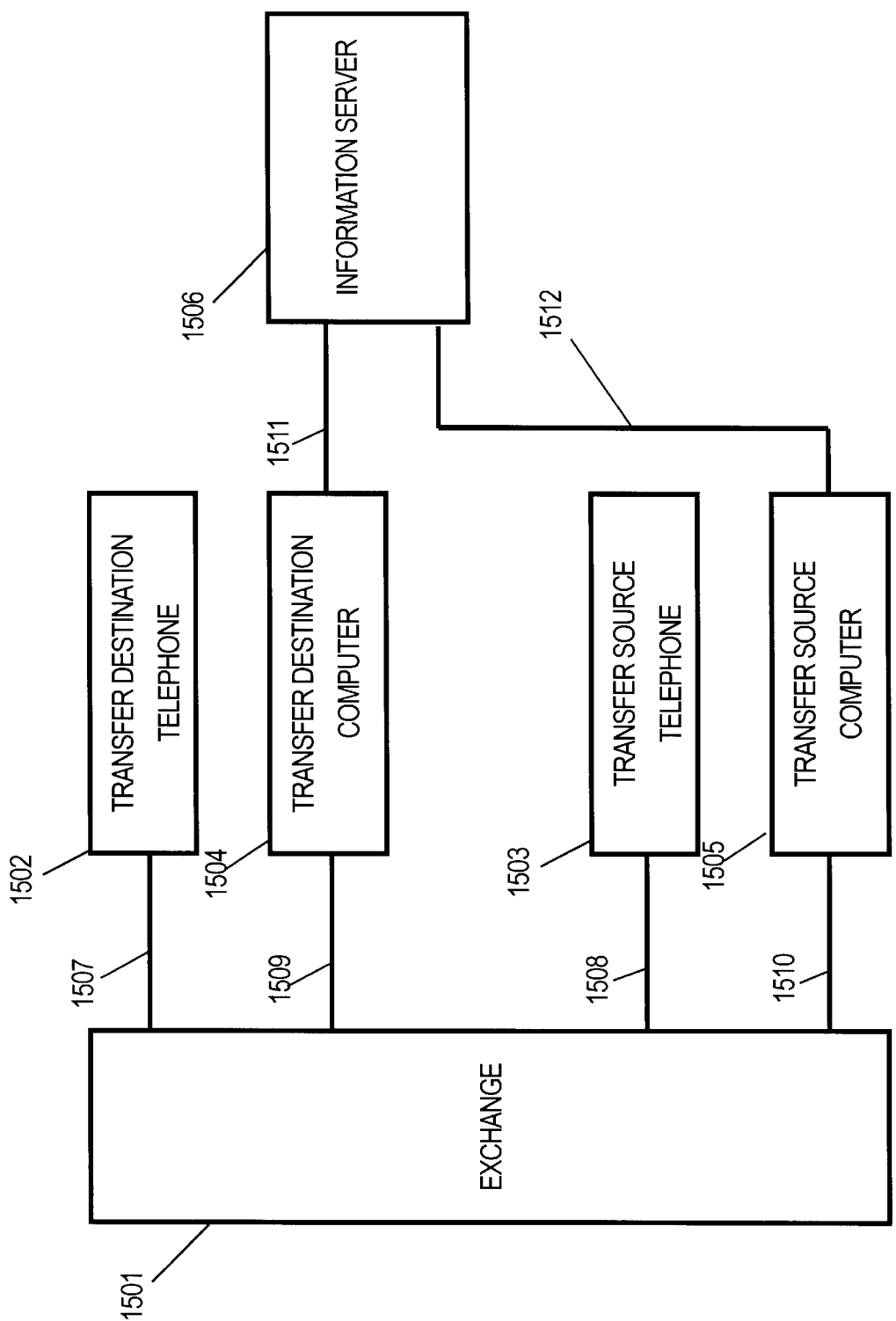
FIG. 15 is a block diagram showing a configuration of a communication system according to a fourth embodiment of the invention.

In FIG. 15, reference numeral 1501 denotes an exchange and numerals 1502 and 1503 denote telephones connected to the exchange 1501. To distinguish the telephones 1502 and 1503 from each other, they are called a transfer destination telephone and a transfer source telephone, respectively. Reference numerals 1504 and 1505 denote computers connected to the exchange 1501. To distinguish the computers 1504 and 1505 from each other, they are called a transfer destination computer and a transfer source computer, respectively. Reference numeral 1506 denotes an information server that stores information to be used at the time of call reception or a circuit connection. Examples of the information server 1506 are a database server of customer information corresponding to calling party numbers and a database server that stores product information etc. Reference numerals 1507 and 1508 are communication channels that connect the transfer destination telephone 1502 and the transfer source telephone 1503 to the exchange 1501. Reference numeral 1509 and 1510 are communication channels that connect the transfer destination computer 1504 and the transfer source computer 1505 to the exchange 1501. Reference numerals 1511 and 1512 denote communication channels that connect the transfer destination computer 1504 and the transfer source computer 1505 to the information server 1506. Physically, the communication channels 1509–1512 can be made the same communication channel by using an Ethernet or the like.

A detailed configuration of the transfer destination computer 1504 and the transfer source computer 1505 will be described below with reference to FIG. 16, which is a block diagram showing an example configuration of the transfer destination computer 1504.

Figure 16:
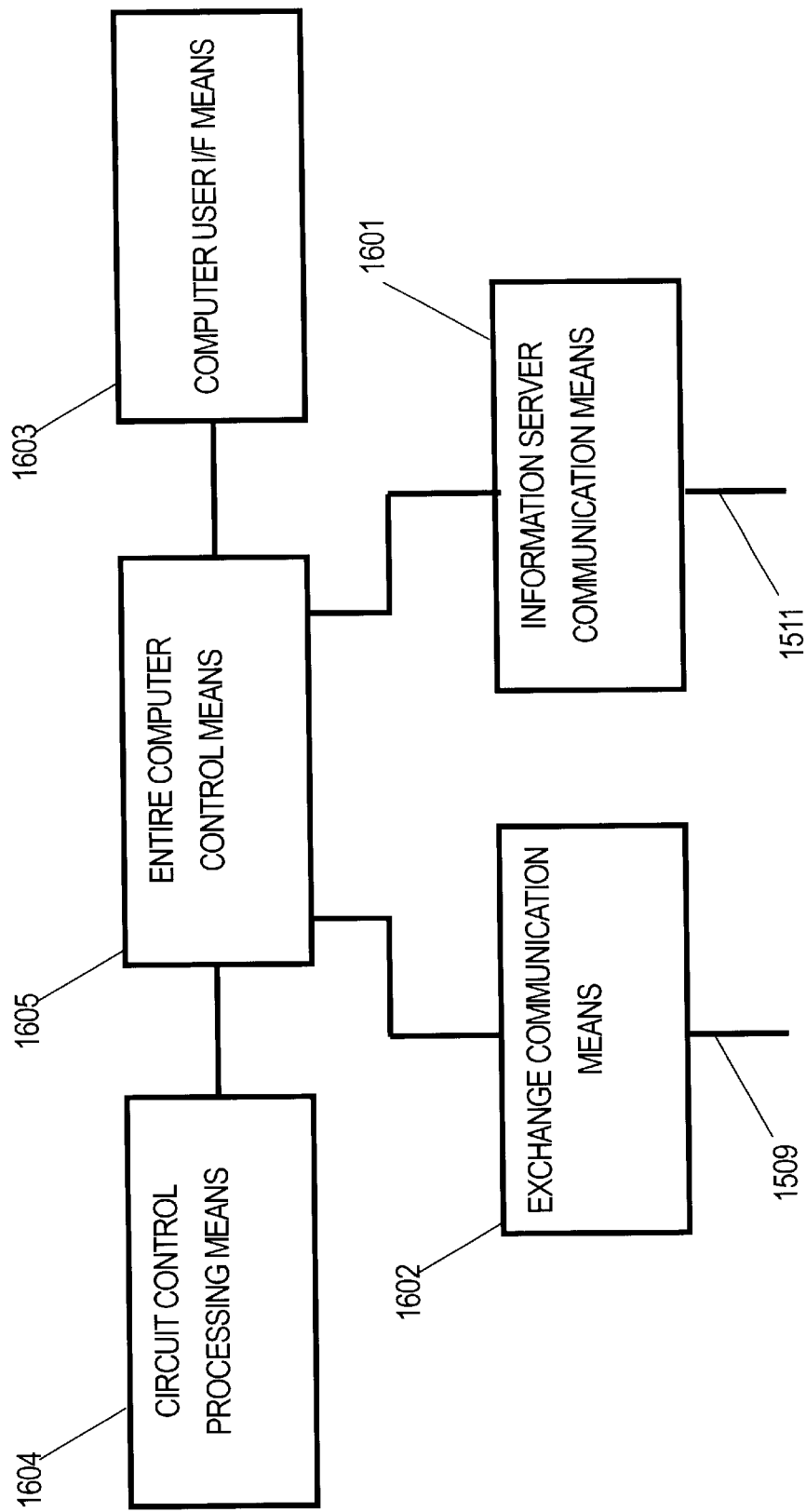
FIG. 16 is a block diagram showing a configuration of a transfer destination computer in the communication system of FIG. 15.

In FIG. 16, reference numeral 1601 denotes an information server communication means for communicating with the information server 1506. Reference numeral 1602 denotes an exchange communication means for communicating with the exchange 1501. Reference numeral 1603 denotes a computer user interface means as a user interface of the transfer destination computer 1504. Reference numeral 1604 denotes a circuit control processing means for performing telephone control processing. Reference numeral 1605 denotes an entire computer control means for controlling the entire transfer destination computer 1504.

The transfer source computer 1505 has the same configuration as the transfer destination computer 1504. In the following, to facilitate the description, the reference numeral of each means constituting the transfer source computer 1505 will given a suffix "a"; for example, the information server communication means 1601 will be denoted by reference numeral 1601a (the same notation applies to the other means 1602–1605).

A detailed configuration of the exchange 1501 will be described below with reference to FIG. 17, which is a block diagram showing its example configuration.

Figure 17:
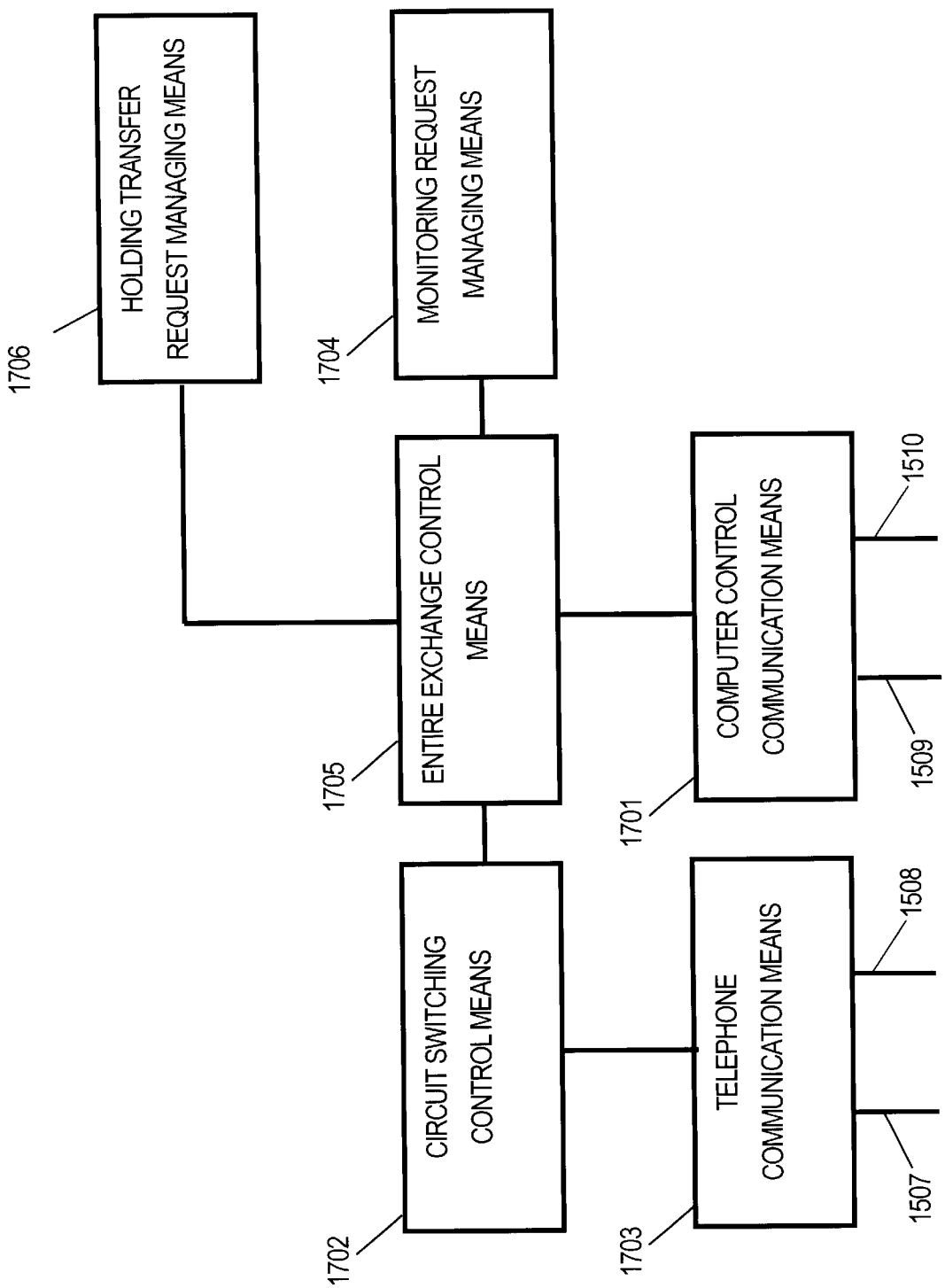
FIG. 17 is a block diagram showing a configuration of an exchange in the communication system of FIG. 15.

In FIG. 17, reference numeral 1701 denotes a computer control communication means for communicating with the transfer destination computer 1504 and the transfer source computer 1505. Reference numeral 1702 denotes a circuit switching control means for performing a circuit switching control of the entire exchange 1501. Reference numeral 1703 denotes a telephone communication means for communicating with the transfer destination telephone 1502 and the transfer source telephone 1503. Reference numeral 1704 denotes a monitoring request managing means for managing whether to send variation information to a computer when a variation occurs in circuit states. Reference numeral 1705 denotes an entire exchange control means for controlling the entire exchange 1501. Reference numeral 1706 denotes a holding transfer request managing means for managing a holding transfer request that is sent from a computer.

Figure 18:
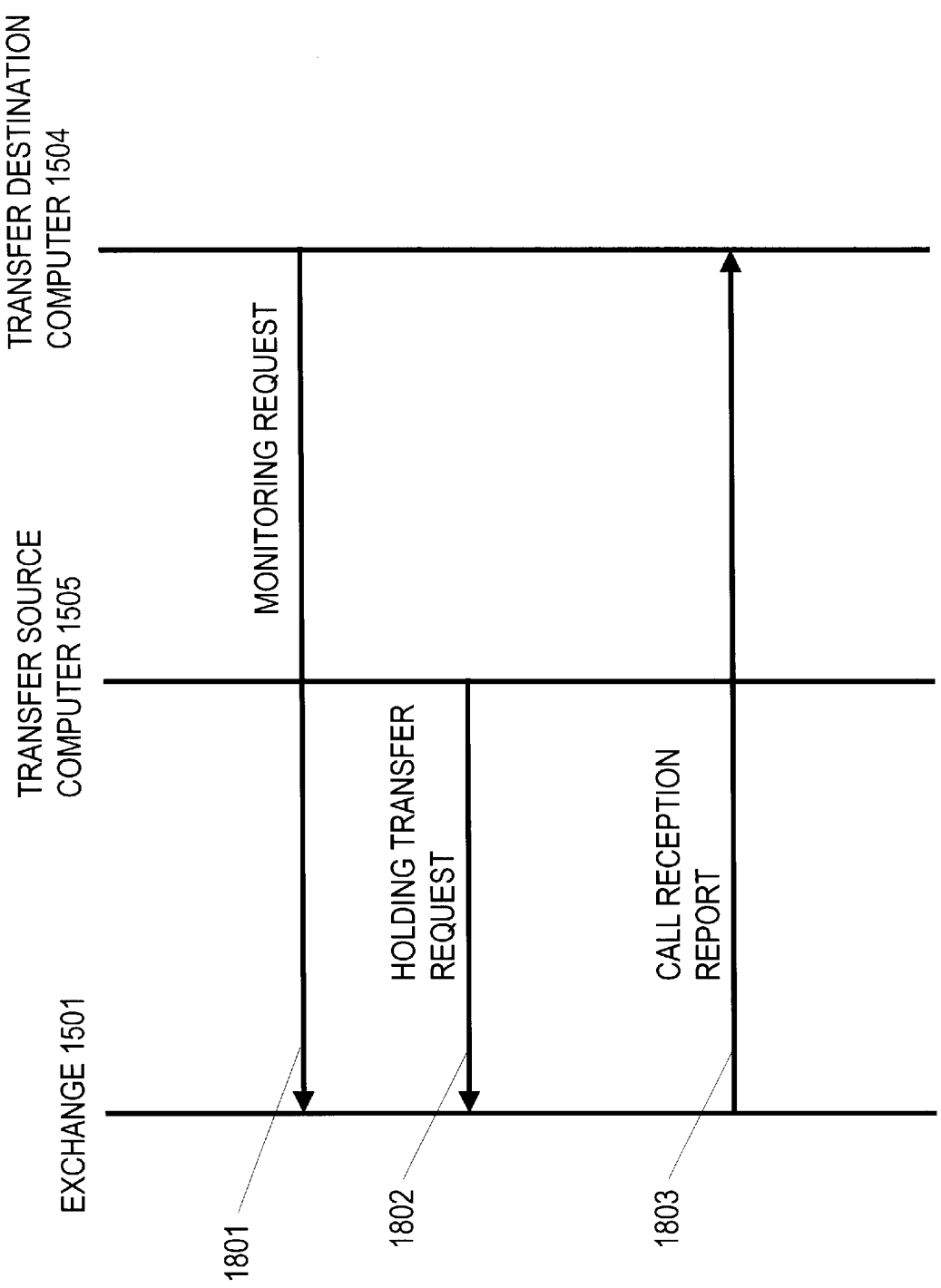
FIG. 18 is a signal diagram showing the operation of the communication system according to the fourth embodiment.

Next, the operation of the communication system according to the fourth embodiment will be described with reference to FIGS. 18 and 19A–19C. FIG. 18 is an example signal diagram of the communication system according to the fourth embodiment, and FIGS. 19A–19C are example formats of signals shown in FIG. 18.

In FIG. 18, as an initial setting operation between the transfer destination computer 1504 and the exchange 1501, the transfer destination computer 1504 sends a monitoring request 1801 to the exchange 1501. For example, as shown in FIG. 19A, the monitoring request 1801 has a format in which an identifier indicating that the signal is a monitoring request is accommodated in field 1901 and information such as a telephone number for designating the transfer destination telephone 1502 as a telephone to be monitored is accommodated in field 1902. After reception of the monitoring request 1801, when a variation occurs in the state of the transfer destination telephone 1502 (e.g., a call has arrived or a circuit connection has been established), the exchange 1501 sends the transfer destination computer 1504 a call reception report or a circuit connection report each of which is a state variation report. For example, the monitoring request 1801 is sent at a time point when the transfer destination computer 1504 is activated. Actually, the monitoring request 1801 is generated by the circuit control processing means 1604 of the transfer destination computer 1504 and sent from the entire computer control means 1605 via the exchange communication means 1602 and the communication channel 1509. In the exchange 1501, the computer control communication means 1701 outputs the received monitoring request 1801 to the monitoring request managing means 1704. Thereafter, the monitoring request managing means 1704 performs management of reporting a variation in the state of the transfer destination computer 1504 to the transfer destination computer 1504 when it occurs.

In FIG. 18, reference numerals 1802 and 1803 denote signals that are sent to effect an operation that in a state that the transfer source telephone 1503 is circuit-connected to an arbitrary telephone the circuit of the transfer source telephone 1503 is held and then transfer is made to the transfer destination telephone 1502. In the fourth embodiment, a transfer operation from the transfer source telephone 1503 to the transfer destination telephone 1502 is realized in such a manner that the transfer source computer 1505 sends a holding transfer request 1802 to the exchange 1501.

Figures 19A, 19B, 19C:
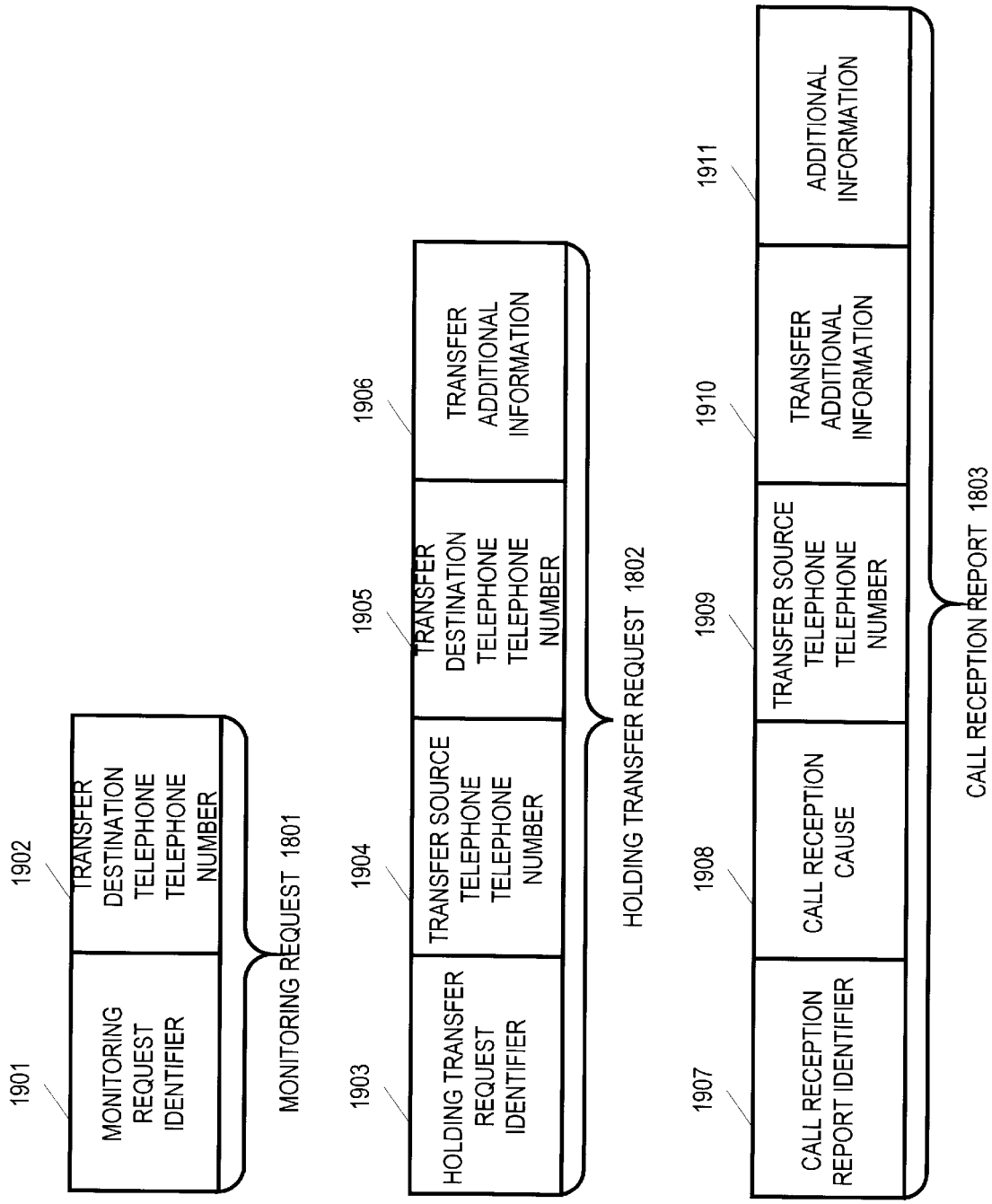
FIGS. 19A–19C are format diagrams of a monitoring request, a holding transfer request, and a call reception report, respectively, used in the communication system according to the fourth embodiment.

For example, as shown in FIG. 19B, the holding transfer request 1802 has a format in which an identifier indicating that the signal is a holding transfer request is accommodated in field 1903, information such as a telephone number designating the transfer source telephone 1503 as the telephone of a transfer source is accommodated in field 1904, information such as a telephone number designating the transfer destination telephone 1502 as the telephone of a transfer destination is accommodated in field 1905, and transfer additional information to be added at the time of a transfer is accommodated in field 1906. The transfer additional information will be described later in detail.

Actually, the holding transfer request 1802 is generated by the circuit control processing means 1604a of the transfer source computer 1505 and sent to the exchange 1501 from the entire computer control means 1605a via the exchange communication means 1602a and the communication channel 1510. In the exchange 1501, the entire exchange control means 1705 receives the holding transfer request 1802 via the computer control communication means 1701 and performs two operations. As the first operation, the entire exchange control means 1705 outputs the received holding transfer request 1802 to the holding transfer request managing means 1706 and has it manage the holding transfer request 1802. As the second operation, the entire exchange control means 1705 controls the circuit switching control means 1702 to have it hold the circuit connected to the transfer source telephone 1503 and call the transfer destination telephone 1502.

As a result, the transfer destination telephone 1502 is rendered in a call reception state. At this time, the entire exchange control means 1705 inquires of the monitoring request managing means 1704 and acquires information that the computer to which to report a variation in the state of the transfer destination telephone 1502 when it occurs is the transfer destination computer 1504. Then, the entire exchange control means 1705 causes the holding transfer request managing means 1706 to generate a call reception report 1803 and sends it to the transfer destination computer 1504 via the computer control communication means 1701.

For example, as shown in FIG. 19C, the call reception report 1803 has a format in which an identifier indicating that the signal is a call reception report is accommodated in field 1907, information indicating the cause of call reception such as a holding transfer is accommodated in field 1908, information such as a telephone number designating the transfer source telephone 1503 as the telephone of a transfer source is accommodated in field 1909, the same information as accommodated in field 1906 of the holding transfer request 1802 is accommodated in field 1910, and other additional information is accommodated in field 1911. An example of the additional information to be accommodated in field 1911 is the telephone number of a caller who has called the transfer source telephone number 1503.

In the transfer destination computer 1504, the call reception report 1803 received by the exchange communication means 1602 is supplied to the circuit control processing means 1604 via the entire computer control means 1605. The circuit control processing means 1604 processes the received call reception report 1803, that is, executes a process of informing the transfer destination telephone 1502 of the call reception by using the computer user interface means 1603 and also executes a process based on the transfer additional information accommodated in field 1910.

The transfer additional information, which has not been described above, will be described below in detail by using a specific example. It is assumed that the information server 1506 is a database server that stores product information.

In the fourth embodiment, the user of the transfer source telephone 1503 also uses the transfer source computer 1505 while making a call with the transfer source telephone 1503. For example, the information server 1506 and the transfer source computer 1505 communicate with each other and product information stored in the information server 1506 is displayed in the transfer source computer 1505.

In this case, when the transfer source computer 1505 sends out a holding transfer request 1802 to transfer a call to the transfer source telephone 1505 to the transfer destination telephone 1504, information necessary to acquire the product information that was displayed in the transfer source computer 1505 from the information server 1506, such as a storage location in the information server 1506 of the product information concerned, is caused to be accommodated in field 1906 as transfer additional information.

As a result, the information necessary to acquire the product information that was displayed in the transfer source computer 1505 from the information server 1506 comes to be accommodated in field 1910 of a call reception report 1803 that will be received by the transfer destination computer 1504. Therefore, the transfer destination computer 1504 can acquire the information necessary to acquire the product information that was displayed in the transfer source computer 1505 from the information server 1506. Based on this transfer additional information, the circuit control processing means 1604 can display, in the transfer destination computer 1504, the product information stored in the information server 1506.

The transfer additional information is not limited to information of the information server 1506 as described above, and may be information held by only the transfer source computer 1505. For example, a document produced during a call by the user of the transfer source telephone 1503 by using the transfer source computer 1505 can be made transfer additional information. In this case, the transfer destination computer 1504 can display the document thus produced. That is, by employing information of a process that has been executed by the transfer source computer 1505 as transfer additional information, it is possible to continue to execute the process by using the transfer destination computer 1504.

Further, for example, an operation can easily be realized that by using transfer additional information, the transfer destination computer 1504 acquires information from the transfer source computer 1505 via the information server 1506 and the information server 1506 performs authentication for such information acquisition. This will be explained below for a case where the transfer source computer 1505 stores information in the information server 1506 before sending a holding transfer request 1802. In this case, an information identifier generating means is provided in the information server 1506. When the transfer source computer 1505 has stored information in the information server 1506, the information identifier generating means generates an information identifier, which is sent to the transfer source computer 1505. The transfer source computer 1505 causes the address of the information server 1506 and the information identifier generated by the information server 1506 to be accommodated in a holding transfer request 1802 as transfer additional information. As a result, the transfer destination computer 1504 that has acquired the transfer additional information can send, by using the address of the information server 1506, a request for acquiring information from the information server 1506. If the transfer destination computer 1504 also sends the information identifier at this time, the information server 1506 can not only judge, by collating the information identifier, whether it is proper to send information to the transfer destination computer 1504 but also determine the information to be sent. For example, the use of such an information identifier enables a control that even in a case where usually the transfer destination computer 1504 is not permitted to acquire information from the information server 1506, the transfer destination computer 1504 can acquire only information that is associated with an information identifier from the information server 1506.

As described above, the communication system according to the fourth embodiment is provided with an information server that stores information; a transfer source telephone; a transfer destination telephone; a transfer source computer that sends out a holding transfer request that is a request for transferring a call from the transfer source telephone to the transfer destination telephone and includes transfer additional information; an exchange that transfers the call from the transfer source telephone to the transfer destination telephone and sends out a call reception report including the transfer additional information upon reception of the holding transfer request; and a transfer destination computer that executes a process based on the transfer additional information included in the call reception report upon reception of the call reception report.

With the above configuration, the invention provides the following six advantages.

First, since information of a process that has been executed by the transfer source computer can be transmitted to the transfer destination computer as transfer additional information, the transfer destination computer can execute, as continued work, a process relating to the process that has been executed by the transfer source computer. For example, the transfer destination computer can acquire the information of the information server that has been acquired by the transfer source computer.

Second, since information of a process that has been executed by the transfer source computer can be transmitted to the transfer destination computer via the exchange as transfer additional information, it is not necessary for the transfer source computer and the transfer destination computer to directly communicate with each other. For example, where a person working as a receptionist uses a transfer source computer and a person working for product development uses a transfer destination computer, the transfer source computer and the transfer destination computer may not be able to communicate with each other for a network-related reason. The invention is very advantageous in such a situation.

Third, since information of a process that has been executed by the transfer source computer can be transmitted to the transfer destination computer via the exchange as transfer additional information, it is not necessary for the transfer source computer to manage a corresponding relationship between the transfer destination telephone and the transfer destination computer; the transfer source computer can transmit transfer additional information to the transfer destination computer even if it does not recognize address information or the like of the transfer destination computer as long as the telephone number of the transfer destination telephone is accommodated in a holding transfer request.

Fourth, since the transfer destination computer sends a transfer destination telephone monitoring request to the exchange, a corresponding relationship between the transfer destination telephone and the transfer destination computer can be managed by using the monitoring request and transfer additional information can be transmitted to the transfer destination computer. That is, the exchange is required to manage only the corresponding relationship between a telephone and a computer that relates to a monitoring request.

Fifthly, by causing the address of the information server and an information identifier generated by the information server to be accommodated in a holding transfer request as transfer additional information, information can be transmitted from the transfer source computer to the transfer destination computer via the information server. In particular, the load on the exchange can be decreased in transmitting a large amount of information.

Sixthly, by causing the address of the information server and an information identifier as transfer additional information in a holding transfer request as transfer additional information, the information server can perform authentication as to whether it is proper to output information when the transfer destination computer accesses the information server.

Although the fourth embodiment is directed to transfer, it is easily understood that the advantages of the invention can be obtained broadly in cases where information is transmitted from the transfer source computer 1505 to the transfer destination computer 1504, such as a case where the transfer source telephone 1503 calls the transfer destination telephone 1502.

In the fourth embodiment, transfer additional information is incorporated in a call reception report 1803 that is sent from the exchange 1501 when a call directed to the transfer destination telephone 1502 has occurred. However, an operation can easily be realized that the exchange 1501 sends out a report of connection between the transfer source telephone 1503 and the transfer destination telephone 1502 that includes transfer additional information when the transfer destination telephone 1502 has responded to a call and has thereby been circuit-connected to the transfer source telephone 1503. An operation can also be realized easily that when a telephone that has called the transfer source telephone 1503 is circuit-connected to the transfer destination telephone 1502, the exchange 1501 sends out a report of the connection between those telephones that includes transfer additional information.

In the fourth embodiment, the transfer source computer 1505 and the transfer destination computer 1504 directly communicate with the exchange 1501. A configuration and operation can easily be realized in which a communication channel for connecting the transfer source computer 1505 and the transfer source telephone 1503 is provided and a communication between the transfer source computer 1505 and the exchange 1501 is performed via the transfer source telephone 1503. In this case, the communication channel may be an RS232C channel, for example. The same thing applies to the relationship between the transfer destination telephone 1502 and the transfer destination computer 1504. Further, it is easily understood that the scheme in which the exchange and a computer directly communicate with each other and the scheme in which they communicate with each other via a telephone can exist in mixed form.

Embodiment 5

A communication system according to a fifth embodiment of the invention will be described below.

First, the configuration of a communication system according to the fifth embodiment will be described with reference to FIG. 20, which is a block diagram showing its example configuration.

Figure 20:
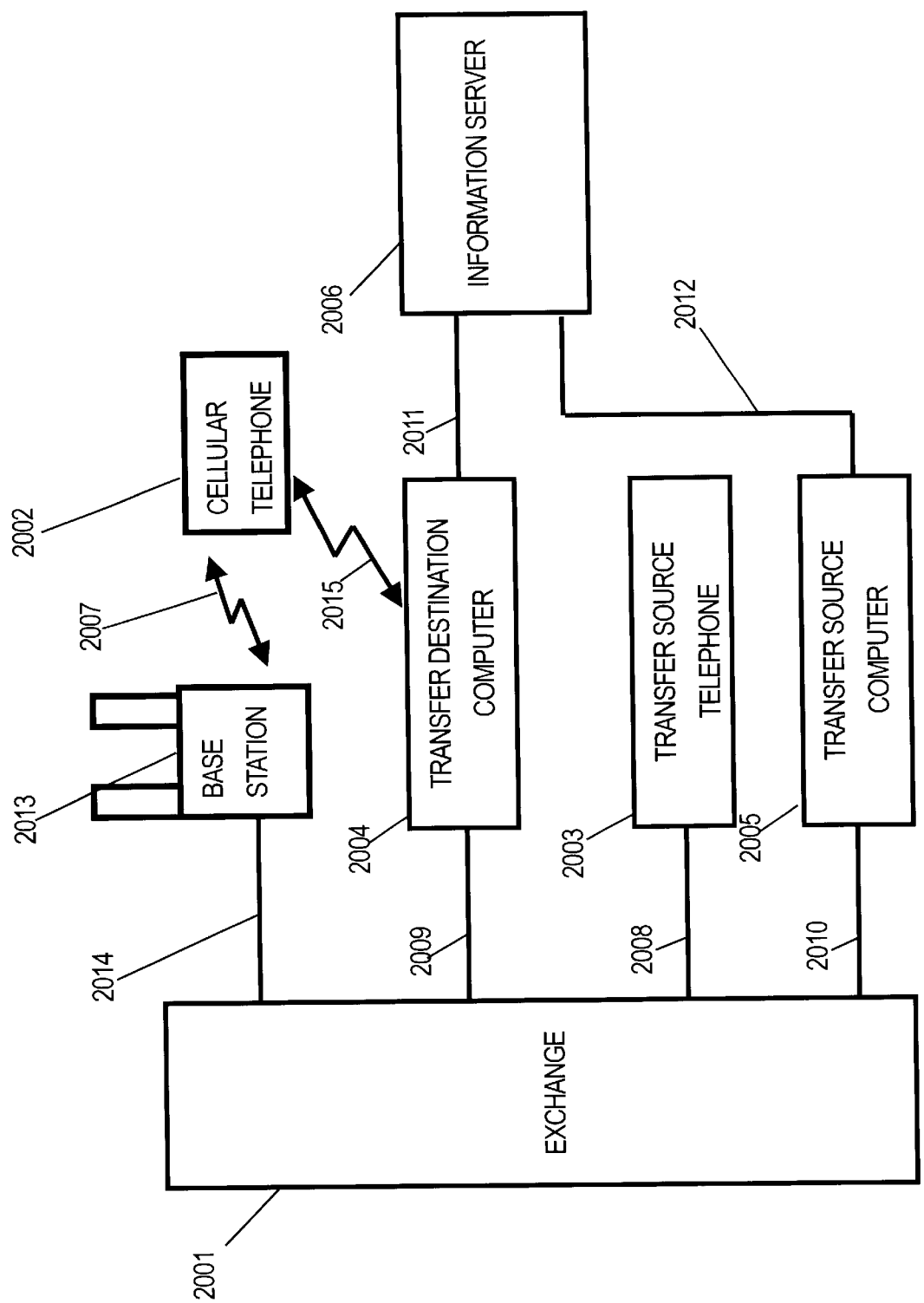
FIG. 20 is a block diagram showing a configuration of a communication system according to a fifth embodiment of the invention.

Components 2001–2012 shown in FIG. 20 are the same in configuration as the components 1501–1512 shown in FIG. 15 (fourth embodiment) except for the following two points. First, in FIG. 20, the transfer destination telephone 1502 in FIG. 15 is replaced by a cellular telephone 2002. Second, in FIG. 20, the communication channel 1507 between the exchange 1501 and the transfer destination telephone 1502 is replaced partially by a radio communication channel 2007 between a base station 2013 (described later) and the cellular telephone 2002. Like the cellular telephone 103 described in the first embodiment, the cellular telephone 2002 has a function of communicating with a computer by faint radio waves.

In FIG. 20, reference numeral 2013 denotes a base station that is connected to an exchange 2001. Reference numeral 2014 denotes a communication channel between the exchange 2001 and the base station 2013. Reference numeral 2015 denotes a communication channel by faint radio waves between the cellular telephone 2002 and a transfer destination computer 2004.

A detailed configuration of the transfer destination computer 2004 will be described below with reference to FIG. 21, which is a block diagram showing its example configuration.

Figure 21:
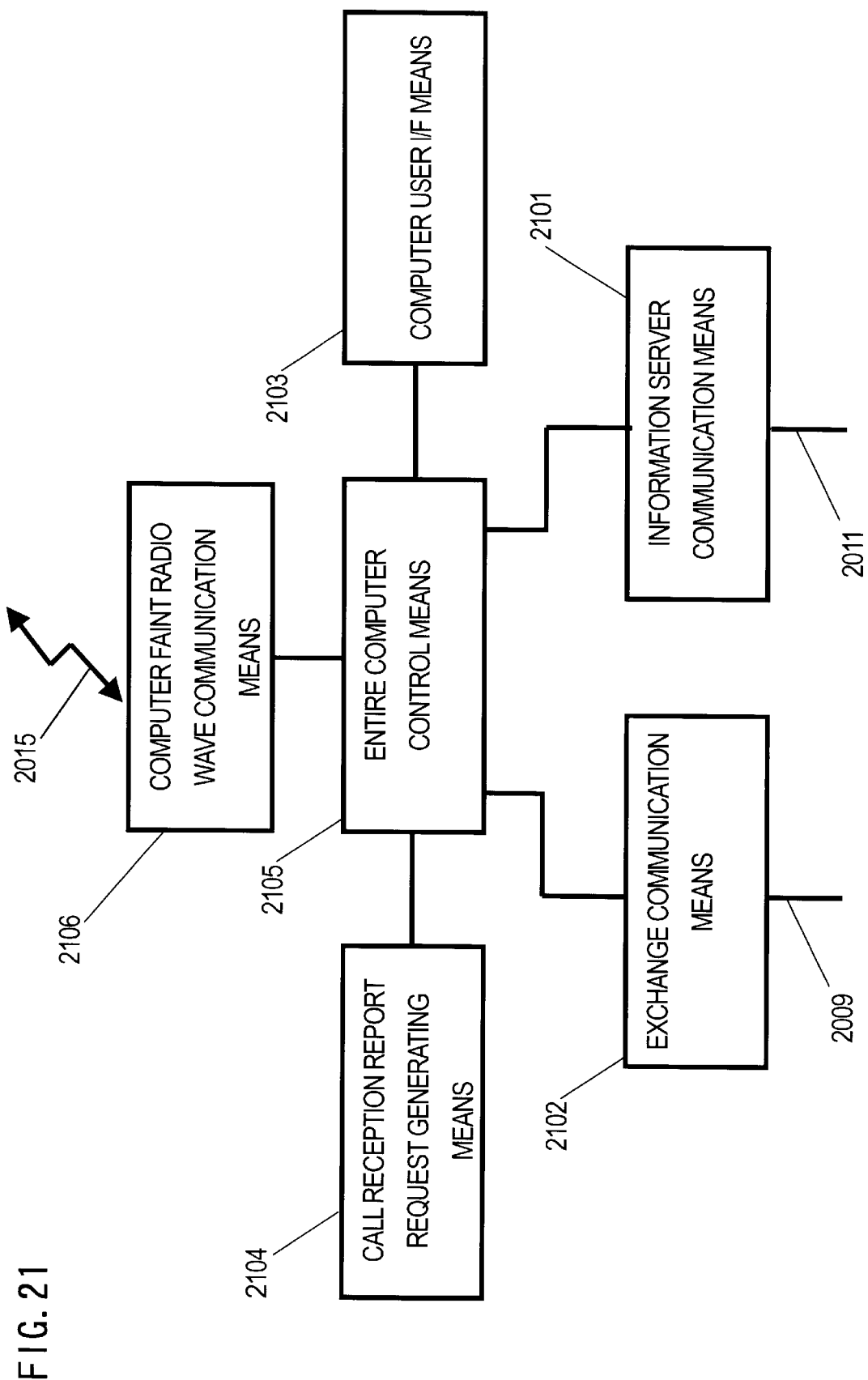
FIG. 21 is a block diagram showing a configuration of a transfer destination computer in the communication system of FIG. 20.

Means 2101–2105 shown in FIG. 21 are the same in configuration as the means 1601–1605 shown in FIG. 16 (fourth embodiment) except for the following one point. In FIG. 21, the circuit control processing means 1604 in FIG. 16 is replaced by a call reception report request generating means 2104 for generating a request to be sent to the exchange 2001 to acquire additional information that is associated with a received call. Reference numeral 2106 denotes a computer faint radio wave communication means having the same function as the computer faint radio wave communication means 301 shown in FIG. 3 (first embodiment).

A detailed configuration of the exchange 2001 will be described below with reference to FIG. 22, which is a block diagram showing its example configuration.

Figure 22:
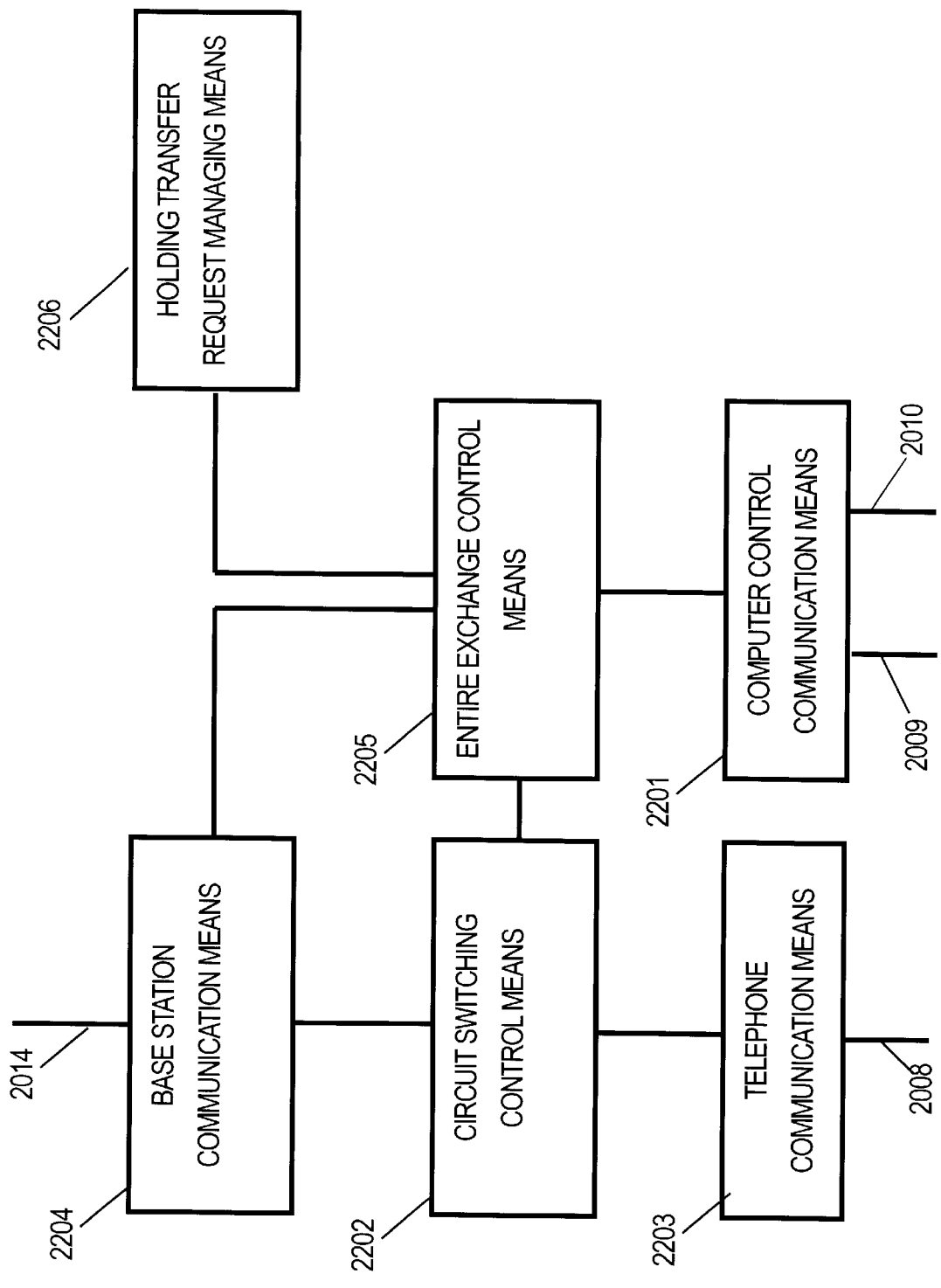
FIG. 22 is a block diagram showing a configuration of an exchange in the communication system of FIG. 20.

Means 2201–2203 and 2205–2206 shown in FIG. 22 are the same in configuration as the means 1701–1703 and 1705–1706 shown in FIG. 17 (fourth embodiment). Reference numeral 2204 denotes a base station communication means having the same function as the base station communication means 401 shown in FIG. 4 (first embodiment). The monitoring request managing means 1704 shown in FIG. 17 (fourth embodiment) is not used in the fifth embodiment.

The cellular telephone 2002 has the same detailed configuration as described in the first embodiment in connection with FIG. 2, and the transfer source computer 2005 has the same detailed configuration as described in the fourth embodiment in connection with FIG. 16.

Figure 23:
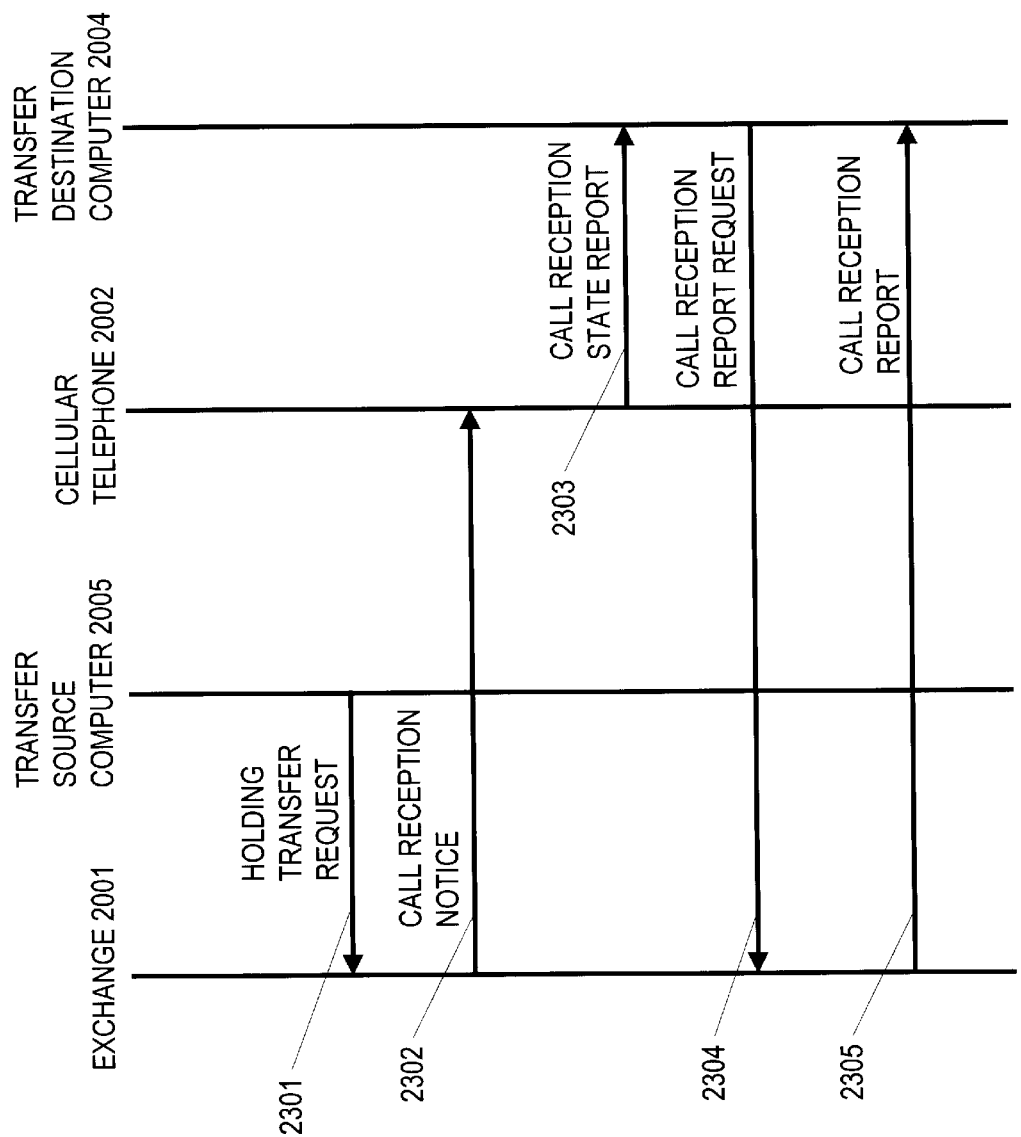
FIG. 23 is a signal diagram showing the operation of the communication system according to the fifth embodiment.
Figure 24:
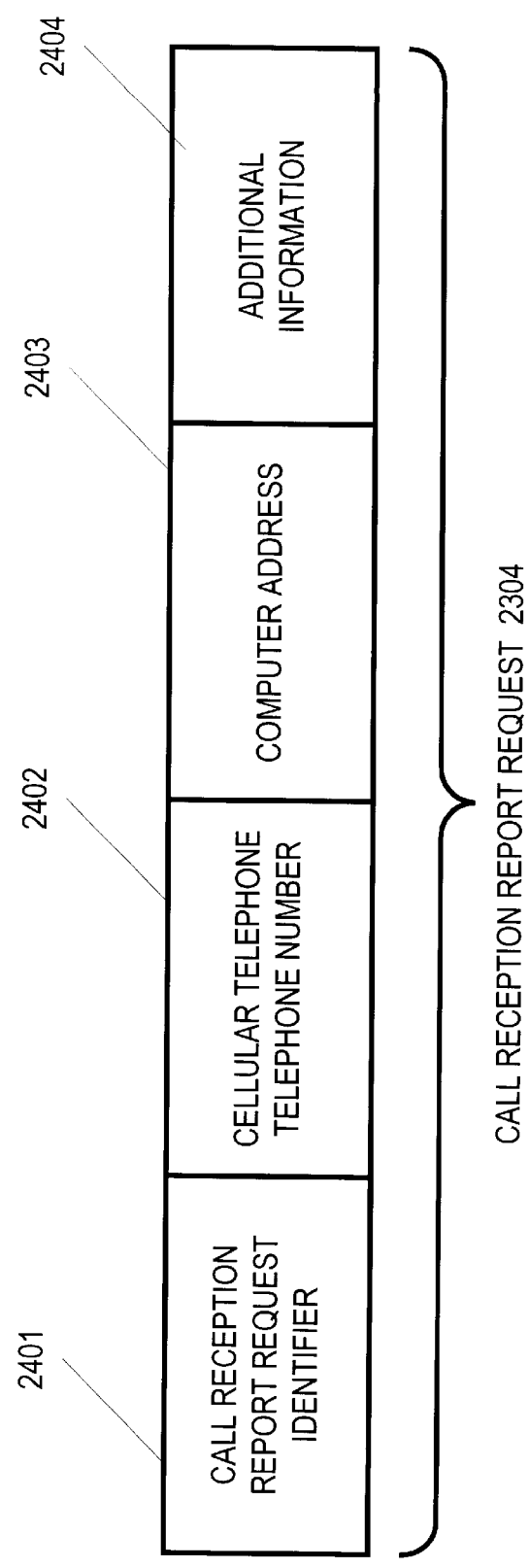
FIG. 24 is a format diagram of a call reception report request used in the communication system according to the fifth embodiment.

The operation of the communication system according to the fifth embodiment will be described below with reference to FIGS. 23 and 24. FIG. 23 is an example signal diagram of the communication system according to the fifth embodiment, and FIG. 24 shows an example format of a signal shown in the signal diagram of FIG. 23.

First, differences in operation between the fifth embodiment and the first and fourth embodiments will be described briefly. In the fourth embodiment, the telephone of a transfer destination is the transfer destination telephone 1502 and the computer that is used when a call to the telephone of the transfer destination has occurred is the transfer destination computer 1504. Therefore, to acquire a call reception report 1803 (described in the fourth embodiment), the transfer destination computer 1504 can send a monitoring request for the transfer destination telephone 1502 to the exchange 1501 before a call to the transfer destination telephone 1502 occurs, for example, at the time of an initial operation. However, in the fifth embodiment, the telephone of a transfer destination is the cellular telephone 2002 having the same function as the cellular telephone 103 in the first embodiment and the computer to be used when a call to the cellular telephone 2002 occurs is determined to be the transfer destination computer 2004 by using faint radio waves. Therefore, the transfer destination computer 2004 cannot send a monitoring request for the cellular telephone 2002 to the exchange 2001 before a call to the cellular telephone 2002 occurs.

In view of the above, in the fifth embodiment, the transfer destination computer 2004 receives a call reception state report from the cellular telephone 2002 and then sends a call reception report request for acquiring a call reception report 1803 (described in the fourth embodiment) to the exchange 2001. This is similar to the operation in the first embodiment in which the computer 104 receives a call reception state report from the cellular telephone 103 and then sends a reception call conversion request to the exchange 101.

The operation of the communication system according to the fifth embodiment will be described below.

In FIG. 23, reference numeral 2301 denotes a signal that is sent when in a state that the transfer source telephone 2003 is circuit-connected to an arbitrary telephone the circuit of the transfer source telephone 2003 is held and then transfer is made to the transfer destination telephone 2002. The holding transfer request 2301 should have a format similar to the one shown in FIG. 19 (fourth embodiment) and accommodates transfer additional information. An operation performed by the transfer source computer 2005 in sending a holding transfer request 2301 and an operation performed by the exchange 2001 when receiving a holding transfer request 2301 are similar to the corresponding operations in the fourth embodiment.

In the exchange 2001, when receiving a holding transfer request 2301, the entire exchange control means 2205 performs two operations. As the first operation, the entire exchange control means 2205 outputs the received holding transfer request 2301 to the holding transfer request managing means 2206 and has it manage the holding transfer request 2301. As the second operation, the entire exchange control means 2205 controls the circuit switching control means 2202 to have it hold the circuit that is connected to the transfer source telephone 2003 and perform an operation of calling the cellular telephone 2002. The operation of calling the cellular telephone 2002 is realized in such a manner that a call reception notice 2302 (see FIG. 23) generated by the entire exchange control means 2205 is sent to the cellular telephone 2002 via the base station communication means 2204, the communication channel 2014, the base station 2013, and the communication channel 2007.

When receiving the call reception notice 2302, the cellular telephone 2002 sends a call reception state report 2303 (see FIG. 23) to the transfer destination computer 2004 via the communication channel 2015 by faint radio waves. Operations performed by the cellular telephone 2002 after the reception of the call reception notice 2302 to the sending of the call reception state report 2303 are the same as the corresponding operations of the cellular telephone 103.

In the transfer destination computer 2004, when the computer faint radio wave communication means 2106 has received the call reception state report 2303, the entire computer control means 2105 outputs the call reception state report 2303 to the call reception report request generating means 2104. The call reception report request generating means 2104 generates a call reception report request 2304 for acquiring, from the exchange 2001, a call reception report including the same kind of information as the call reception report 1803 in the fourth embodiment. The entire computer control means 2105 sends the generated call reception report request 2304 (see FIG. 23) to the exchange 2001 via the exchange communication means 2102.

For example, as shown in FIG. 24, the call reception report request 2304 has a format in which an identifier indicating that the signal is a call reception report request is accommodated in field 2401, information such as a telephone number that designates the cellular telephone 2002 as the telephone with which a communication was made by faint radio waves is accommodated in field 2402, an address or the like designating the transfer destination computer 2004 is accommodated in field 2403, and other additional information is accommodated in field 2404.

In the exchange 2001, the computer control communication means 2201 receives the call reception report request 2304 and outputs it to the entire exchange control means 2205. When receiving the call reception report request 2304, the entire exchange control means 2205 acquires, from the holding transfer request managing means 2206, the transfer additional information of the holding transfer request 2301 that is managed by the means 2206, generates a call reception report 2305, and has it sent from the computer control communication means 2201 to the transfer destination computer 2004. In this manner, the call reception report 2305 is sent from the exchange 2001 to the transfer destination computer 2004. The call reception report 2305 includes the same kind of information as the call reception report 1803 in the fourth embodiment.

As a result, by receiving the call reception report 2305, the transfer destination computer 2004 can acquire the transfer additional information that was included in the holding transfer request 2301. Since operations performed by the transfer destination computer 2004 after the acquisition of the transfer additional information, such as an operation of acquiring information from the information server 2006, are the same as the corresponding operations in the fourth embodiment, they are not described here.

As described above, the communication system according to the fifth embodiment is provided with a base station; a cellular telephone that sends out, by faint radio waves, a call reception state report indicating that the cellular telephone has been rendered in a call reception state when receiving a call reception notice indicating call arrival from the base station by a radio communication; a transfer source telephone; a transfer source computer that sends out a holding transfer request that is a request for transferring a call from the transfer source telephone to the cellular telephone and includes transfer additional information; a transfer destination computer that sends out a call reception report request for requesting transmission of a call reception report upon reception of the call reception state report from the cellular telephone by faint radio waves and executes a process based on the transfer additional information included in the call reception report upon reception of the call reception report; and an exchange that performs a process of transferring the call from the- transfer source telephone to the cellular telephone upon reception of the holding transfer request and sends out the call reception report including the transfer additional information upon reception of the call reception report request.

With the above configuration, the invention provides the following four advantages.

First, since the cellular telephone and the transfer destination computer communicate with each other by faint radio waves, the computer to which to send a call reception report including transfer additional information can be determined at the time of reception of a call that is directed to the cellular telephone.

Second, since the transfer destination computer sends a call reception report request to the exchange, it is not necessary for the transfer source computer to send, in advance, a monitoring request (described in the fourth embodiment) to the exchange and it is not necessary for the exchange to manage a corresponding relationship between the cellular telephone and the transfer destination computer.

Third, since the transfer destination computer receives a call reception report including transfer additional information by directly communicating with the exchange, power consumption in the cellular telephone that would otherwise occur to send transfer additional information to the transfer destination computer via the cellular telephone can be saved.

Fourth, since the transfer destination computer receives a call reception report including transfer additional information by directly communicating with the exchange, by increasing the speed communication between the exchange and the transfer destination computer, the direct communication between the exchange and the transfer destination computer can provide a shorter transfer additional information transmission time than sending transfer additional information to the transfer destination computer via the cellular telephone.

Fifthly, the transfer destination computer acquires transfer additional information by communicating with the exchange whereas the cellular telephone sends the transfer destination computer only a call reception state report that reports call arrival. Therefore, it is not necessary to change the communication protocol between the cellular telephone and the exchange even in transmitting information other than transfer additional information.

Although the fifth embodiment is directed to transfer, an operation can easily be realized that the transfer destination computer 2004 sends a call reception report request to the exchange to acquire a report of a call directed to the cellular telephone 2002 not only in the case of transfer but also general cases where a call directed to the cellular telephone 2002 occurs. Therefore, it is easily understood that, for example, the caller telephone number of a telephone that has called the cellular telephone 2002 can be acquired from a call reception report rather than a call reception state report that is sent from the cellular telephone 2002. Similarly, it is easily understood that the transfer destination computer 2004 can acquire information from the information server 2006 based on acquired calling party number information.

In the fifth embodiment, transfer additional information is included in a call reception report 2305 that is sent from the exchange 2001 when a call directed to the cellular telephone 2002 has occurred. However, an operation can easily be realized that when the cellular telephone 2002 has responded to a call and has thereby been circuit-connected to the transfer source telephone 2003, the cellular telephone 2002 sends the transfer destination computer 2004 a connection state report indicating the establishment of the circuit connection by faint radio waves, the transfer destination computer 2004 sends a connection report request to the exchange 2001, and the exchange 2001 sends out a report of the connection between the transfer source telephone 2003 and the cellular telephone 2002 that includes transfer additional information. An operation can also be realized easily that when a telephone that has called the transfer source telephone 2003 is circuit-connected to the cellular telephone 2002, the exchange 2001 sends out a report of the connection between those telephones that includes transfer additional information.

A call by use of the transfer destination computer 2004 can easily be realized in the same manner as described in the first embodiment. In this case, it is easily understood that transfer additional information can be incorporated in the computer call reception notice described in the first embodiment.

An operation of inquiring, when the transfer destination computer 2004 has received a call reception state report from the cellular telephone 2002, by using the computer user interface means 2103, the user of the transfer destination computer 2004 whether he wants to make a voice call by using the transfer destination computer 2004 can easily be realized in the same manner as described in the first embodiment. In this case, it is easily understood that transfer additional information can be acquired from a computer call reception notice that the transfer destination computer 2004 receives after sending a reception call conversion request in the same manner as in the first embodiment when the user has determined to make a voice call by using the transfer destination computer 2004, and from a call reception report that the transfer destination computer 2004 receives after sending a call reception report request as described in the fifth embodiment when the user has determined not to make a voice call by using the transfer destination computer 2004.

It is easily understood that the transfer destination computer 2004 can acquire transfer additional information by incorporating it in a call reception notice 2302 that is sent from the exchange 2001 to the cellular telephone 2002 and adding the transfer additional information included in the call reception notice 2302 to a call reception state report 2303 that is sent from the cellular telephone 2002 to the transfer destination computer 2004.

Embodiment 6

A communication system according to a sixth embodiment of the invention will be described below.

First, the configuration of a communication system according to the sixth embodiment will be described with reference to FIG. 25, which is a block diagram showing its example configuration.

Figure 25:
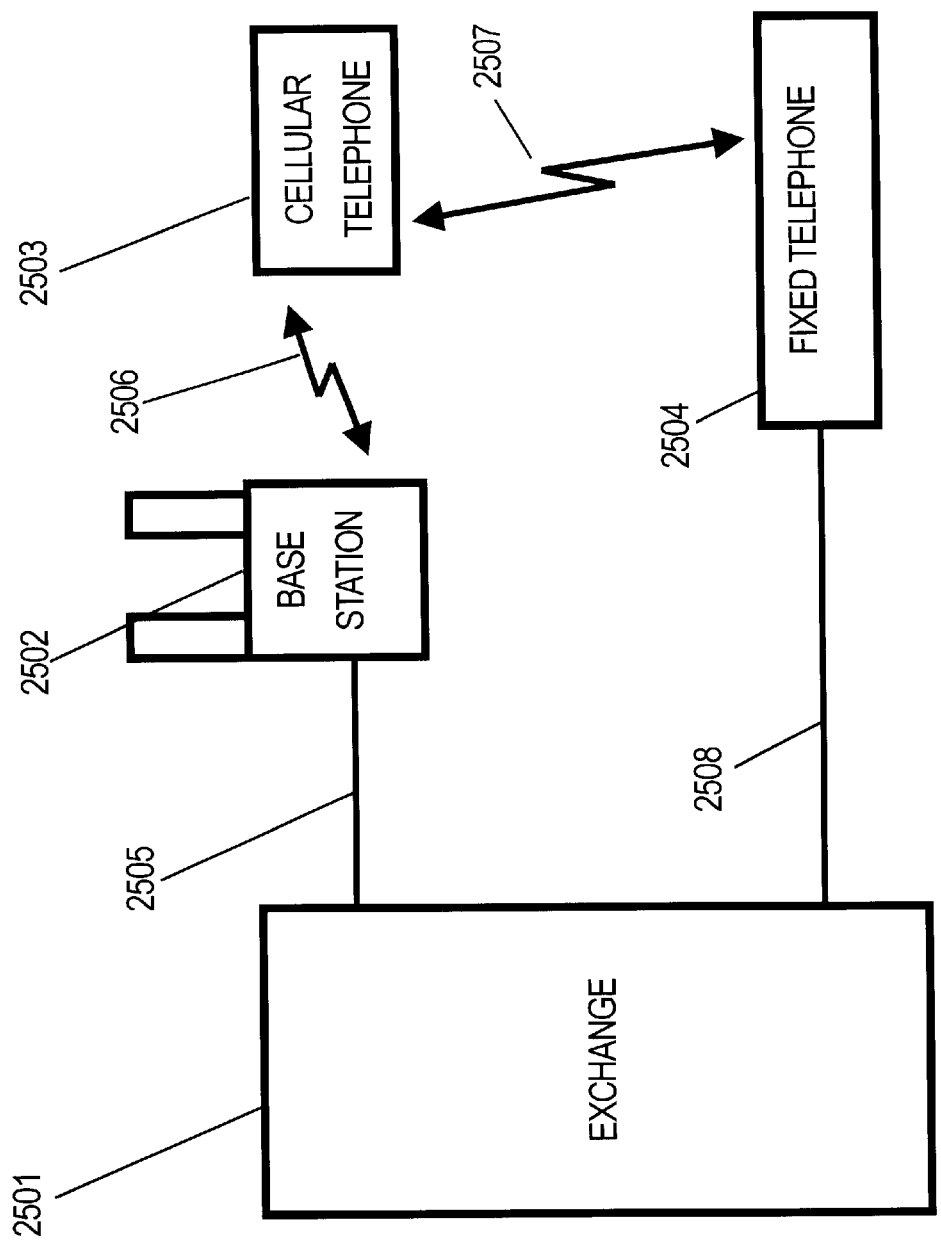
FIG. 25 is a block diagram showing a configuration of a communication system according to a sixth embodiment of the invention.

Components 2501–2503 and 2506 shown in FIG. 25 are the same in configuration as the components 101–103 and 106 shown in FIG. 1 (first embodiment). Reference numeral 2504 denotes a fixed telephone that is connected to the exchange 2501 and communicates with the cellular telephone 2503 by faint radio waves. Reference numeral 2507 denotes a communication channel by faint radio waves between the cellular telephone 2503 and the fixed telephone 2504. Reference numeral 2508 denotes a communication channel between the exchange 2501 and the fixed telephone 2504. The effects of the invention can be obtained even if the communication channel 2508 is implemented by radio rather than a telephone line.

A detailed configuration of the fixed telephone 2504 will be described below with reference to FIG. 26, which is a block diagram showing its example configuration.

Figure 26:
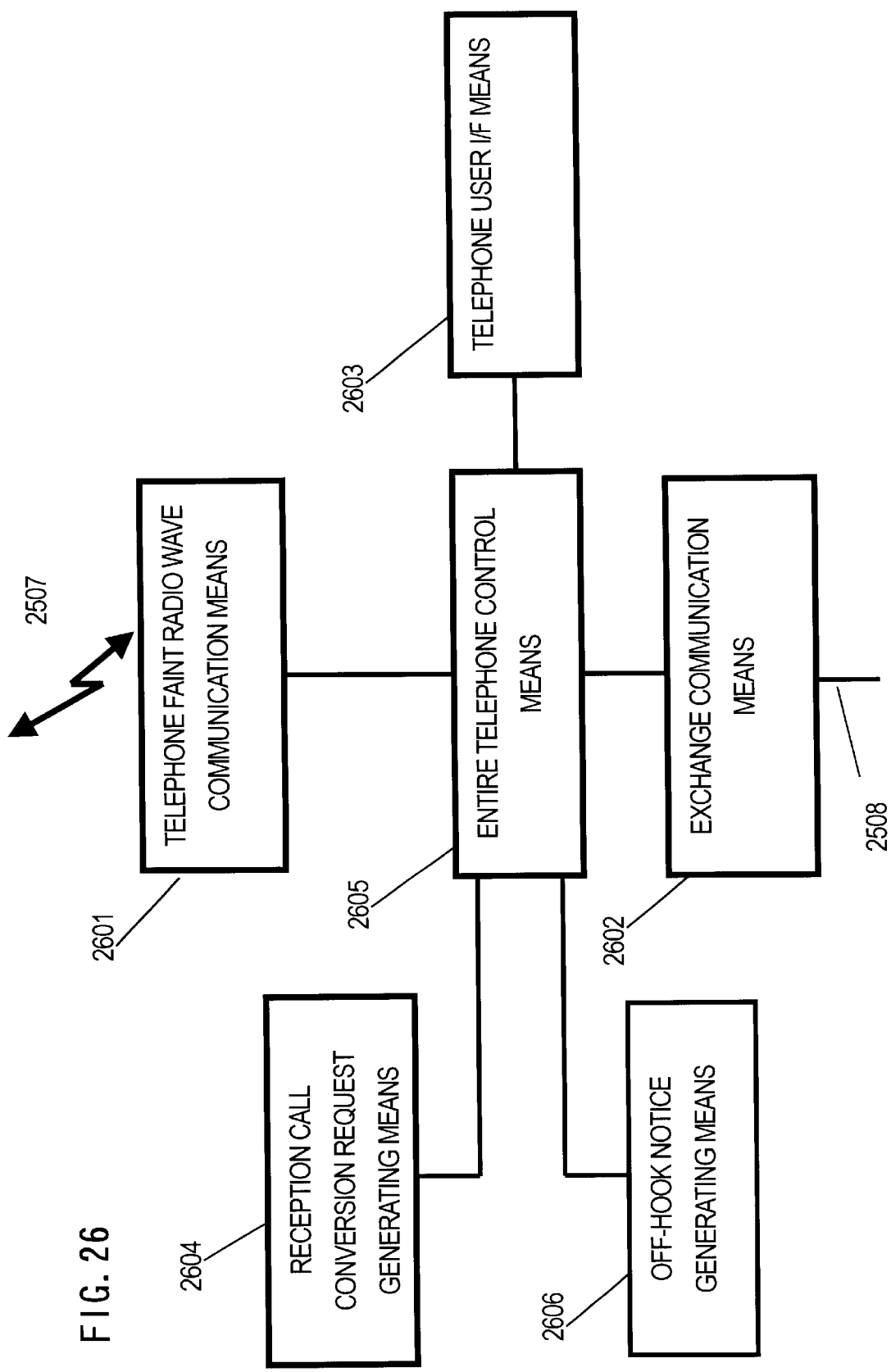
FIG. 26 is a block diagram showing a configuration of a fixed telephone in the communication system of FIG. 25.

In FIG. 26, reference numeral 2601 denotes a telephone faint radio wave communication means for communicating with the cellular telephone 2503 by faint radio waves. Reference numeral 2602 denotes an exchange communication means for communicating with the exchange 2501. Reference numeral 2603 denotes a telephone user interface means as a user interface of the fixed telephone 2504. Reference numeral 2604 denotes a reception call conversion request generating means for generating a request for converting a call to the cellular telephone 2503 to a call to the fixed telephone 2504. Reference numeral 2605 denotes an entire telephone control means for controlling the entire fixed telephone 2504.

A detailed configuration of the exchange 2501 will be described below with reference to FIG. 27, which is a block diagram showing its example configuration.

Figure 27:
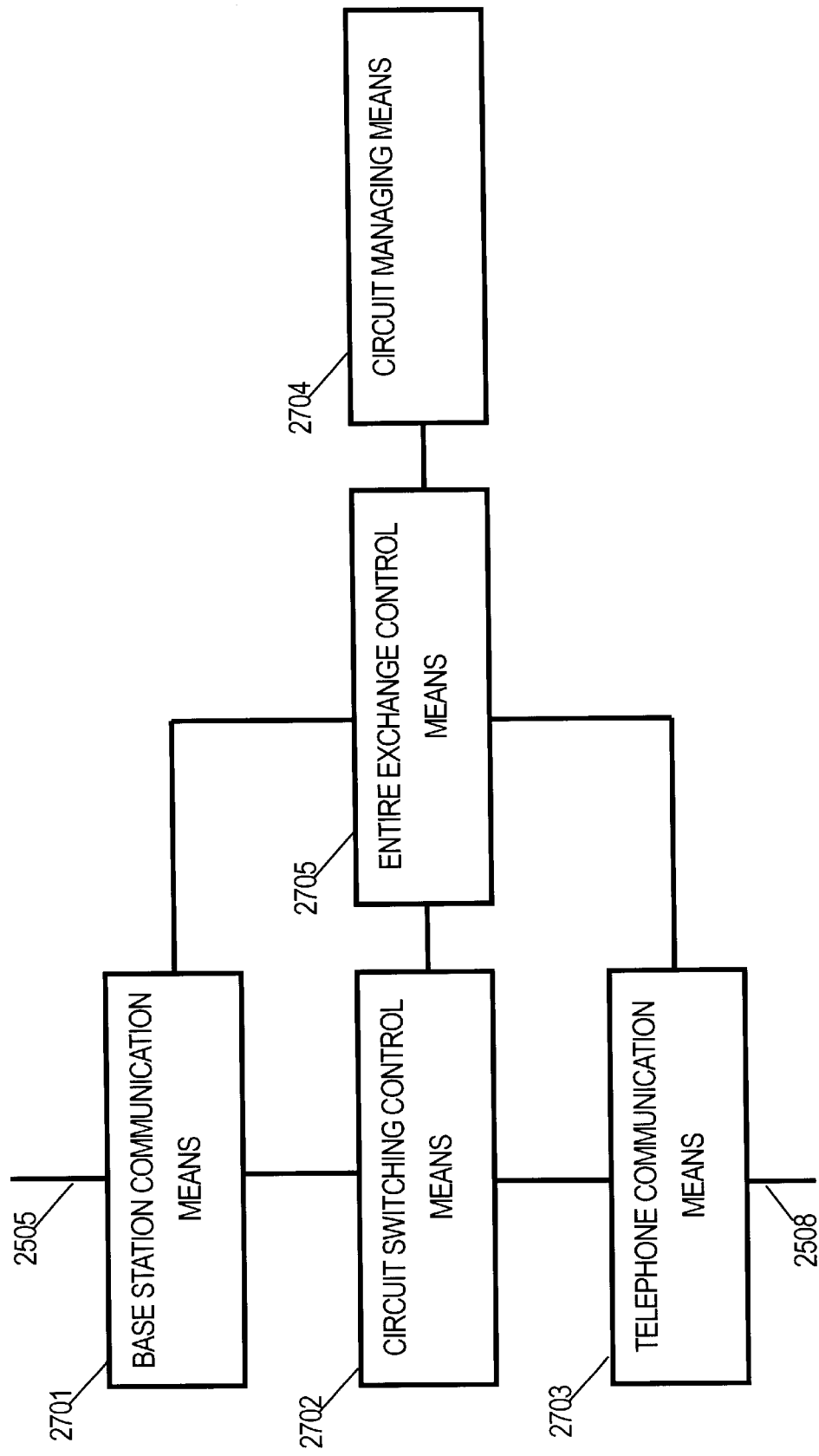
FIG. 27 is a block diagram showing a configuration of an exchange in the communication system of FIG. 25.

Means 2701–2703 and 2705 shown in FIG. 27 are the same in configuration as the means 401–403 and 405 shown in FIG. 4 (first embodiment). Reference numeral 2703 denotes a telephone communication means for communicating with the fixed telephone 2504.

Since the detailed configuration of the cellular telephone 2503 is the same as described in the first embodiment in connection with FIG. 2, it is not described here.

The operation of the communication system according to the sixth embodiment will be described below with reference to FIG. 28, which is its signal diagram.

In the first embodiment, the computer 104 responds to a call that is directed to the cellular telephone 103. In contrast, in the sixth embodiment, the fixed telephone 2504 responds to a call that is directed to the cellular telephone 2503. In this case, there is a possibility that the user of the fixed telephone 2504 performs an off-hook manipulation before the fixed telephone 2504 responds to a call. In the signal diagram of FIG. 28, a measure is taken to allow the fixed telephone 2504 to respond to a call directed to the cellular telephone 2503 even in such a case. In FIG. 28, an off-hook manipulation by the user is shown by a dotted line (reference numeral 2802) to indicate its timing.

When a call reception notice 2801 is sent from the exchange 2501 to the cellular telephone 2503, the cellular telephone 2503 makes a transition to a call reception operation as described in the first embodiment.

At this time, if the user of the fixed telephone 2504 performs an off-hook manipulation (indicated by the dotted line 2802) before the cellular telephone 2503 sends a call reception state report to the fixed telephone 2504 via the communication channel 2507 by faint radio waves, the fixed telephone 2504 sends an off-hook notice 2803 to the exchange 2501. Actually, the telephone user interface means 2603 of the fixed telephone 2504 informs the entire telephone control means 2605 that an off-hook manipulation has been performed and the entire telephone control means 2605 causes the exchange communication means 2602 to send an off-hook notice 2803 that has been generated by the off-hook notice generating means 2606 to the exchange 2501 via the communication channel 2508.

In the exchange 2501, the entire exchange control means 2705 receives the off-hook notice 2803 via the telephone communication means 2703 and the circuit managing means 2704 manages the information that the fixed telephone 2504 has been rendered in an off-hook state.

Then, when the cellular telephone 2503 has sent a call reception state report 2804 to the fixed telephone 2504 via the communication channel 2507 by faint radio waves, the fixed telephone 2504 sends the exchange 2501 a reception call conversion request 2805 for requesting conversion of the call to the cellular telephone 2503 to a call to the fixed telephone 2504. Actually, the entire telephone control means 2605 of the fixed telephone 2504 receives the call reception state report 2804 via the telephone faint radio wave communication means 2601 and outputs it to the reception call conversion request generating means 2604. The entire telephone control means 2605 sends a reception call conversion request 2805 that has been generated by the reception call conversion request generating means 2604 to the exchange 2501 via the communication channel 2508.

In the exchange 2501, the entire exchange control means 2705 receives the reception call conversion request 2805 via the telephone communication means 2703 and inquires the state of the fixed telephone 2504 of the circuit managing means 2704. As a result, based on a judgment that the fixed telephone 2504 is in an off-hook state, the exchange 2501 does not cause the fixed telephone 2504 to perform a call reception operation but controls the circuit switching control means 2702 to have it establish a circuit connection between the fixed telephone 2504 and the telephone that has called the cellular telephone 2503 to thereby render the fixed telephone 2504 in a calling state. As a result, a state that the fixed telephone 2504 can communicate with the telephone that has called the cellular telephone 2503 is established without the fixed telephone's performing a call reception operation.

As described above, in the sixth embodiment, if an off-hook notice 2803 is sent to the exchange 2501 before a reception call conversion request 2805, the fixed telephone 2504 is rendered in a communicable state after the issuance of a reception call conversion request 2805 without performing a call reception operation. The same is true of a case where the fixed telephone 2504 receives a call reception state report 2804 before sending an off-hook notice 2803 to the exchange 2501.

If the fixed telephone 2504 sends a reception call conversion request 2805 to the exchange 2501 before an off-hook notice 2803, the fixed telephone 2504 makes a transition to a call reception operation. This operation is not described in this embodiment because it can easily be understood from the corresponding description in the first embodiment by replacing the computer 104 with the fixed telephone 2504.

Figure 28:
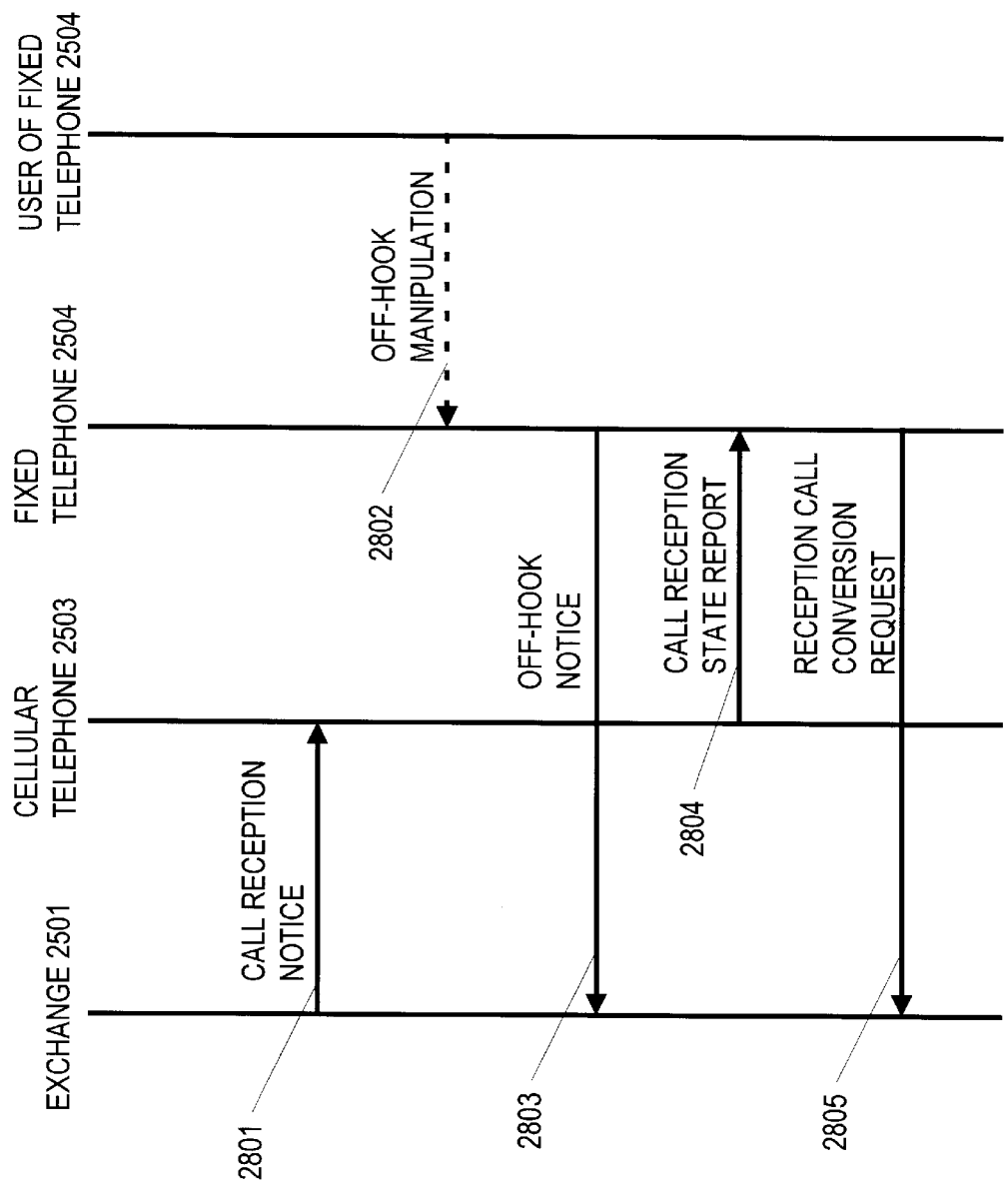
FIG. 28 is a signal diagram showing the operation of the communication system according to the sixth embodiment.

Further, the formats of the respective signals shown in FIG. 28 can easily be understood from the example formats of the corresponding signals described in the first embodiment, they are not described in this embodiment. It can also be understood easily that a number or the like by which the exchange 2501 identifies a telephone, such as a telephone number or a terminal number, may be used as corresponding to the address of the computer 104 in the first embodiment.

As described above, the communication system according to the sixth embodiment is provided with a base station; a cellular telephone that sends out, by faint radio waves, a call reception state report indicating that the cellular telephone has been rendered in a call reception state when receiving a call reception notice indicating call arrival from the base station by a radio communication; a fixed telephone that sends out a reception call conversion request for requesting conversion of the call to the cellular telephone when receiving the call reception state report from the cellular telephone by faint radio waves, and also sends out an off-hook notice for notification of the fact that an off-hook manipulation has been performed; and an exchange that performs a control of converting the call to the cellular telephone to a call to the fixed telephone and causing the fixed telephone to perform a call reception operation if the exchange receives, from the fixed telephone, the reception call conversion request before the off-hook notice, and performs a control of establishing a circuit connection between the fixed telephone and a telephone that has called the cellular telephone to render the fixed telephone in a communicable state if the exchange receives, from the fixed telephone, the reception call conversion request after the off-hook notice.

With the above configuration, the invention provides the following four advantages.

First, since the cellular telephone and the fixed telephone communicate with each other by faint radio waves and the fixed telephone sends a reception call conversion request to the cellular telephone, the fixed telephone, which has a user interface superior to that of the cellular telephone, can respond to and then process a call that was originally directed to the cellular telephone.

Second, the exchange performs a control of converting a call to the cellular telephone to a call to the fixed telephone and causing the fixed telephone to perform a call reception operation if the exchange receives, from the fixed telephone, a reception call conversion request before an off-hook notice, and performs a control of establishing a circuit connection between the fixed telephone and a telephone that has called the cellular telephone to render the fixed telephone in a communicable state if the exchange receives, from the fixed telephone, a reception call conversion request after an off-hook notice. Therefore, the fixed telephone can respond to a call that was originally directed to the cellular telephone even if the user of the fixed telephone performs an off-hook manipulation with early timing.

Third, since the fixed telephone responds to a call that was originally directed to the cellular telephone and processes an actual call, power consumption in the cellular telephone that would otherwise occur to process an actual call can be saved.

Fourth, since the fixed telephone sends a reception call conversion request to the exchange, the fixed telephone to respond to a call directed to the cellular telephone can be determined at the time of call reception.

Although the sixth embodiment is directed to the off-hook timing of the fixed telephone 2504, it is easily understood that this concept can also be applied to the computer 104 in the first embodiment.

An exchange to which both of the fixed telephone 2504 that can respond to a call directed to the cellular telephone 2503 and the computer 104 in the first embodiment can be connected can easily be realized.

It is noted that the basic concepts of the first to sixth embodiments are still effective even in a case where a usual telephone is used instead of the cellular telephone.

Embodiment 7

A communication system according to a seventh embodiment of the invention will be described below.

Figure 29:
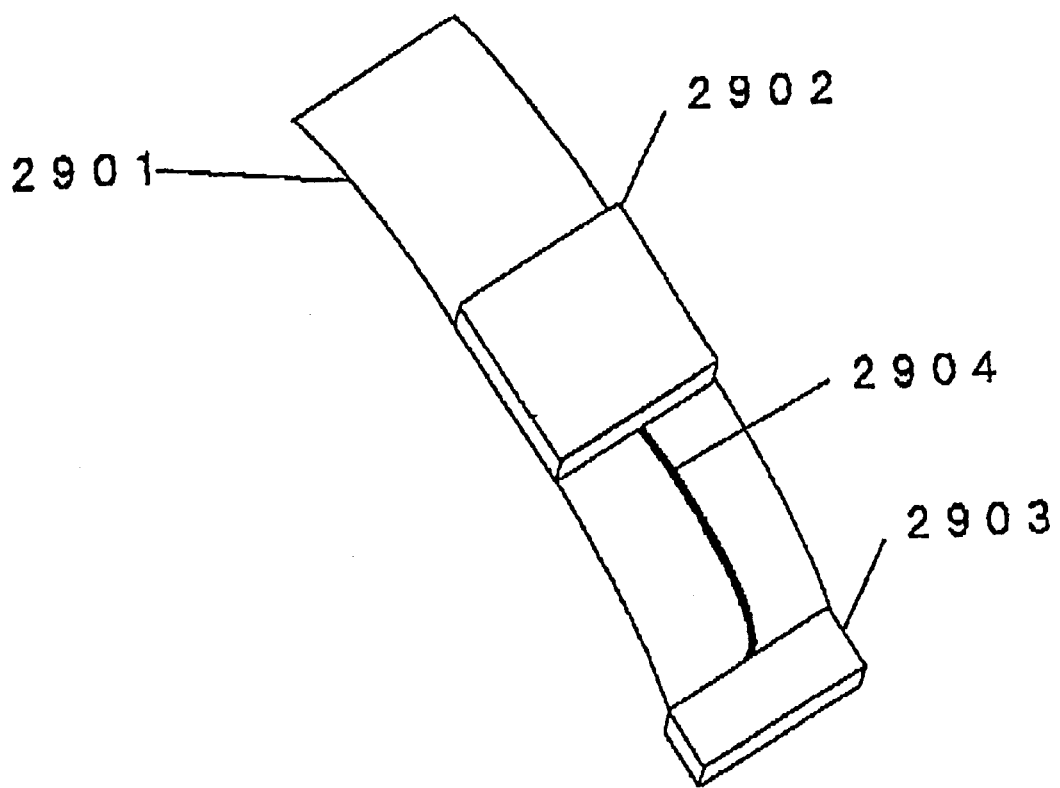
FIGS. 29 and 30 are conceptual diagrams illustrating the shape of a cellular telephone according to a seventh embodiment of the invention.

The seventh embodiment is directed to a case where the cellular telephone in each of the first, second, third, fifth, and sixth embodiments is shaped like a wrist watch. An example of the shape of the cellular telephone will be 10 described below with reference to FIG. 29 by using the cellular telephone 103 of the first embodiment as an example. FIG. 29 shows a general appearance of the cellular telephone 103.

Figure 30:
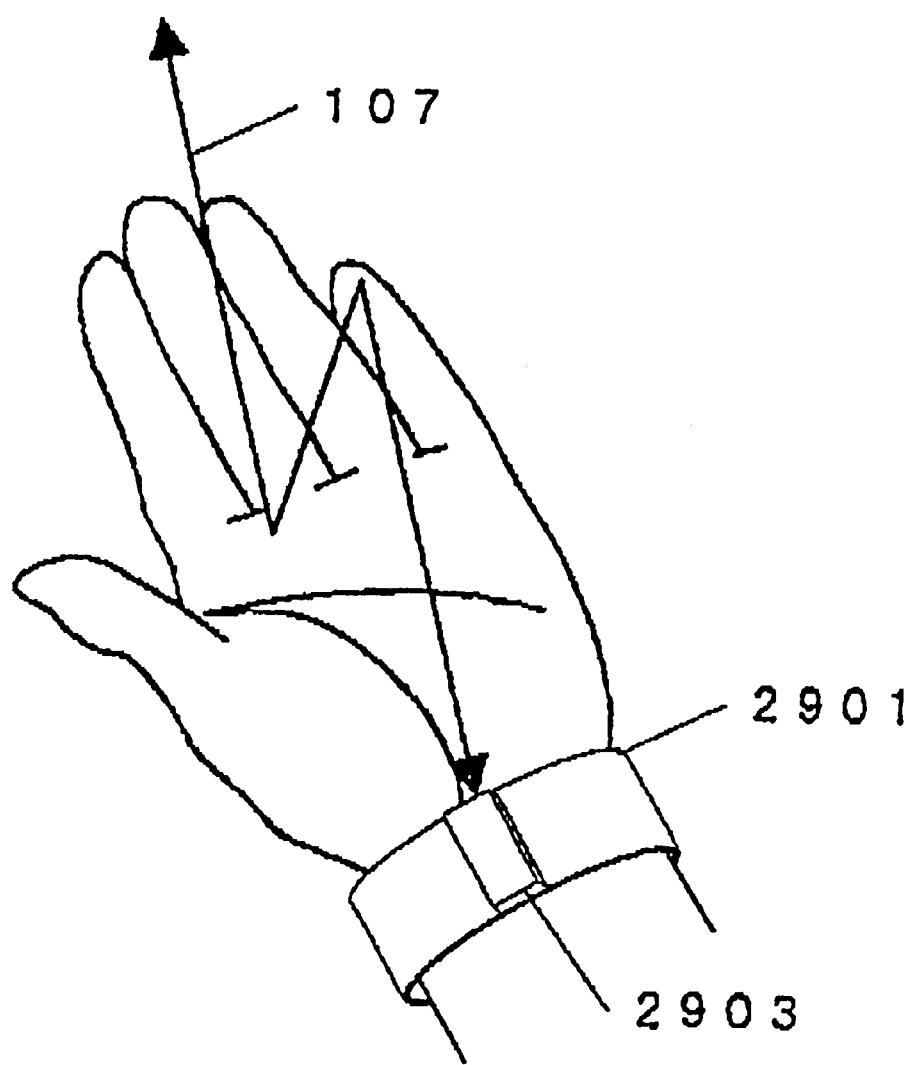

In FIG. 29, reference numeral 2901 denotes a wrist band for mounting the cellular telephone 103 around the wrist of a user like a wrist watch. Reference numeral 2902 denotes a main body that performs display etc. Reference numeral 2903 denotes a faint radio wave communication section that performs a communication by faint radio waves. The faint radio wave communication section 2903 also serves as a connection section that connects the ends of the wrist band 2901 to mount the cellular telephone 103 around the wrist. Reference numeral 2904 denotes a communication connection section that enables a communication between the main body 2902 and the faint radio wave communication section 2903. When the cellular telephone 103 is mounted around the wrist of the user, the main body 2902 is located on the side of the back of his hand and the faint radio wave communication section 2903 is located on the side of the palm of his hand. Next, a description will be made of how the faint radio wave communication section 2903 is positioned when the cellular telephone 103 is mounted around the wrist of the user like a wrist watch. FIG. 30 shows a general appearance of the cellular telephone 103 mounted around the wrist of the user.

As shown in FIG. 30, when the cellular telephone 103 is mounted around the wrist of the user like a wrist watch, the faint radio wave communication section 2903 is located on the side of the palm of his hand. Faint radio waves are emitted from the faint radio wave communication section 2903 in the direction from the wrist to the fingers of the user. The communication channel 107 by faint radio waves between the cellular telephone 103 and the computer 104 shown in FIG. 1 (first embodiment) is also indicated by reference numeral 107 in FIG. 30.

A corresponding relationship between the sections 2901–2904 and the means in the detailed configuration of the cellular telephone 103 described in the first embodiment in connection with FIG. 2 will be described below. The main body 2902 is constituted of the radio communication means 201, the cellular telephone user interface means 203, the call reception state report generating means 204, and the entire cellular telephone control means 205 shown in FIG. 2. The faint radio wave communication means 2903 corresponds to the cellular telephone faint radio wave communication means 202. The communication connection section corresponds to the communication channel 206.

Figure 31:
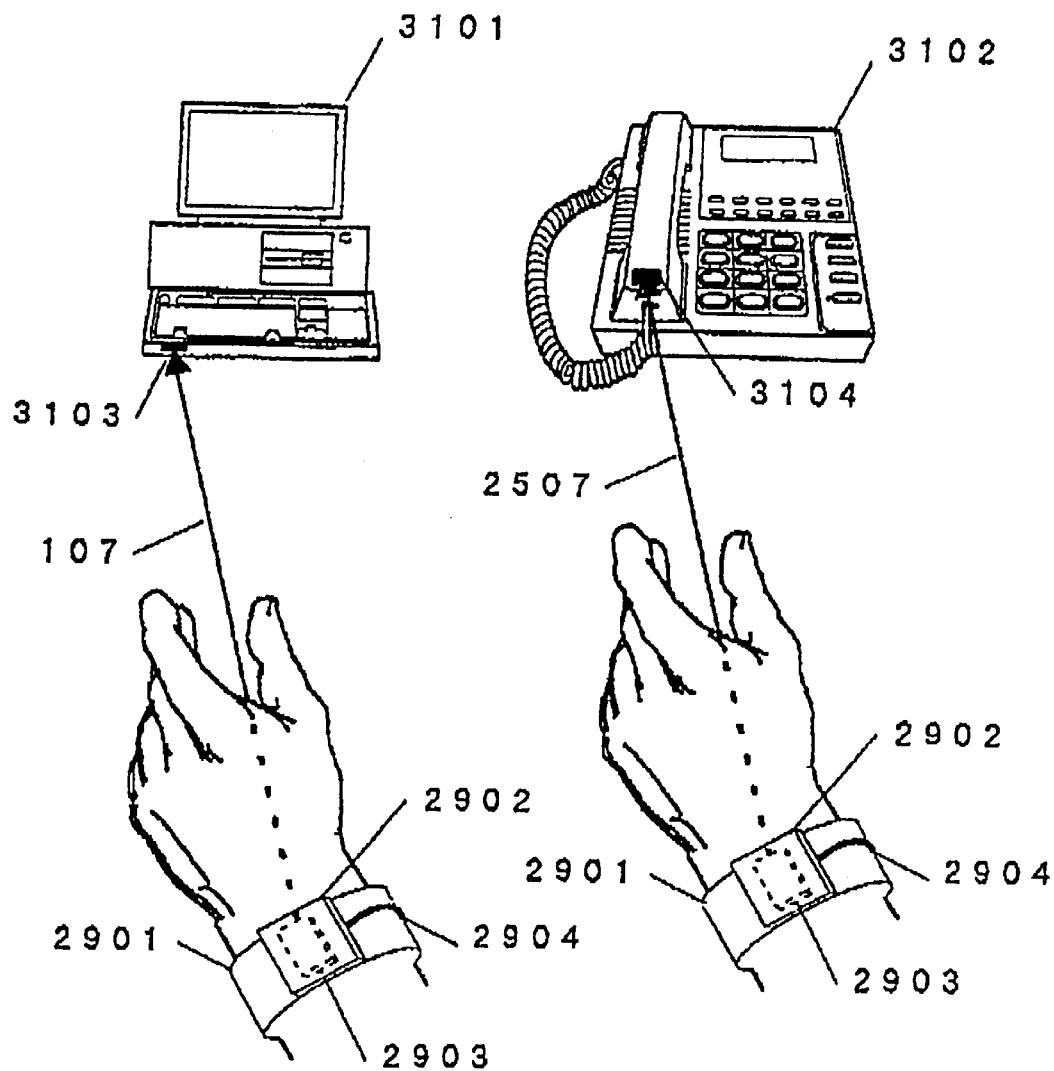
FIGS. 31A and 31B are conceptual diagrams illustrating the operation of a communication system according to the seventh embodiment of the invention.

Next, cases of responding to a call by using the cellular telephone 103 of the seventh embodiment and the computer 104 of the first embodiment or the fixed telephone of the sixth embodiment will be described with reference to FIGS. 31A and 31B. FIGS. 31A and 31B illustrate how the same operations as in the first and sixth embodiments are performed by using the cellular telephone 103 having the shape of the seventh embodiment. Although the cellular telephone 2503 is used in the sixth embodiment, in this embodiment, to facilitate the description, it is assumed that the fixed telephone 2504 can respond to a call directed to the cellular telephone 103 because the cellular telephone 2503 in the sixth embodiment performs the same operation as the cellular telephone 103 in the first embodiment.

FIGS. 31A and 31B show appearances of the computer 104 shown in FIG. 1 (first embodiment) and the fixed telephone 2504 of the sixth embodiment by using new reference numerals 3101 and 3102, respectively. FIG. 31A shows an appearance of the computer faint radio wave communication means 301 of the computer 104 shown in FIG. 3 (first embodiment) by using a new reference numeral 3103. FIG. 31B shows an appearance of the telephone faint radio wave communication means 2601 of the fixed telephone 2504 shown in FIG. 25 (sixth embodiment) by using a new reference numeral 3104. In FIGS. 31A and 31B, the faint radio wave communication section 2903 is indicated by broken lines because it is located on the back side and hence is not seen.

As shown in FIGS. 31A and 31B, arrangement is so made that the hand of the user does not interrupt the communication channel between the faint radio wave communication means 2903 and the computer faint radio wave communication means 3103 or the telephone faint radio wave communication means 3104 when the user moves his hand to manipulate the computer 3101 or the fixed telephone 3102. Specifically, as shown in FIG. 31A, the computer faint radio wave communication means 3103 is provided on the keyboard of the computer 3101, whereby the computer faint radio wave communication means 3103 and the faint radio wave communication section 2903 can communicate with each other when the user moves his hand to use the keyboard. Similarly, as shown in FIG. 31B, the telephone faint radio wave communication means 3104 is provided on the handset of the fixed telephone 3102, whereby the telephone faint radio wave communication means 3104 and the faint radio wave communication section 2903 can communicate with each other when the user moves his hand to perform an off-hook manipulation. If, for example, the faint radio wave communication section were provided in the main body 2902, the palm of the user's hand would interrupt the communication channel when he attempts to make a manipulation.

That is, by virtue of the employment of the communication connection section 2904 that connects the main body 2902 and the faint radio wave communication section 2903 and the above-described arrangement of the main body 2902 and the faint radio wave communication section 2903, the quality of a communication by faint radio waves can be improved. Further, by adjusting the range where a communication by faint radio waves is possible by controlling the faint radio wave communication section 2903 and the computer faint radio wave communication means 3103 of the computer 3101 or the telephone faint radio wave communication means 3104 of the fixed telephone 3102, the possibility that a communication by faint radio waves can be performed successfully can be increased only when the user manipulates the computer 3101 or the fixed telephone 3102.

As described above, the communication system according to the seventh embodiment is provided with a cellular telephone comprising a wrist band, a main body having a radio communication means, a cellular telephone user interface means, a call reception state report generating means, and an entire cellular telephone control means; a faint radio wave communication section having a cellular telephone faint radio wave communication means; and a communication connection section that connects the main body and the faint radio wave communication section.

With the above configuration, the communication system according to the seventh embodiment provides the following four advantages.

First, since the communication connection section extends along the wrist band, the main body can be provided on the side of the palm of the user's hand and the faint radio wave communication section can be provided on the side of the back of the hand. As a result, the hand is not inserted between the faint radio wave communication section and the computer faint radio wave communication means of the computer or the telephone faint radio wave communication means of the fixed telephone, when the user attempts to manipulate the computer or the fixed telephone, contributing to improvement in the quality of a communication by faint radio waves.

Second, since the cellular telephone is shaped like a wrist watch, when the user attempts to manipulate the computer or the fixed telephone, the distance between the faint radio wave communication section and the computer faint radio wave communication means of the computer or the telephone faint radio wave communication means of the fixed telephone becomes shorter, also contributing to improvement in the quality of a communication by faint radio waves.

Third, by adjusting the range where a communication by faint radio waves is possible by controlling the faint radio wave communication section and the computer faint radio wave communication means of the computer or the telephone faint radio wave communication means of the fixed telephone, the possibility that a communication by faint radio waves can be performed successfully can be increased only when the user manipulates the computer or the fixed telephone.

Fourth, since the cellular telephone is shaped like a wrist watch, the user can always carry it. That is, the possibility that a caller, who makes a call to the cellular telephone, can communicate with the user of the cellular telephone is made higher. Further, since the user responds to a call, the computer or fixed telephone to be used for making a response can be determined at the time of call reception.

Although in the seventh embodiment the main body 2902 is provided with the call reception state report generating means 204, the entire cellular telephone control means 205, and the radio communication means 201, it is easily understood that they may be provided in the faint radio wave communication section 2903. Although in the seventh embodiment the main body 2902 is provided with the cellular telephone user interface means 203, it is easily understood that a means as part of the cellular telephone user interface means 203, such as a voice input/output means, can be separated from the cellular telephone user interface means 203 and provided in the faint radio wave communication section 2903.

Although in the seventh embodiment the wrist band 2901 is so configured that its ends are connected to each other when the cellular telephone is mounted around the wrist, it is easily understood that the wrist band may have other shapes as long as it is assured that the faint radio wave communication means 2903 is located on the side of the palm of a hand.

Embodiment 8

A communication system according to an eighth embodiment of the invention will be described below.

Figure 32:
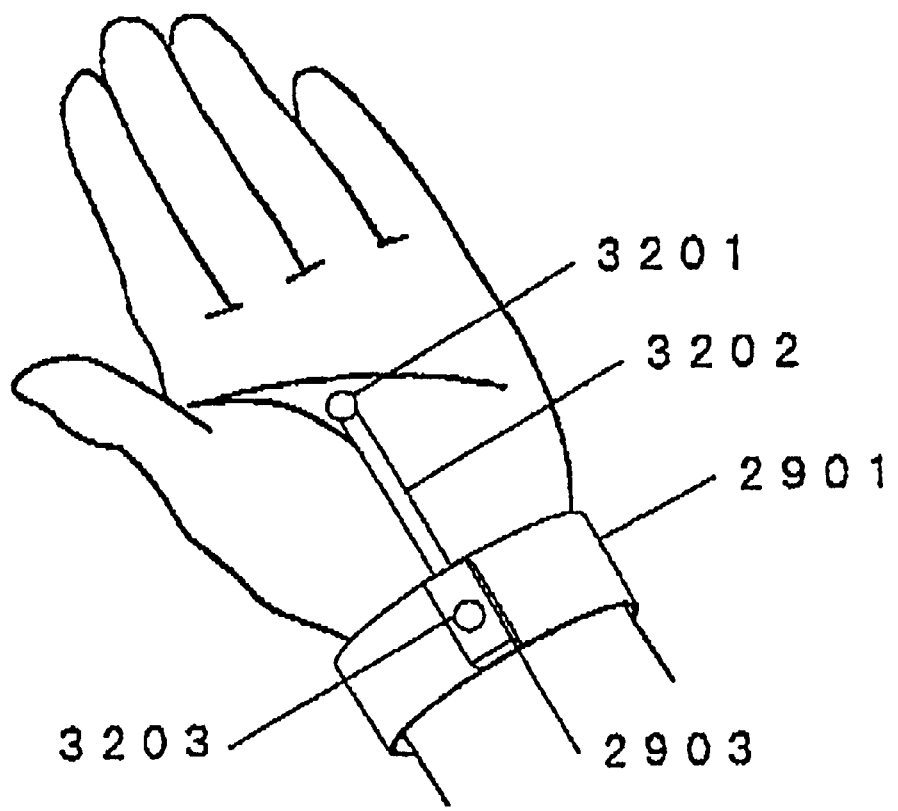
FIG. 32 is a conceptual diagram illustrating the shape of a cellular telephone according to an eighth embodiment of the invention.

An example of the shape of a cellular telephone will be described below with reference to FIG. 32, which shows an example of its general appearance.

As in the case of the seventh embodiment, the cellular telephone according to the eighth embodiment is shaped like a wrist watch. The eighth embodiment is different from the seventh embodiment in that a speaker section that enables the user to hear a voice and a microphone section of the cellular telephone user interface means 203 that constitutes the main body 2902 in the seventh embodiment are provided in the faint radio wave communication section 2903 and that the communication connection section serves for a communication between the entire cellular telephone control means 205 and the speaker section or the microphone section as well as a communication between the entire cellular telephone control means 205 and the cellular telephone faint radio wave communication means 202.

A specific configuration will be described below with reference to FIG. 32. Actually, the speaker section is composed of a voice output means 3201 for outputting a voice and a connecting means 3202 for connecting the faint radio wave communication section 2903 and the voice output means 3201. Being extendable, the connecting means 3202 is accommodated in the faint radio wave communication section 2903 when it is rendered shortest.

A voice input means 3203 that constitutes the microphone section is provided on the top surface of the faint radio wave communication section 2903.

The operation of the communication system according to the eighth embodiment will be described below. In the eighth embodiment, a call is processed by the cellular telephone. To hear a voice, the user of the cellular telephone extends the connecting means 3202 and determines the position of the voice output means 3201 so that the voice output means' 3201 is located near his ear when he brings his hand close to the side portion of his face. In this state, the voice input means 3203 is located near the user's mouth, contributing to improvement in the quality of the user's input voice.

Upon completion of a call, the user contrasts the connecting means 3202 so that it is accommodated in the faint radio wave communication section 2903.

As described above, the communication system according to the eighth embodiment is provided with a cellular telephone comprising a faint radio wave communication section having a voice input means for enabling voice input, an extendable connecting means to which the voice input means is connected, a voice output means for outputting a voice, and a cellular telephone faint radio wave communication means.

With the above configuration, the invention provides the following three advantages. First, since the voice input means and the voice output means constitute the faint radio wave communication section, the distance between the voice input means and the user's mouth and the distance between the voice output means and the user's ear can be made short in a state that the user of the cellular telephone brings his hand close to the side portion of his face, contributing to improvement in voice communication quality.

Second, since the voice input means and the voice output means constitute the faint radio wave communication section, the distance between the voice input means and the user's mouth and the distance between the voice output means and the user's ear can be made short in a state that the user of the cellular telephone brings his hand close to the side portion of his face, contributing to improvement in confidentiality.

Third, since the connecting means is extendable, the voice output means can be accommodated in the faint radio wave communication section when a call is not performed.

Although in the eighth embodiment a voice is output from the voice output means 3201, it is easily understood that voice output by bone vibration can be realized by forming the voice output means 3201 by using a vibrator that vibrates in accordance with a voice.

Embodiment 9

A communication system according to a ninth embodiment of the invention will be described below with reference to FIGS. 33–40.

First, the configuration of a communication system according to the ninth embodiment will be described with reference to FIG. 33, which is a block diagram showing its example configuration.

Figure 33:
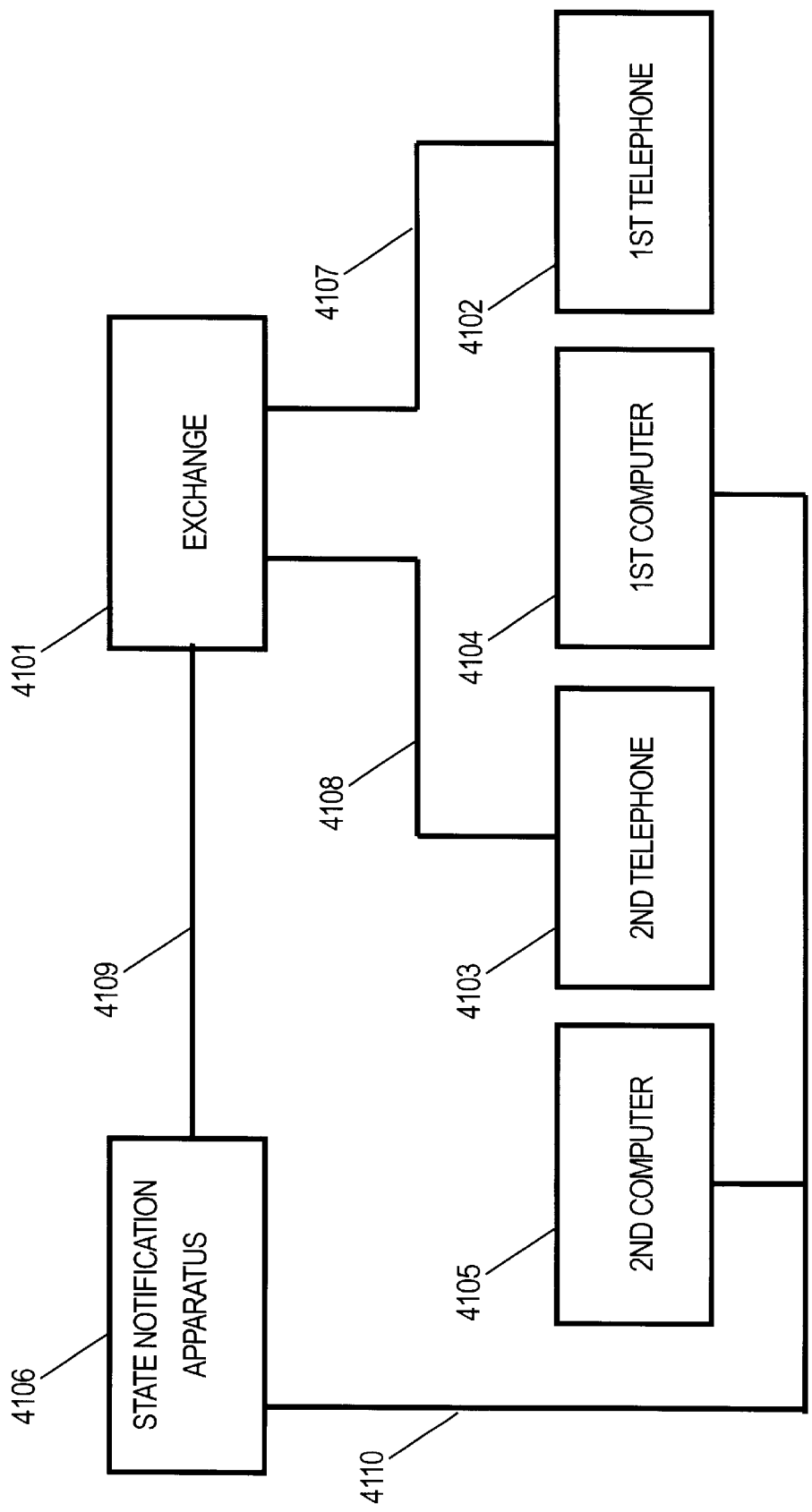
FIG. 33 is a block diagram showing a configuration of a communication system according to a ninth embodiment of the invention.

In FIG. 33, reference numeral 4101 denotes an exchange. Reference numerals 4102 and 4103 denote first and second telephones, respectively, that are connected to the exchange 4101. Reference numeral 4104 denotes a first computer that acquires information relating to the first telephone 4102, and numeral 4105 denotes a second computer that acquires information relating to the second telephone 4103. Reference numeral 4106 denotes a state notification apparatus that sends a computer information relating to a telephone state that is sent from the exchange 4101. Reference numeral 4107 denotes a communication channel between the exchange 4101 and the first telephone 4102, and numeral 4108 denotes a communication channel between the exchange 4101 and the second telephone 4103.

Reference numeral 4109 denotes a communication channel between the exchange 4101 and the state notification apparatus 4106. Reference numeral 4110 denotes a communication channel between the state notification apparatus 4106 and the first and second computers 4104 and 4105. For example, the communication channel 4109 is an RS232c channel or an Ethernet. For example, the communication channel 4110 is an Ethernet or an FDDI. The communication channels 4109 and 4110 can be made the same communication channel by forming those by an Ethernet, for example.

A detailed configuration of the exchange 4101 will be described with reference to FIG. 34, which is a block diagram showing its example configuration.

Figure 34:
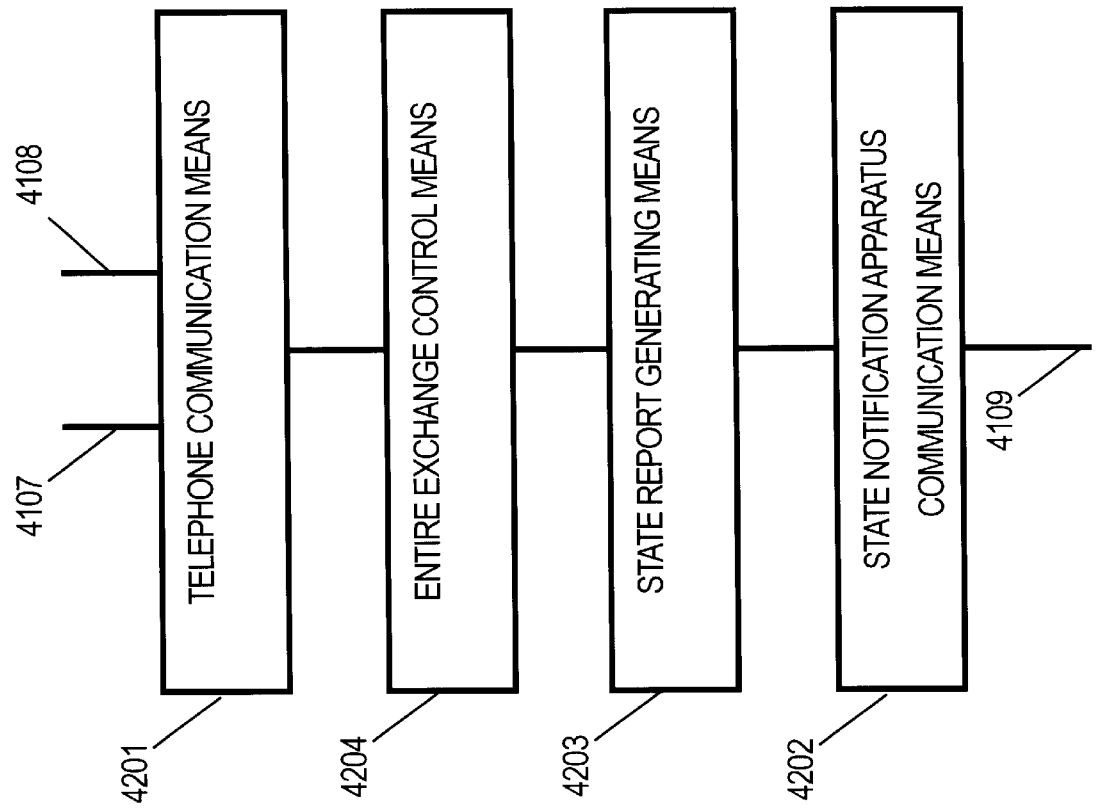
FIG. 34 is a block diagram showing a configuration of an exchange in the communication system of FIG. 33.

In FIG. 34, reference numeral 4201 denotes a telephone communication means for communicating with the first telephone 4102 and the second telephone 4103 and performing related circuit switching. Reference numeral 4202 denotes a state notification apparatus communication means for communicating with the state notification apparatus 4106. Reference numeral 4203 denotes a state report generating means for generating information relating to a telephone state. In the following, to facilitate the description, information relating to a telephone state that is generated by the state report generating means 4203 is called a state report. Reference numeral 4204 denotes an entire exchange control means for controlling the entire exchange 4101.

A detailed configuration of the state notification apparatus 4106 will be described below with reference to FIG. 35, which is a block diagram showing its example configuration.

Figure 35:
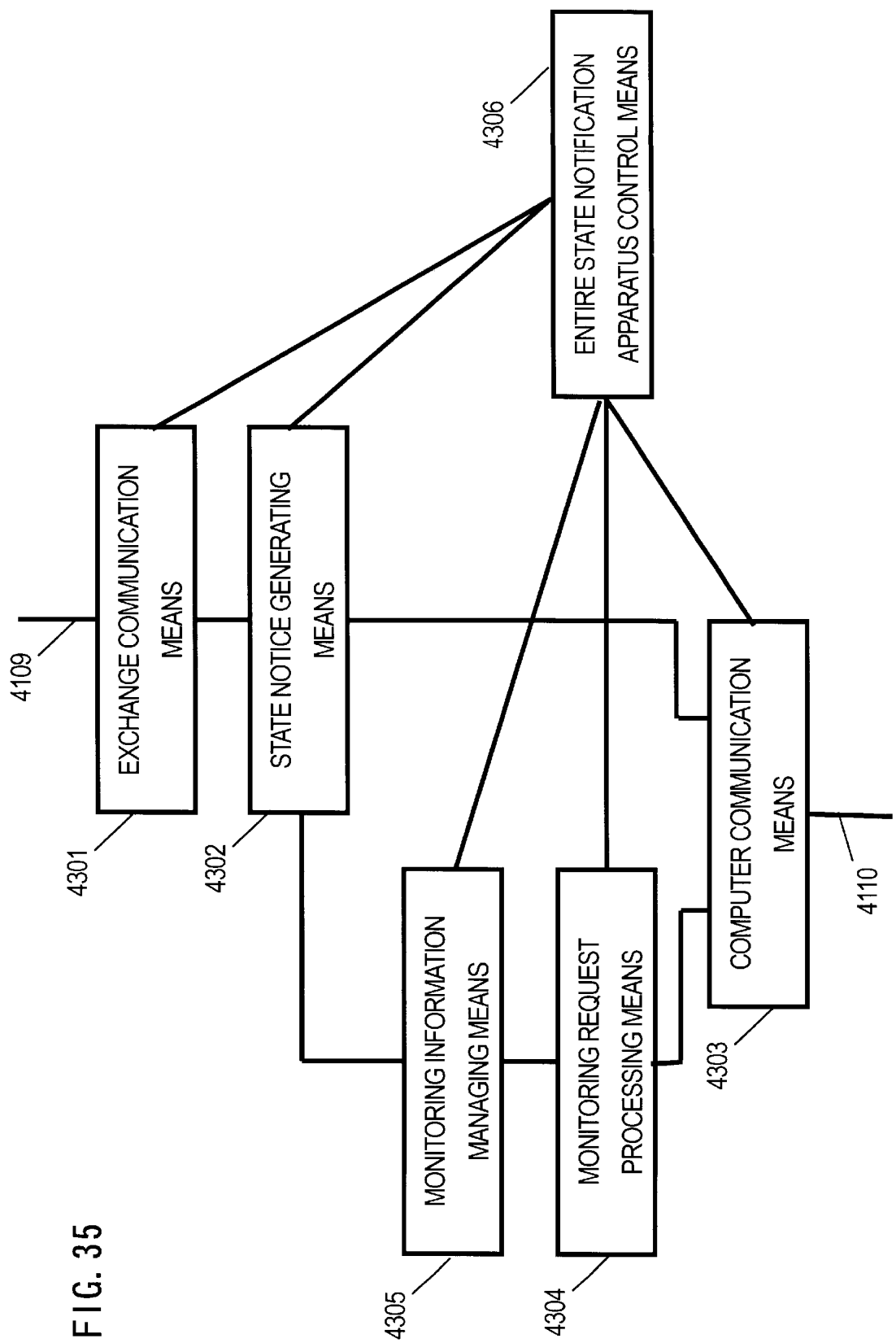
FIG. 35 is a block diagram showing a configuration of a state notification apparatus in the communication system of FIG. 33.

In FIG. 35, reference numeral 4301 denotes an exchange communication means for communicating with the exchange 4101. Reference numeral 4302 denotes a state notice generating means for generating information relating to a telephone state to be sent to a computer based on a state report that is sent from the exchange 4101. In the following, to facilitate the description, information relating to a telephone state that is generated by the state notice generating means 4302 is called a state notice. Reference numeral 4303 denotes a computer communication means for communicating with the first computer 4104 and the second computer 4105. Reference numeral 4304 denotes a monitoring request processing means for processing monitoring requests that are sent from the first computer 4104 and the second computer 4105 to acquire state notices. The monitoring requests will be described later in detail. Reference numeral 4305 denotes a monitoring information managing means for managing the information of monitoring requests that are sent from the first computer 4104 and the second computer 4105. Reference numeral 4306 denotes an entire state notification apparatus control means for controlling the entire state notification apparatus 4106.

Figure 36:
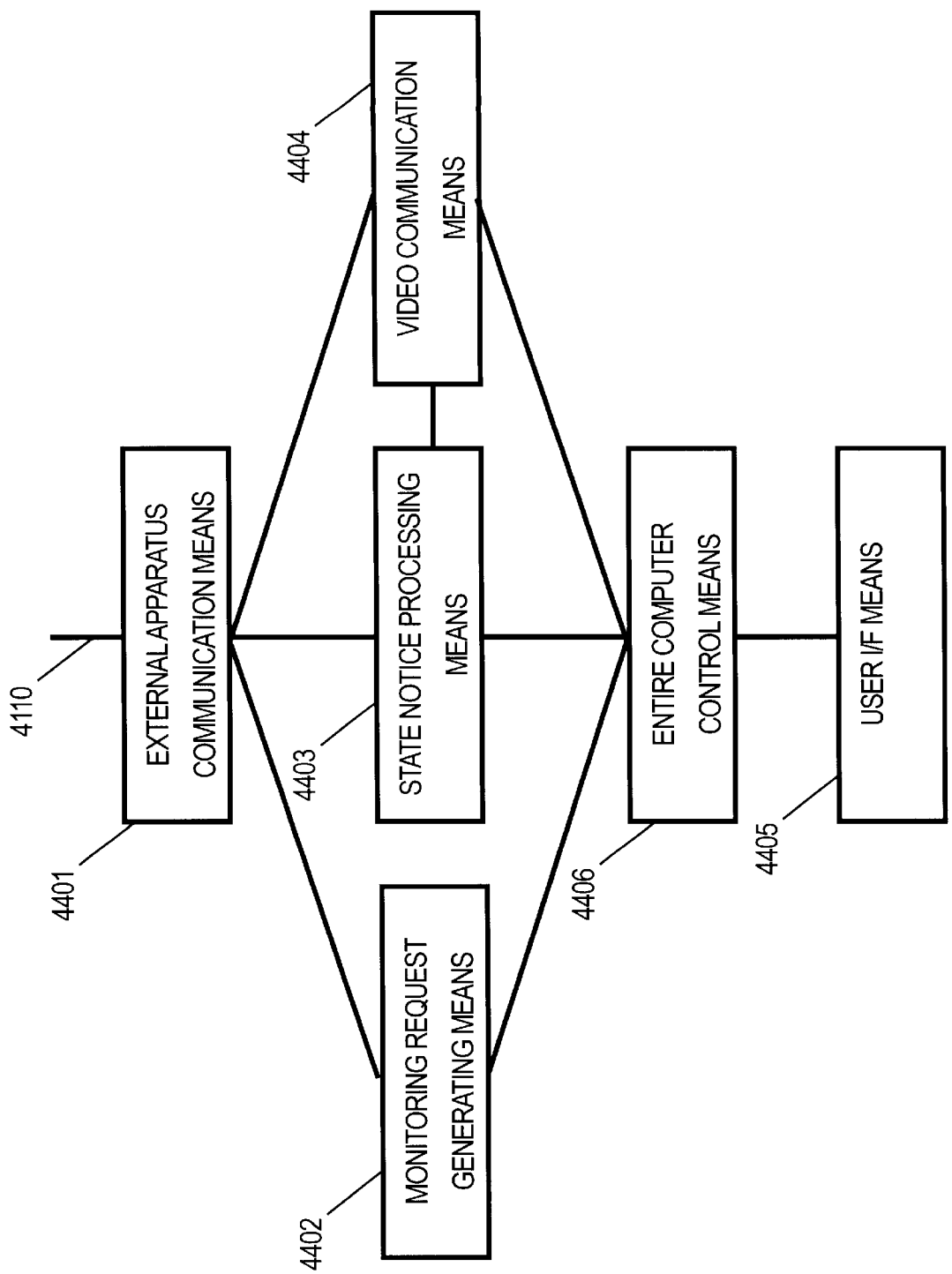
FIG. 36 is a block diagram showing a configuration of a computer in the communication system of FIG. 33.

A detailed configuration of the first computer 4104 and the second computer 4105 will be described below with reference to FIG. 36. Since the first computer 4104 and the second computer 4105 have the same configuration, a description will be made of only the first computer 4104. FIG. 36 is a block diagram showing an example configuration of the first computer 4104.

In FIG. 36, reference numeral 4401 denotes an external apparatus communication means for communicating with the state notification apparatus 4106 and the second computer 4105. Reference numeral 4402 denotes a monitoring request generating means for generating a monitoring request to be sent to the state notification apparatus 4106. Reference numeral 4403 denotes a state notice processing means for processing a state notice that is sent from the state notification apparatus 4106. Reference numeral 4404 denotes a video communication means for performing a video communication with the second computer 4105. Reference numeral 4405 denotes a user interface means. For example, the user interface means 4405 is constituted of a camera for capturing video information, a display device for outputting video information, a keyboard for input of information, and other devices. Reference numeral 4406 denotes an entire computer control means for controlling the entire first computer 4104.

As mentioned above, the first computer 4014 and the second computer 4105 have the same configuration. Therefore, in the following, reference symbols 4401A–4406A will be used in referring to the components of the second computer 4105.

Figure 37:
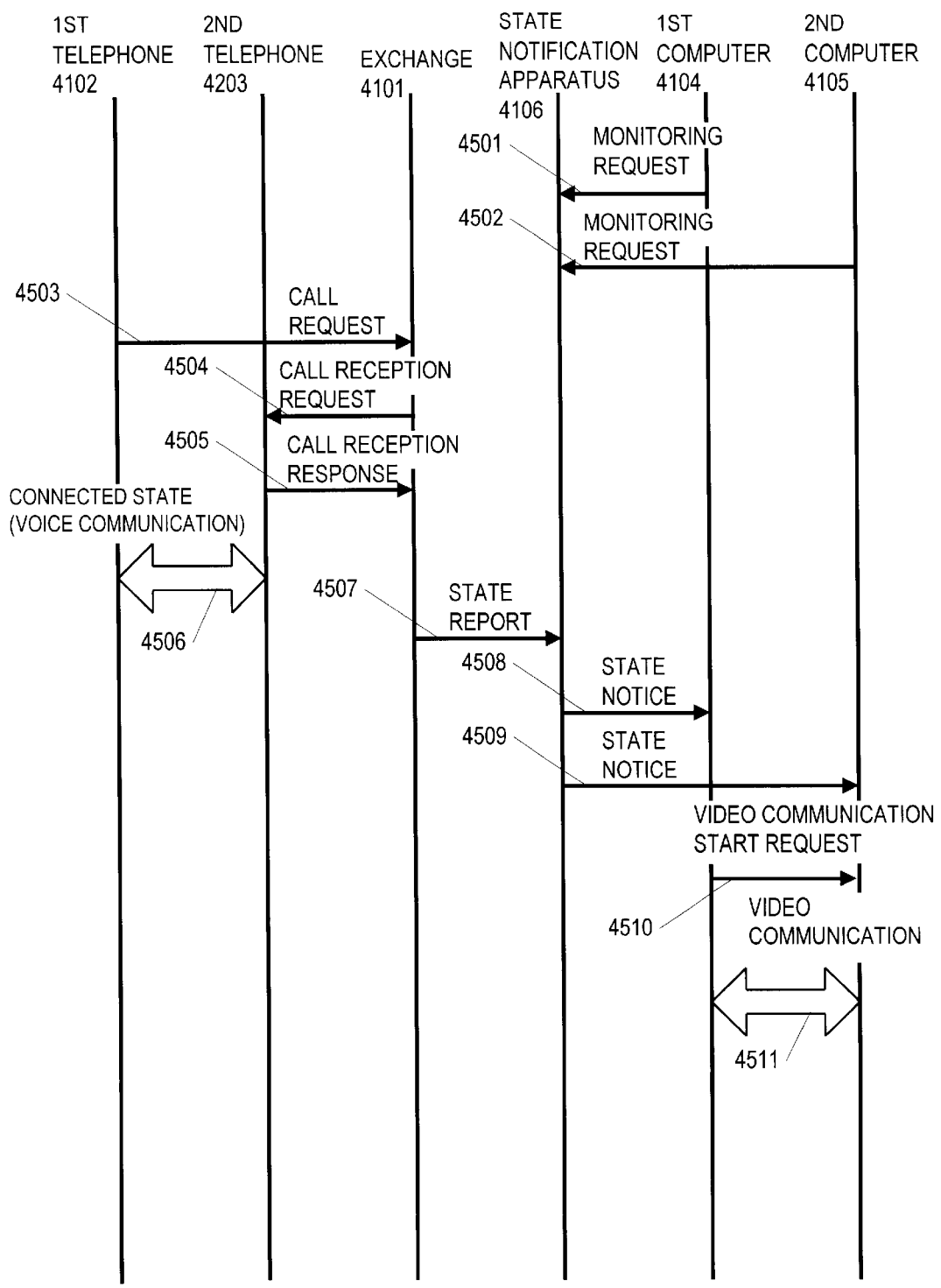
FIG. 37 is a signal diagram showing the operation of the communication system according to the ninth embodiment.

Next, the operation of the communication system according to the ninth embodiment will be described with reference to FIGS. 37–40. FIG. 37 is a signal diagram of the communication system according to the ninth embodiment.

First, in the communication system, the first computer 4104 sends the state notification apparatus 4106 a monitoring request 4501 for requesting the state notification apparatus 4106 to send a state notice for the first telephone 4102 to the first computer 4104 itself.

Figure 38:
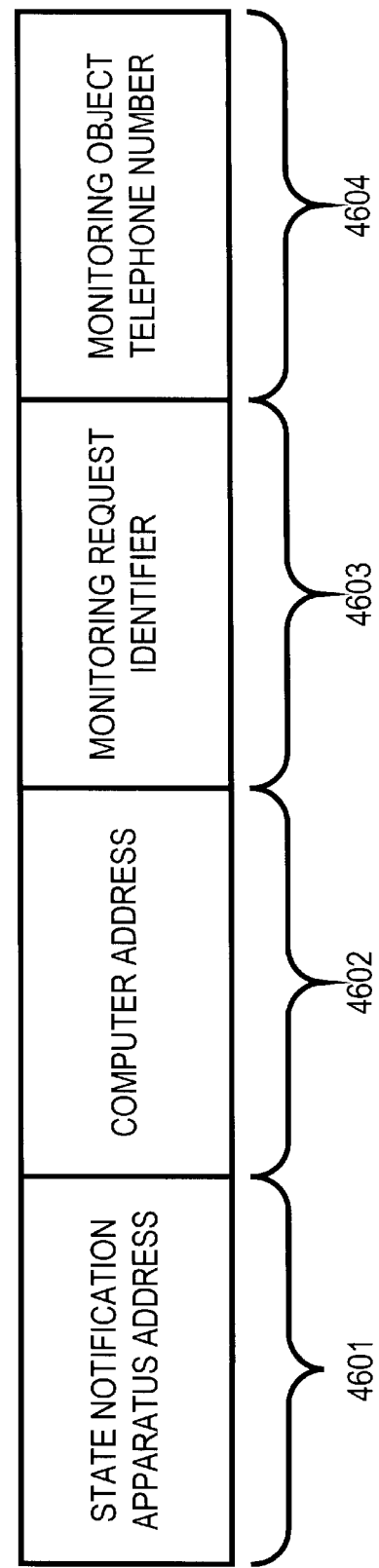
FIG. 38 is a format diagram of a monitoring request used in the communication system according to the ninth embodiment.

An example format of the monitoring request 4501 will be described below with reference to FIG. 38. As shown in FIG. 38, field 4601 accommodates the address of the state notification apparatus 4106. Field 4602 accommodates the address of the first computer 4104. Field 4603 accommodates an identifier indicating that the signal is a monitoring request. Field 4604 accommodates the telephone number of the first telephone 4102 for which the first computer 104 is to acquire a state notice.

Operations performed by the first computer 4104 and the state notification apparatus 4106 when a monitoring request 4501 is issued will be described below. In the first computer 4104, the monitoring request generating means 4402 generates a monitoring request 4501, which is sent to the state notification apparatus 4106 via the external apparatus communication means 4401. In the state notification apparatus 4106, the monitoring request processing means 4304 receives the monitoring request 4501 via the computer communication means 4303. The monitoring request processing means 4304 executes a process of causing the monitoring information managing means 4305 to store, as a pair, the address of the first computer 4104 accommodated in field 4602 and the telephone number of the first telephone 4102 accommodated in field 4604.

Then, in the communication system, the second computer 4105 also sends the state notification apparatus 4106 a monitoring request 4502 for requesting transmission of a state notice for the second telephone 4103. Since operations performed in this case are the same as the operations in the case of the monitoring request 4501, they are not described here.

After completion of the processes for the monitoring requests 4501 and 4502, the monitoring information managing means 4305 of the state notification apparatus 4106 should store the information of the monitoring requests 4501 and 4502 sent from the first computer 4104 and the second computer 4105.

Figure 39A:
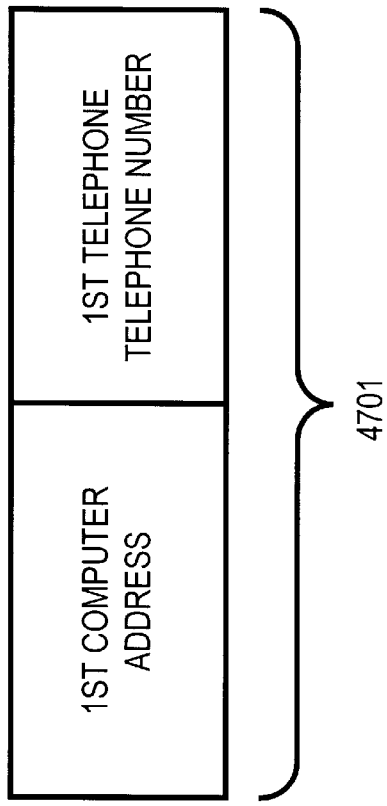
FIGS. 39A and 39B are format diagrams of information managed by a monitoring information managing means of a state notification apparatus in the communication system according to the ninth embodiment.
Figure 39B:
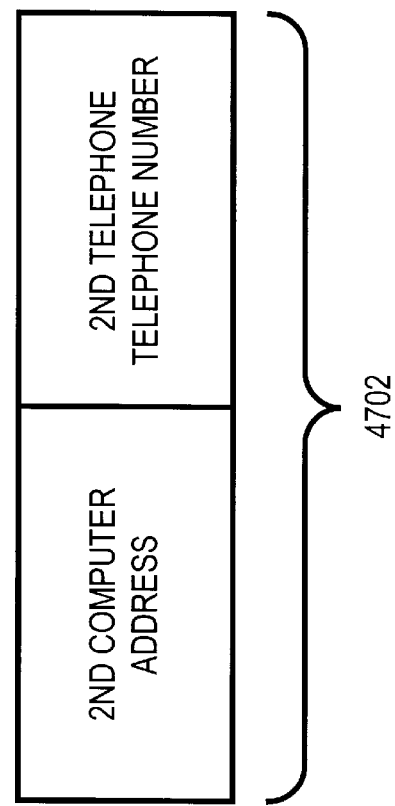

FIGS. 39A and 39B show examples of information to be stored in the monitoring information managing means 4305. In the monitoring information managing means 4305, as denoted by reference numeral 4701 in FIG. 39A, the address of the first computer 4104 that was accommodated in field 4602 of the monitoring request 4501 and the telephone number of the first telephone 4102 that was accommodated in field 4604 are stored in a pair. Similarly, as denoted by reference numeral 4702 in FIG. 39B, the address of the second computer 4105 that was accommodated in field 4602 of the monitoring request 4502 and the telephone number of the second telephone 4103 that was accommodated in field 4604 are stored in a pair.

Operations of the communication system that are performed when circuit connection is made from the first telephone 4102 to the second telephone 4103 after completion of the processes for the monitoring requests 4501 and 4502 will be described below.

A request 4503 for a call from the first telephone 4102 to the second telephone 4103 is sent from the first telephone 4102 to the exchange 4101. The call request 4503 is input to the telephone communication means 4201 of the exchange 4101 and the entire exchange control means 4204 executes a number analyzing process and other processes.

As a result, a call reception request 4504 is sent from the exchange 4101 to the second telephone 4103, which performs beeping or the like in response.

If a response is made to the call by an off-hook manipulation or the like in the second telephone 4103, a call reception response 4505 is sent from the second telephone 4103 to the exchange 4101.

In the exchange 4101, the call reception response 4505 is supplied to the entire exchange control means 4204 via the telephone communication means 4201 and the entire exchange control means 4204 controls the telephone communication means 4201 to have it make circuit connection between the first telephone 4202 and the second telephone 4203, whereby a connected state 4506 is established between the first telephone 4202 and the second telephone 4203.

When the connected state 4506 has been established between the first telephone 4202 and the second telephone 4203, the exchange 4101 sends a state report 4507 indicating the establishment of the connected state 4506 to the state notification apparatus 4106. Specifically, in the exchange 4101, the entire exchange control means 4204 informs the state report generating means 4203 that the control of making circuit connection between the first telephone 4202 and the second telephone 4203 has been performed and the state report generating means 4203 generates a state report 4507 indicating that a connected state has been established, which is sent out via the state notification apparatus communication means 4202.

Figure 40:
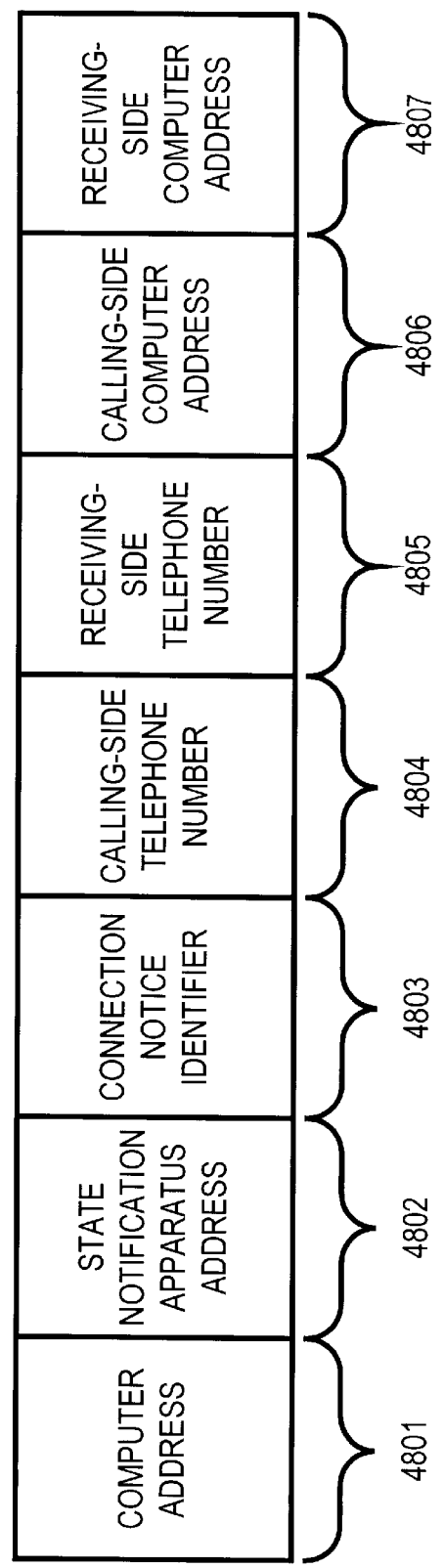
FIG. 40 is a format diagram of a connection notice used in the communication system according to the ninth embodiment.

Upon reception of the state report 4507, the state notification apparatus 4106 sends the first computer 4104 and the second computer 4105 state notices 4508 and 4509 indicating that a connected state has been established. An example of the state notices 4508 and 4509 will be described below with reference to FIG. 40. As shown in FIG. 40, field 4801 accommodates the address of a computer; that is, field 4801 accommodates the address of the first computer 4104 in the case of the state notice 4508 and the address of the second computer 4105 in the case of the state notice 4509. Field 4802 accommodates the address of the state notification apparatus 4106. Field 4803 accommodates a connection notice identifier indicating that the state notice shows a connected state.

Field 4804 accommodates the telephone number of the first telephone 4102 as the calling-side telephone. Field 4805 accommodates the telephone number of the second telephone 4103 as the receiving-side telephone. Field 4806 accommodates the address of the first computer 4104 that has sent out the monitoring request 4501 for the first telephone 4102 as the calling-side telephone. Field 4807 accommodates the address of the second computer 4105 that has sent out the monitoring request 4502 for the second telephone 4103 as the receiving-side telephone.

Operations in the state notification apparatus 4106 will be described below in detail. In the state notification apparatus 4106, the state notice generating means 4302 receives the state report 4507 from the exchange 4101 via the exchange communication means 4301. The state notice generating means 4302 recognizes, from the information (see FIGS. 39A and 39B) managed by the monitoring information managing means 4305, that the computer that is monitoring the calling-side telephone is the first computer 4104 and the computer that is monitoring the receiving-side telephone is the second computer 4105, and generates fields 4806 and 4807. Then, the state notice generating means 4302 determines the computer to which to send a state notice and causes field 801 to accommodate the address of the thus-determined computer. In this case, since a state notice should be sent to both of the first computer 4104 and the second computer 4105, the state notice generating means 4302 generates two state notices in which the addresses of the respective computers are accommodated in fields 4801.

When receiving the state notice 4508, the first computer 4104 sends the second computer 4105 a video communication request 4510 for requesting a video communication. Operation performed by the first computer 4104 will be described below. In the first computer 4104, the state notice processing means 4403 receives the state notice 4508 via the external apparatus communication means 4401. The state notice processing means 4403 acquires the address of the second computer 4105 that is accommodated in field 4807 of the state notice 4508 and controls the video communication means 4404 to have it start a video communication with the second computer 4105. As a result, the video communication means 4404 sends out a video communication start request 4510 via the external apparatus communication means 4401.

When the second computer 4105 has received the state notice 4509, the state notice processing means 4404A acquires the address of the first computer 4104 and controls the video communication means 4405A to render it in a state of waiting for input of a video communication start request from the first computer 4104. The video communication means 4405A starts a video communication upon reception of the video communication start request 4510 via the external apparatus communication means 4401A. As a result, a video communication 4511 between the first computer 4104 and the second computer 4105 is started.

As described above, in the communication system according to this embodiment, a video communication between the first computer 4104 and the second computer 4105 is started when the second telephone 4103 responds to a call from the first telephone 4102. Therefore, a video communication is performed between the first computer 4104 and the second computer 4105 while a voice communication is performed between the first telephone 4102 and the second telephone 4103. A visual telephone is realized if an image of the user is captured by a camera as the computer user interface means 4405 and an image of the person on the other side is displayed by a display device also as the computer user interface means 4405.

In the above example, a state of waiting for the start of a video communication from the first computer 4104 is established by using the address of the first computer 4104 that is accommodated in the state notice 4509 that is sent to the second computer 4105. Alternatively, the second computer 4105 may simply be rendered in a state of waiting for a video communication from another computer. In this case, a video communication between the first computer 4104 and the second computer 4105 can be started if the first computer 4104 sends out a video communication request by using the address of the second computer 4105 that is acquired from a state notice 4508 and the second computer 4105 responds to the video communication start request. That is, a video communication can be performed between the first computer 4104 and the second computer 4105 if the address of the second computer 4105 is accommodated only in a state notice 4508 that is sent to the first computer 4105.

As described above, the communication system according to the ninth embodiment is provided with a first telephone; a second telephone; an exchange that is connected to the first and second telephones and sends out state reports indicating the states of the first and second telephones; a first computer; a second computer; and a state notification apparatus that is connected to the exchange and the first and second computers, sends the first computer a first state notice in which the address of the second computer is added to the state report for the first computer that has been sent from the exchange, and sends the second computer, as a second state notice, the state report for the second computer that has been sent from the exchange.

With the above configuration, the invention provides the following five advantages.

First, since a state notice in which the address of the second computer is added to a state report for the first telephone that has been sent from the exchange is sent to the first computer, the first computer can communicate with the second computer by using the address of the second computer that is added to the state notice and hence no server is necessary that executes a process of starting a session between the first and second computers.

Second, the state notification apparatus is not involved in the start of a session between the first and second computers;

the state notification apparatus simply generates state notices based on state information that has been received from the exchange and sends the generated state notices to the computers. Therefore, there occurs no load on the state notification apparatus when a session between the first and second computers is started.

Third, since a voice communication is performed between the telephones and a video communication is performed between the computers, a visual telephone can be realized without using any special terminals.

Fourth, since a video communication is performed between the computers, it can be performed by using a computer network having a larger communication capacity than a telephone network, contributing to improvement in video quality.

Fifthly, since the address of the second computer is accommodated in a state notice that is sent from the state notification apparatus, the first computer can start a communication with the second computer without the need for storing in advance the address of the second computer that corresponds to the second telephone.

Although in the ninth embodiment a video communication between the first computer 4104 and the second computer 4105 is started in response to state notices as connection notices, an operation can easily be realized that a video communication is started in response to state notices indicating reception of a call from the first telephone 4102 to the second telephone 4103 or a call from the second telephone 4103 to the first telephone 4102. In this case, it is easily understood that an advantage can be obtained that the presence of the user of the second telephone 4103 can be checked by an image by starting a video communication. Further, the following configuration and operation can be realized easily. That is, a timer means is provided in the first computer 4104 or the second computer 4105. The state notice processing means 4403 activates the timer means when receiving a state notice indicating call reception. After a lapse of the time that is managed by the timer means, a video communication is started by the video communication means 4404 even if a connected state is not established between the first telephone 4102 and the second telephone 4103. It is easily understood that this provides an advantage that the presence of the user of the second computer 4103 can be checked by an image.

Although in the ninth embodiment the address of the second computer 4105 is added to a state notice indicating that the first telephone 4102 and the second telephone 4103 are in a connected state, it is easily understood that the advantages of the invention can still be obtained by the following configuration and operation. That is, a state notice is sent that merely indicates that the first telephone 4102 and the second telephone 4103 are in a connected state. The first computer 4104 is caused to send the state notification apparatus 4106 an address acquisition request for requesting acquisition of the address of the second computer 4105 corresponding to the second telephone 4103. An address acquisition request processing means for processing the address acquisition request is provided in the state notification apparatus 4106. The address acquisition request processing means acquires the address of the second computer 4105 from the monitoring information managing means 4305 and sends it to the first computer 4014.

In the ninth embodiment, the state notice indicating that a connected state has been established has the format shown in FIG. 40 that is so formed that each of the first computer 4104 and the second computer 4105 is informed of both of the address of the first computer 4104 accommodated in field 4806 and the address of the second computer 4105 accommodated in field 4807. It can easily be realized that the state notice has a format that is so formed that the first computer 4104 is informed of only the address of the second computer 4105 accommodated in field 4807 and the second computer 4105 is informed of only the address of the first computer 4104 accommodated in field 4806.

Although the ninth embodiment is directed to the case of establishing a connection between the first telephone 4102 and the second telephone 4103 that are connected to the exchange 4101, it is easily understood that the following configuration and operation can be realized. That is, two exchanges are connected to each other via a public network or a dedicated line. A voice communication is performed between telephones connected to the respective exchanges and a video communication is performed between computers that send out monitoring requests for the respective telephones.

Further, it is easily understood that a video communication described in the ninth embodiment is not limited to one corresponding to a connected state between the first telephone 4102 and the second telephone 4103, and may be one corresponding to a circuit switching process for holding, transfer, absence transfer, or the like.

Embodiment 10

A communication system according to a 10th embodiment of the invention will be described below. The 10th embodiment is different from the ninth embodiment in the detailed configuration of the first computer 4104 and the second computer 4105.

The detailed configuration of the first computer 4104 will be described below with reference to FIG. 41, which is a block diagram showing its example configuration.

Figure 41:
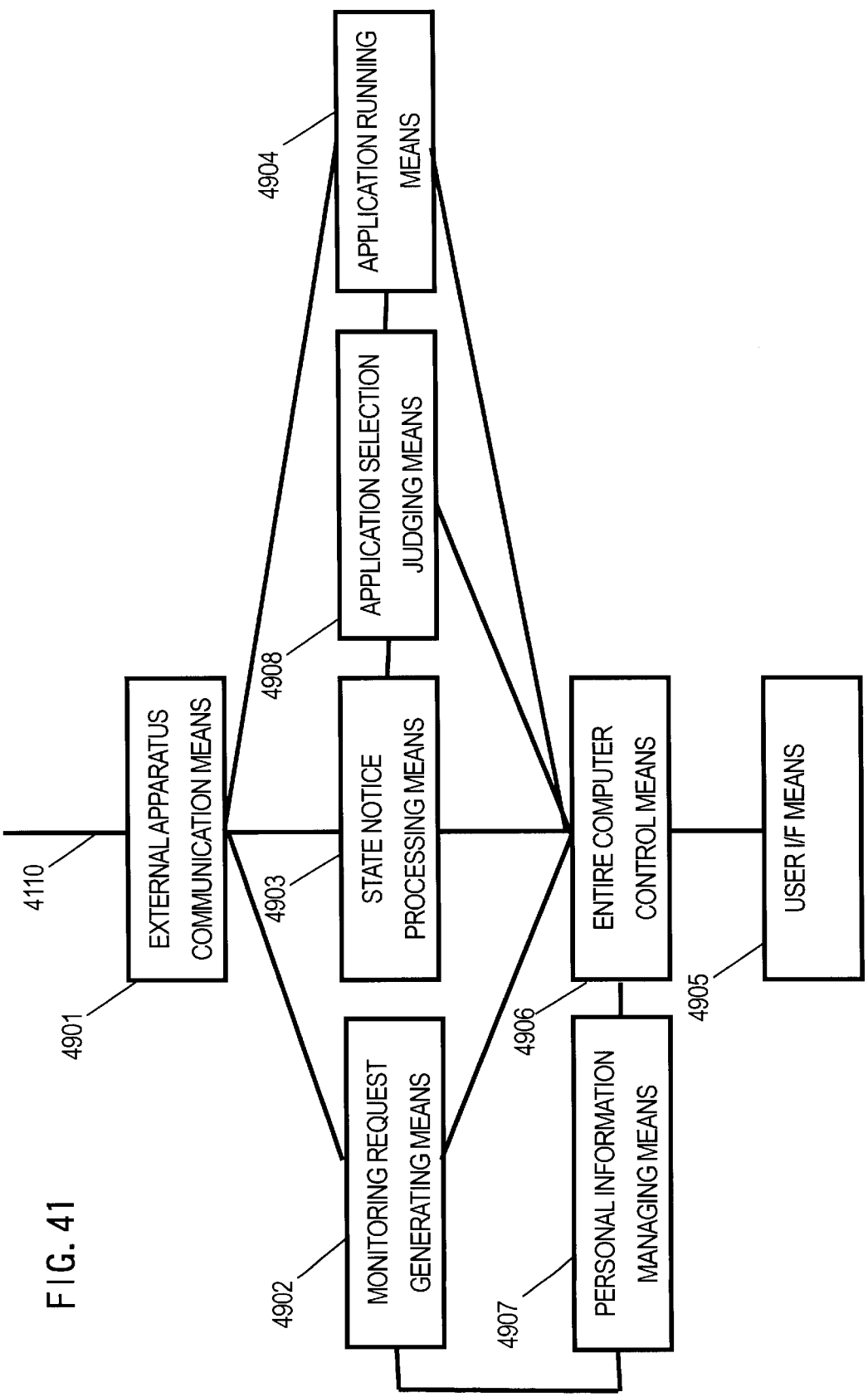
FIG. 41 is a block diagram showing a configuration of a computer in a communication system according to a 10th embodiment of the invention.

Since means 4901–4903 and 4905–4906 shown in FIG. 41 are the same as the means 4401–4403 and 4405–4406 shown in FIG. 36 (ninth embodiment), they are not described here.

Reference numeral 4904 denotes an application running means. Examples of the application running means 4904 are the video communication means 4404 shown in FIG. 36 (ninth embodiment) and a means for acquiring a file from another computer. Reference numeral 4907 denotes a personal information managing means for managing information relating to the user of the first telephone 4102. Information to be managed by the personal information managing means 4907 will be described later in detail. Reference numeral 4908 denotes an application selection judging means for judging, based on information added to a state notice, what application the application running means 4904 should run.

Since the first computer 4104 and the second computer 4105 have the same configuration, in the following description the means of the second computer 4105 will be referred to by using reference symbols 4901A–4908A as in the case of the ninth embodiment.

Figure 42:
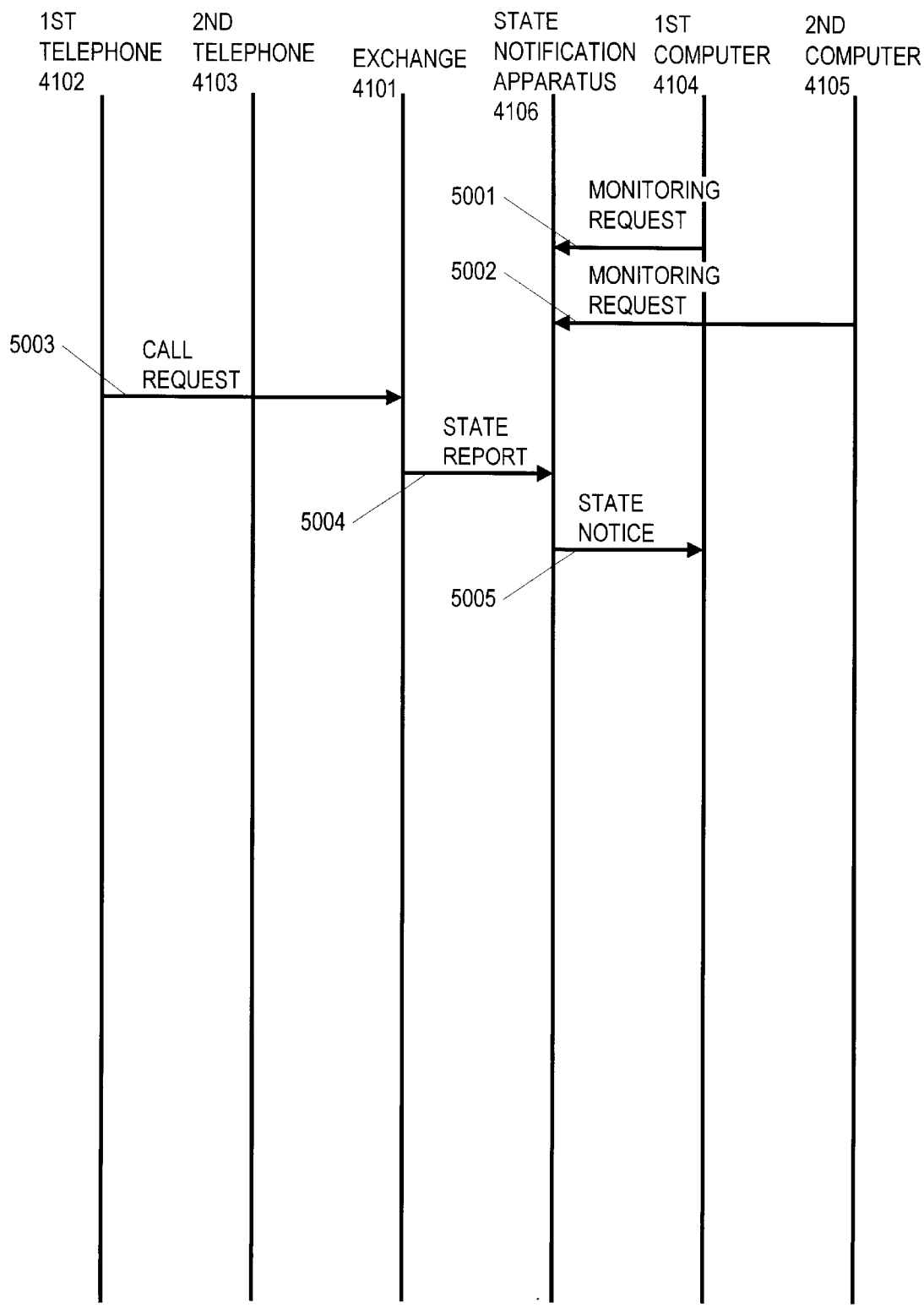
FIG. 42 is a signal diagram showing the operation of the communication system according to the 10th embodiment.

The operation of the communication system according to the 10th embodiment will be described below. FIG. 42 is a signal diagram of the communication system according to the 10th embodiment.

The operation of the communication system will be described below by using an example in which the second telephone 4103 is busy when the first telephone 4102 calls it and hence an application for sending e-mail to the user of the second telephone 4103 by using the first computer 4104 is started. In the 10th embodiment, as in the case of the ninth embodiment, monitoring requests 5001 and 5002 are sent from the first computer 4104 and the second computer 4105, respectively to the state notification apparatus 4106. However, the contents of the monitoring requests 5001 and 5002 are different from the monitoring requests 4501 and 4502 in the ninth embodiment.

An example format of the monitoring request used in the 10th embodiment will be described below with reference to FIG. 43.

Figure 43:
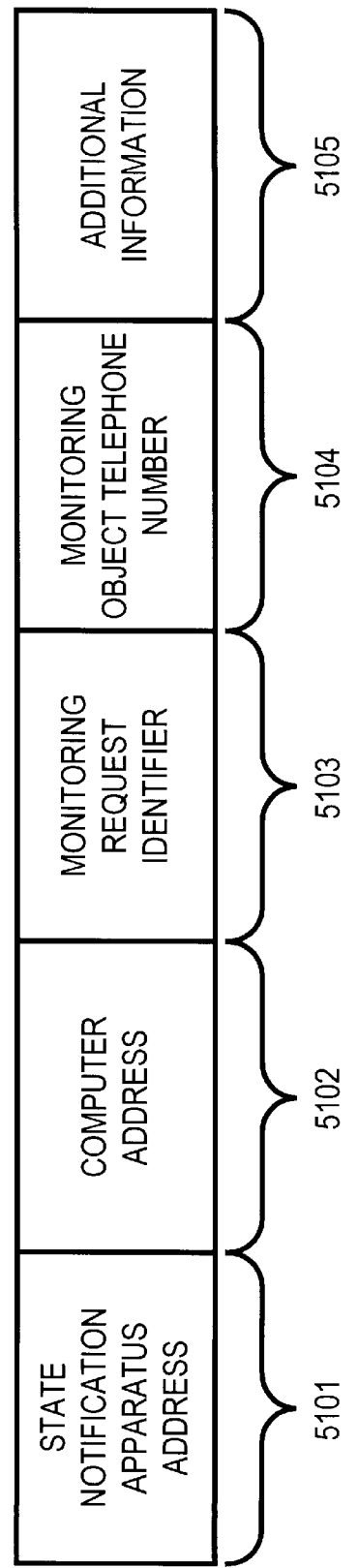
FIG. 43 is a format diagram of a monitoring request used in the communication system according to the 10th embodiment.
Figure 44:
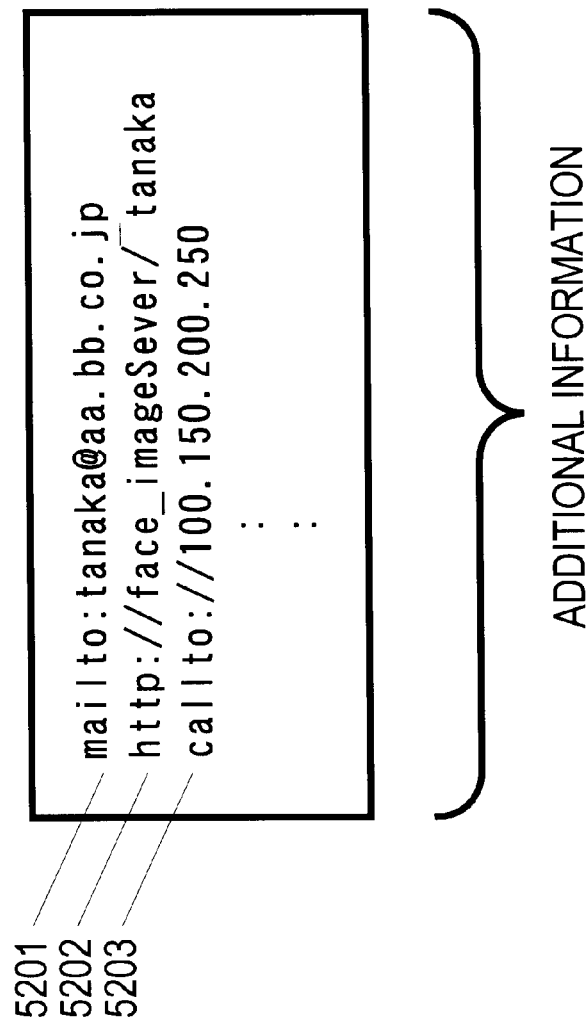
FIG. 44 is a format diagram of additional information of a monitoring request used in the 10th embodiment.

Fields 5101–5104 shown in FIG. 43 are the same as fields 4601–4604 shown in FIG. 38 (ninth embodiment). Field 5105 accommodates information relating to the user of a telephone as additional information. An example of this information will be described with reference to FIG. 44. As shown in FIG. 44, the mail address 5201 of the user, the location 5202 of a still picture file of the face of the user, the address 5203 of a computer to be used for performing a voice or video communication via a computer network, and other information are accommodated as additional information. In the example of FIG. 44, the additional information is represented in the form of URL (uniform resource locator) descriptions according to RFC 1738 of IETF and "mailto:" "http:" "callto:" etc. represent protocols for a communication.

Operations performed by the first computer 4104 and the state notification apparatus 4106 when a monitoring request 5001 is sent will be described below. Information relating to the user of the first telephone 4102 as shown in FIG. 44 is managed by the personal information managing means 4907. Therefore, in the first computer 4104, in generating a monitoring request 5001, the monitoring request generating means 4902 acquires information relating to the user from the personal information managing means 4907, has it accommodated in field 5105 as additional information, and sends the generated monitoring request 5001 to the state notification apparatus 4106 via the external apparatus communication means 4901. In the state notification apparatus 4106, the monitoring request processing means 4304 receives the monitoring request 5001 via the computer communication means 4303. The monitoring request processing means 4304 executes a process of causing the monitoring information managing means 4305 to store collectively the address of the first computer 4104 accommodated in field 5102, the telephone number of the first telephone 4102 accommodated in field 5104, and the additional information accommodated in field 5105.

In the communication system of this embodiment, a monitoring request 5002 for requesting transmission of a state notice for the second telephone 4103 in which information of the user of the second telephone 4103 is accommodated in field 5105 is also sent from the second computer 4105 to the state notification apparatus 4106. Since operations performed in this case are the same as in the case of the monitoring request 5001, they are not described here.

When the monitoring requests 5001 and 5002 have been processed, the monitoring information managing means 4305 of the state notification apparatus 4106 should store the information of the monitoring requests 5001 and 5002 that have been sent from the first computer 4104 and the second computer 4105. FIGS. 45A and 45B show an example of information stored in the monitoring information managing means 4305. As denoted by reference numeral 5301 in FIG. 45A, the monitoring information managing means 4305 collectively stores the address of the first computer 4104 accommodated in field 5102 of the monitoring request 5001, the telephone number of the first telephone 4102 accommodated in field 5104, and information relating to the user of the first telephone 4102 accommodated in field 5105. Similarly, as denoted by reference numeral 5302 in FIG. 45B, the monitoring information managing means 4305 collectively stores the address of the second computer 4105 accommodated in field 5102 of the monitoring request 5002, the telephone number of the second telephone 4103 accommodated in field 5104, and information relating to the user of the second telephone 4103 accommodated in field 5105.

Operations of the communication system will be described below that are performed when the first telephone 4102 calls the second telephone 4103 after the monitoring requests 5001 and 5002 have been processed but the second telephone 4103 is busy.

A request 5003 for a call from the first telephone 4102 to the second telephone 4103 is sent from the first telephone 4012 to the exchange 4101. The telephone communication means 4201 of the exchange 4101 receives the call request 5003 and the entire exchange control means 4204 executes such processes as number analysis. As a result, the first telephone 4102 is informed, by busy tones or the like, that a connection cannot be established for the call to the second telephone 4103 because the second telephone 4103 is busy.

At this time, a state report 5004 to the effect that the call from the first telephone 4102 cannot be received by the second telephone 4103 is sent from the exchange 4101 to the state notification apparatus 4106. This is realized in such a manner that the entire exchange control means 4204 informs the state report generating means 4203 that a reception control of the call from the first telephone 4102 to the second telephone 4103 cannot be performed because the second telephone 4103 is busy, and the state report generating means 4203 generates a state report indicating that call reception is impossible and sends it out via the state notification apparatus communication means 4202.

When receiving the state report 5004, the state notification apparatus 4106 sends the first computer 4104 a state notice 5005 indicating that call reception is impossible.

An example of the state notice 5005 will be described with reference to FIG. 46.

Figure 46:
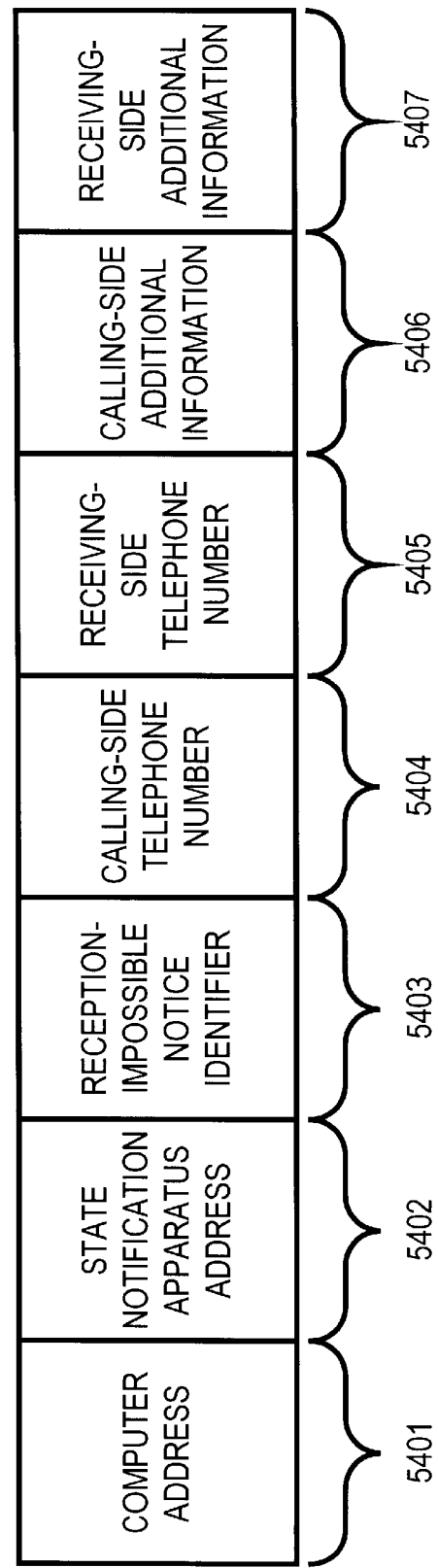
FIG. 46 is a format diagram of a reception-impossible notice used in the communication system according to the 10th embodiment.

In FIG. 46, fields 5401–5405 are the same as fields 4801–4805 shown in FIG. 40 (ninth embodiment) with an exception that field 5404 accommodates an identifier indicating that the state notice shows that call reception is impossible. Field 5406 accommodates the additional information that was accommodated in field 5105 of the monitoring request 5001, that is, the information relating to the user of the first telephone 4102. Field 5407 accommodates the additional information that was accommodated in field 5105 of the monitoring request 5002, that is, the information relating to the user of the second telephone 4103. This is realized in such a manner that in the state notification apparatus 4106 the state notice generating means 4302 receives the state report 5005 from the exchange 4101 via the exchange communication means 4301 and generates fields 5406 and 5407 based on the information (see FIGS. 45A and 45B) managed by the monitoring request managing means 4305.

When receiving the state notice 5005, the first computer 4104 starts processing based on the information relating to the user of the second telephone 4103 that is accommodated in the state notice 5005. An example in which an application for generating e-mail is started will be described below. In the first computer 4104, the state notice processing means 4903 receives the state notice 5005 via the external apparatus communication means 4901. The state notice processing means 4903 informs the application selection judging means 4908 that it has received the state notice 5005 that includes information relating to the user of the second telephone 4103 in field 5407 and shows that call reception is impossible. The application selection judging means 4908 outputs the information 5201 (see FIG. 44) to the application running means 4904, which then starts an e-mail generation application and causes it to use the e-mail address 5201 as an address. This is realized by providing functions of interpreting an input parameter that is a URL description as shown in FIG. 44 and determining an application to be started and an argument to be input to the application. In the above example, the application to be started is the e-mail generation application and an argument to be input is the e-mail address.

As a result, an operation is realized that an application for sending email to the user of the second telephone 4103 is automatically started in the first computer 4104 if the second telephone 4103 is busy when the first telephone 4102 calls the second telephone 4103.

In the above example, the e-mail generation application is started by using the information 5201 shown in FIG. 44. It is easily understood from the operation of the above-described communication system that an operation as exemplified below can be realized. That is, the state notice 5005 is made a state notice indicating that a call from the first telephone 4102 has been received by the second telephone 4103. The first computer 4104 that has received such a state notice acquires a still picture file of the face of the user of the second telephone 4103 by using the information 5202 (see FIG. 44) and displays it. It is also understood easily that a video communication can be performed by using the information 5203 shown in FIG. 44.

As described above, the communication system according to the 10th embodiment is provided with first and second computers each comprising a personal information managing means for storing information relating to the user of a telephone, an application selection judging means for selecting information to be used from information relating to the users of telephones that is included in a state notice, and an application running means for running an application by using, as an input parameter, the information relating to the user of the telephone that is included in the state notice; and an exchange comprising a monitoring information managing means for managing information relating to the users of telephones that is included in monitoring requests, and a state notice generating means for incorporating the information relating to the users of the telephones in the state notice.

With the above configuration, the invention provides the following three advantages.

First, since the state notification apparatus simply manages additional information that is accommodated in monitoring requests and sends a computer a state notice accommodating the additional information, the state notification apparatus need not perform processing for various kinds of communications to be performed between the first and second computers. That is, a session having a new function between the first and second computers can be started by merely changing additional information to be accommodated in monitoring requests without the need for adding a new function to the state notification apparatus.

Second, since the state notification apparatus simply manages additional information that is accommodated in monitoring requests and sends a computer a state notice accommodating the additional information, a new function can easily be added to only the first and second computers, which means that the system is superior in extendability. For example, if the first computer sends out a monitoring request accommodating additional information that describes locations of a document file, figures, data, etc., the document file, figures, data, etc. can be sent from the first computer to the second computer when the first telephone calls the second telephone.

Third, since the application running means runs an application by using, as an input parameter, information relating to the user of a telephone that is accommodated in a monitoring request, the amount of processes to be executed by the computer from the reception of a state notice to the start of an application can be reduced. In general, many of recent computers are equipped with a means capable of starting an application by using URL-description-based information as an input parameter. That is, a system can easily be constructed in such a manner that information relating to the user of a telephone to be accommodated in a monitoring request is written as a URL description, the information is sent from the state notification apparatus to a computer in such a manner as to be accommodated in a state notice, and the application selection judging means of the computer selects information relating to the user of a telephone to be used, as described in the 10th embodiment.

The 10th embodiment is directed to the case where pieces of URL-description-based information are simply listed as shown in FIG. 44, it is easily understood that a rule-related description such as that an e-mail address should be used when the line is busy can be added.

Embodiment 11

A communication system according to an 11th embodiment of the invention will be described below. The 11th embodiment is different from the ninth embodiment in the detailed configurations of the state notification apparatus 4106, the first computer 4104, and the second computer 4105.

The detailed configuration of the state notification apparatus 4106 according to the 11th embodiment will be described below with reference to FIG. 47, which is a block diagram showing its example configuration.

Figure 47:
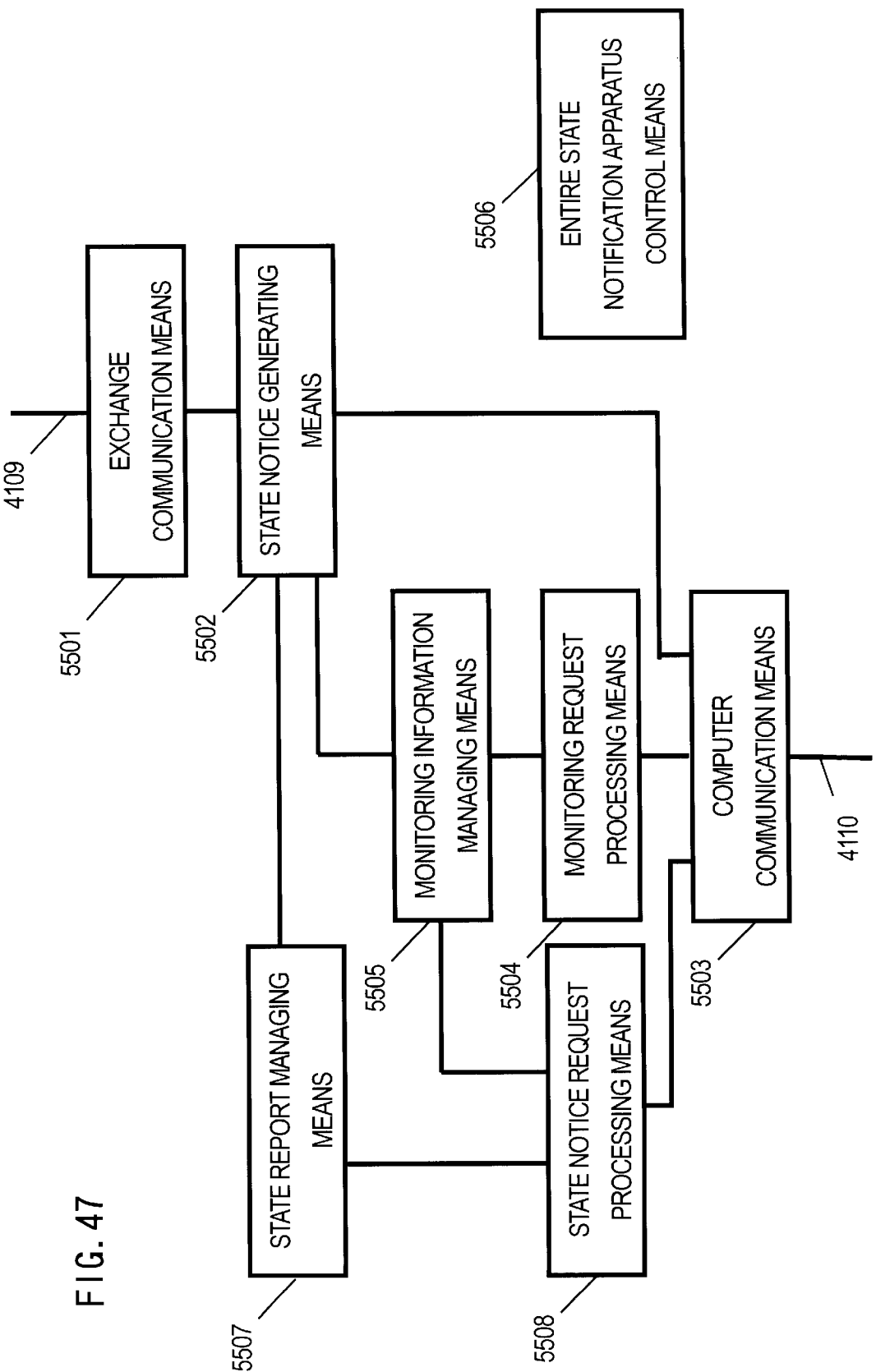
FIG. 47 is a block diagram showing a configuration of a state notification apparatus in a communication system according to the 11th embodiment.

Since means 5501–5506 shown in FIG. 47 are the same as the means 4301–4306 shown in FIG. 35 (ninth embodiment), they are not described here. Reference numeral 5507 denotes a state report managing means for managing a state report that is received from the exchange 4101. Reference numeral 5508 denotes a state notice request processing means for processing a request for output of a state notice. Although actually the entire state notification apparatus control means 5506 shown in FIG. 47 is connected to the means 5501–5505 and 5507–5508, no lines indicating those connections are drawn in FIG. 47 to simplify the drawing.

The detailed configuration of the first computer 4104 according to the 11th embodiment will be described below with reference to FIG. 48, which is a block diagram showing its example configuration.

Figure 48:
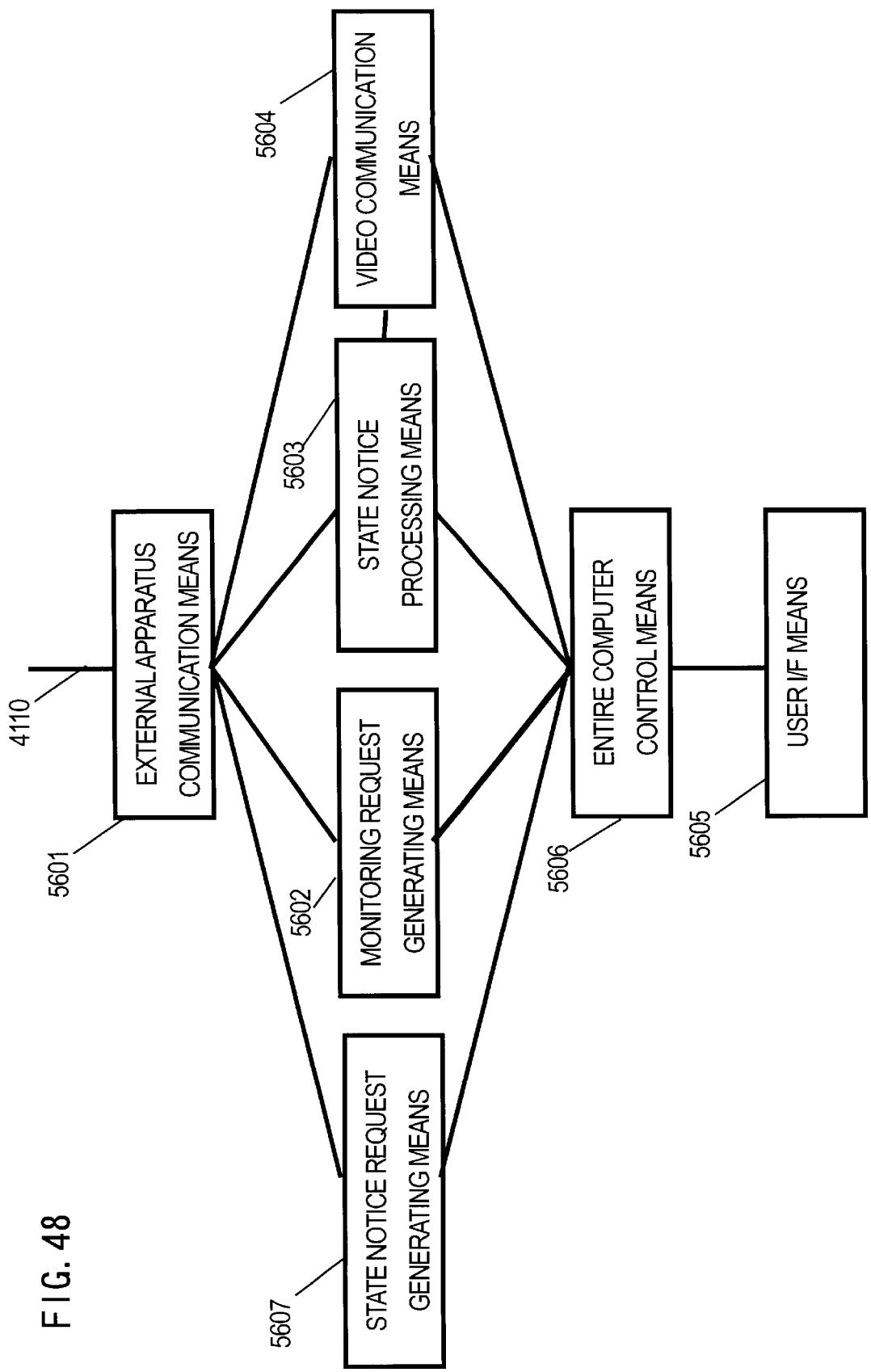
FIG. 48 is a block diagram showing a configuration of a computer in the communication system according to the 11th embodiment.

Since means 5601–5606 shown in FIG. 48 are the same as the means 4401–4406 shown in FIG. 36 (ninth embodiment), they are not described here. Reference numeral 5607 denotes a state notice request generating means for generating a state notice request for requesting transmission of a state notice.

Since the first computer 4104 and the second computer 4105 have the same configuration, in the following description the means of the second computer 4105 will be referred to by using reference symbols 5601A–5607A as in the case of the ninth embodiment.

Figure 49:
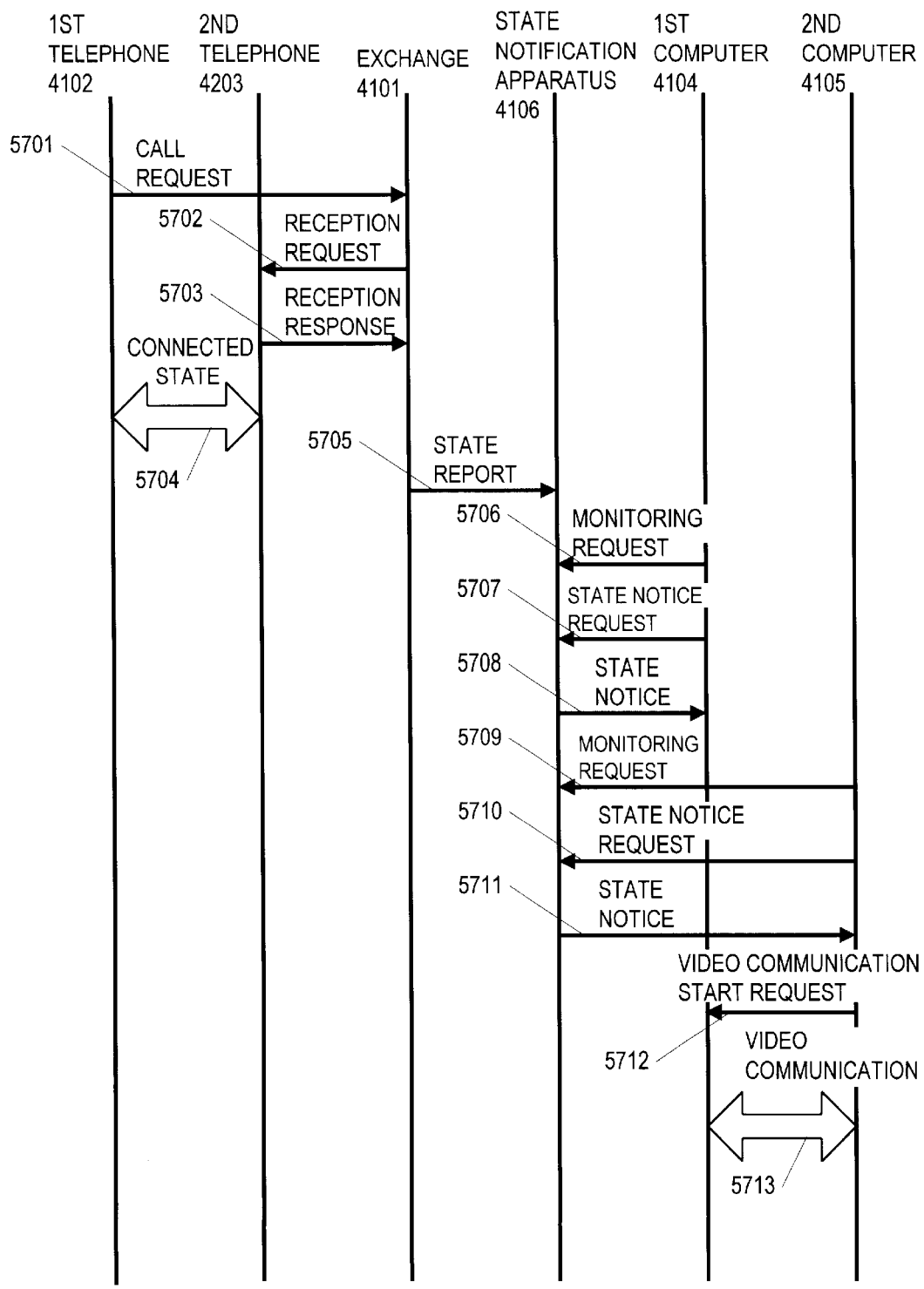
FIG. 49 is a signal diagram showing the operation of the communication system according to the 11th embodiment.

The operation of the communication system according to the 11th embodiment will be described below. FIG. 49 is a signal diagram of the communication system according to the 11th embodiment. First, the operation of the communication system will be described below by using an example in which a video communication between the first computer 4104 and the second computer 4105 as described in the ninth embodiment is started after a connected state has been established as a result of a call from the first telephone 4102 to the second telephone 4103.

In the communication system of the 11th embodiment, as shown by signals 5701–5704, a connected state is established between the first telephone 4102 and the second telephone 4103 before the first computer 4104 and the second computer 4105 send out monitoring requests. Since operations of the communication system involving the signals 5701–5704 can easily be understood from the ninth embodiment, it is not described here.

When a connected state has been established between the first telephone 4102 and the second telephone 4103, a state report 5705 indicating the establishment of a connected state is sent from the exchange 4101 to the state notification apparatus 4106. In the state notification apparatus 4106, the state report 5705 is input to the state notice generating means 5502 via the exchange communication means 5501. In the 11th embodiment, the state notice generating means 5502 not only processes the received state report 5705 in the same manner as in the ninth embodiment but also outputs the state report 5705 to the state report managing means 5507 to have it manage the state report 5705.

At this time point, since the first computer 4014 and the second computer 4105 have not sent out monitoring requests, the state report 5705 is managed by the state report managing means 5507 without being sent to the computers 4104 and 4105.

Next, operation s performed after the first computer 4104 issue s a monitoring request will be described. In the 11th embodiment, after a monitoring request 5706 has been issued, the first computer 4104 sends out a state notice request 5707 for requesting transmission of a state notice to be generated in response to the last state report for the first telephone 4102 that has been sent from the exchange 4101 to the state notification apparatus 4106. Specifically, in the first computer 4104, the state notice request 5707 is generated by the state notice request generating means 5607 and sent out via the external apparatus communication means 5601.

An example format of the state notice request 5707 is such that field 4603 (see FIG. 38) accommodates an identifier indicating that the signal is a state notice request and field 4604 accommodates the telephone number of the first telephone 4102.

In the state notification apparatus 4106, the state notice request processing means 5508 receives the state notice request 5707 via the computer communication means 5503. The state notice request processing means 5508 acquires, from the state report managing means 5507, the last state report for the first telephone 4102 whose telephone number is accommodated in the state notice request 5707 and generates a state notice 5508. As a result, the state notice 5708 indicating the establishment of a connected state between the first telephone 4102 and the second telephone 4103 is sent to the first computer 5104. As for the state notice 5708, among the fields described in the ninth embodiment in connection with FIG. 40, field 4803 accommodates an identifier indicating that the signal is a state notice that is sent in response to a state notice request and shows the establishment of a connected state, and field 4807 accommodates no information because the second computer 4105 has not yet sent out a monitoring request for the second telephone 4103 as the receiving-side telephone. The other fields accommodate the same kinds of information as in the ninth embodiment.

Operations performed after the second computer 4105 has issued a monitoring request will be described below. As shown by signals 5709 and 5710, the second computer 4105 also sends a monitoring request for the second telephone 4103 and a state notice request to the state notification apparatus 4106. A state notice 5711 indicating that a connected state is established between the first telephone 4102 and the second telephone 4103 is sent to the second computer 4105. Since the first computer 4104 has already sent out a monitoring request, field 4806 of the state notice 5711 accommodates the address of the first computer 4104. The other fields accommodate the same kinds of information as the state notice 5708.

As a result, a video communication start request 1712 is sent from the second computer 4105 to the first computer 4104 and a video communication 5713 is performed between the first computer 4104 and the second computer 4105 in the same manner as in the case of the ninth embodiment.

Detailed operations of the first computer 4104 and the second computer 4105 until the start of a video communication will be described with reference to FIG. 50.

Figure 50:
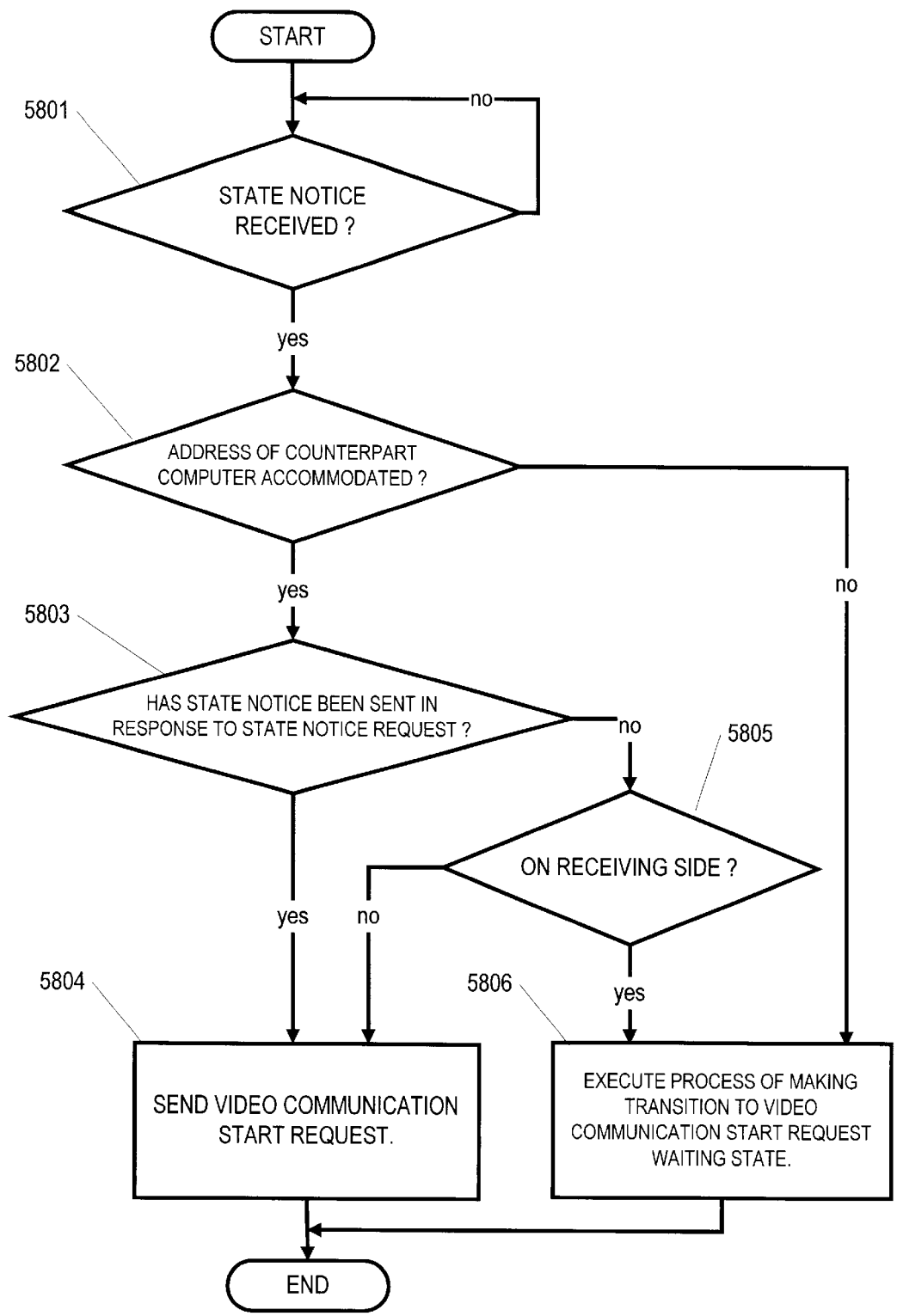
FIG. 50 is a flowchart showing the operation of a state notice processing means of a computer in the communication system according to the 11th embodiment.

FIG. 50 is a flowchart showing operations of the state notice processing means 5603 of the first computer 4104 and the state notice processing means 5603A of the second computer 4105.

First, operations of the state notice processing means 5603 of the first computer 4104 will be described. The state notice processing means 5603 is rendered in a waiting state until reception of a state notice (step 5801). Upon reception of a state notice 5708, the state notice processing means 5603 checks whether the address of the counterpart computer is accommodated in the received state notice (step 5802). Since at this time the state notice 5708 does not contain the address of the second computer 4015 in field 4807, the process makes a transition to a state of waiting for a video communication start request (step 5806) and the process is finished. Actually, this is done in such a manner that the state notice processing means 5603 instructs the video communication means 5604 to execute a process of making a transition to a video communication start request waiting state.

Next, operations of the state notice processing means 5603A of the second computer 4105 will be described. Like the state notice processing means 5603, the state notice processing means 5603A is rendered in a waiting state until reception of a state notice (step 5801). Upon reception of a state notice 5711, the state notice processing means 5603A checks whether the address of the counterpart computer is accommodated in the received state notice 5711 (step 5802). Since at this time the state notice 5711 contains the address of the first computer 4014 in field 4806, the state notice processing means 5603A checks whether the received state notice 5711 is one that has been sent in response to a state notice request (step 5803). Since at this time field 5803 of the state notice 5711 accommodates an identifier indicating that the state notice 5711 has been sent in response to a state notice request and shows the establishment of a connected state, the state notice processing means 5603A issues, to the video communication means 5604A, a request for requesting the first computer 4104 whose address is accommodated in field 4806 to start a video communication (step 5804). As a result, the video communication means 5604A of the second computer 4105 sends out a video communication start request 5712. The video communication means 5604 of the first computer 4104, which has been rendered in a video communication start request waiting state, responds to the video communication start request 5712, whereby a video communication 1713 is performed between the first computer 4104 and the second computer 4105.

It is noted that the flowchart of FIG. 50 is also applicable to the communication system according to the ninth embodiment.

In the ninth embodiment, after making a transition from step 5801 to 5802, the first computer 4104 receives a state notice (see FIG. 40) that contains the address of the counterpart computer and hence makes a transition to step 5803. At step 5803, since the received state notice is not one that has been sent in response to a state notice request, a transition is made to step 5805. Since the first telephone 5102 being monitored by the first computer 5104 is on the calling side, a transition is made to step 5804, where the first computer 5104 issues a video communication start request.

In the ninth embodiment, after making a transition from step 5801 to step 5802, the second computer 4105 receives a state notice that contains the address of the counterpart computer and hence makes a transition to step 5803. At step 5803, since the received state notice is not one that has been sent in response to a state notice request, a transition is made to step 5805. Since the second telephone 5103 being monitored by the second computer 5105 is on the receiving side, a transition is made to step 5806, where a transition is made to a video communication start request waiting state.

The above description has shown that in the communication system of this embodiment a video communication between the first computer 4104 and the second computer 4105 can be started even if the first computer 4104 and the second computer 4105 send out monitoring requests after the first computer 4104 and the second computer 4105 have been rendered in a connected state.

Another example of the operation of the communication system according to the 11th embodiment will be described below with reference to FIG. 51. In this example, the second computer 4105 is reactivated after a video communication between the first computer 4104 and the second computer 4105 has been started as described in the ninth embodiment.

Figure 51:
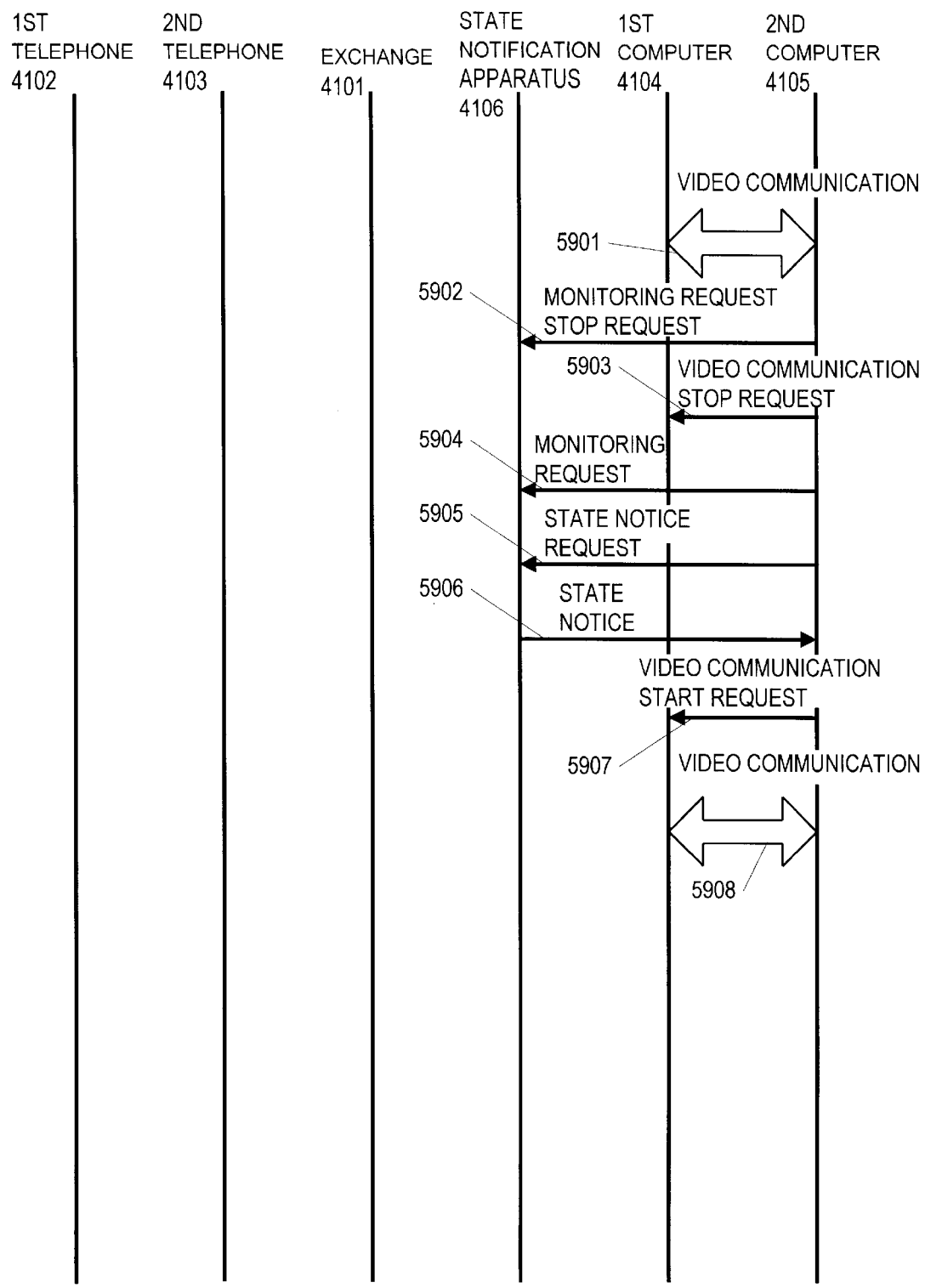
FIG. 51 is a signal diagram showing another example of the operation of the communication system according to the 11th embodiment.

A video communication 5901 shown in FIG. 51 is similar to the video communication 4511 shown in FIG. 37 (ninth embodiment).

In connection with the reactivation of the second computer 4105, the second computer 4105 sends the state notification apparatus 4106 and the first computer 4104 information 5902 and information 5903, respectively, indicating that no communication can be performed with the second computer 4105. As for the information 5902, actually, the second computer 4105 issues a monitoring request stop request to the state notification apparatus 4106 before it is reactivated. An alternative method is such that the state notification apparatus 4106 detects that no communication can be performed with the second computer 4105. As for the information 5903, actually, the second computer 4105 issues a video communication stop request to the first computer 4104 before it is reactivated. An alternative method is such that the first computer 4104 detects that no communication can be performed with the second computer 4105. Any of the above methods or some other methods may be employed as long as they assure that the state notification apparatus 4106 and the first computer 4104 can recognize that the communication with the second computer 4105 should be stopped temporarily.

Upon reception of the signal 5903, the first computer 4104 makes a transition to a video communication start waiting state.

When the second computer 4105 has been reactivated, the second computer 4105 sends out a monitoring request 5904 for the second telephone 4103 and a state notice request 5905 for the second telephone 4103. In response, the state notification apparatus 4106 sends the second computer 4105 a state notice 5906 to the effect that the second telephone 4103 is in a state of being connected to the first telephone 4102. In this case, since the first computer 4104 has already sent a monitoring request to the state notification apparatus 4106, the state notice 5906 contains the address of the counterpart computer. Therefore, a transition is made from step 5802 to step 5803 and then to step 5804 (see FIG. 50), whereby a video communication start request 5907 is sent from the second computer 4105 to the first computer 4104. Since the first computer 4104, which has been rendered in a video communication start waiting state, responds to the request 5907, a video communication between the first computer 4104 and the second computer 4105 is restarted automatically.

Although the above description is directed to the case where the second computer 4105 is reactivated, similar operations may be performed when the second computer 4105 simply stops a video communication with the first computer 4104.

The operation of the communication system described above in connection with FIG. 51 is applicable to not only the case where the second computer 4105 is reactivated but also a case where only the first computer 4104 has issued a monitoring request when a connected state has been established between the first telephone 4102 and the second telephone 4103. In this case, since the first computer 4104 makes a transition from step 5802 to step 5806 (see FIG. 50), it is rendered in a video communication start request waiting state. When the second computer 4105 has thereafter issued a monitoring request, the second computer 4105 makes a transition from step 5802 to step 5803 and then to step 5804 (see FIG. 50). Therefore, the second computer 4105 sends a video communication start request to the first computer 4104. Since the first computer 4104, which has been rendered in a video communication start waiting state, responds to the video communication start request, a video communication between the first computer 4104 and the second computer 4105 is started automatically. It is easily understood that a video communication between the first computer 4104 and the second computer 4105 can be started in the following manner in a case where the second telephone 4105 is a cellular telephone of PHS (personal handyphone system) or the like and the second computer 4105 is a nearby computer. That is, after the PHS telephone responds to a call from the first telephone 4102, the telephone number of the PHS telephone is input through the user interface means 5605A of the second computer 4105. Then, the monitoring request generating means 5602A sends out a monitoring request for the PHS telephone via the entire computer control means 5606A and the state notice request generating means 5607A sends out a state notice request for the PHS telephone via the entire computer control means 5606A.

As described above, the communication system according to the 11th embodiment is provided with first and second computers each comprising a state notice request generating means for requesting transmission of a state notice for a telephone; and a state notification apparatus comprising a state report managing means for managing a state report that is sent from an exchange, and a state notice request processing means for performing a control of sending out a state notice for the telephone upon reception of the state notice request.

With the above configuration, the invention provides the following four advantages.

First, a video communication between the first computer and the second computer can be started automatically in such a manner that the first and second computers send out state notice requests and acquire state notices from the state notification apparatus after a connected state has been established between the first and second telephones. That is, if the users of the first and second telephones instruct the first and second computers to start applications for issuing state notice requests in a state that the first and second telephones are performing a voice communication, the first and second computers can acquire the address of the counterpart computer that is included in a state notice.

Second, where one of the first and second computers is reactivated in a state a video communication is being performed between the first and second computers, the address of a computer with which to start a video communication can be acquired from a state notice and a video communication can be started automatically by sending out a state notice request at the time of reactivation without the need for storing the address of the computer with which the communication has been performed so far. That is, even if a video communication between the first and second computers is stopped because a trouble has occurred in the video communication, a video communication can be restarted automatically, contributing to increase in the reliability of a video communication.

Third, since a voice communication is performed between the first telephone and the second telephone via the exchange, the voice communication is not interrupted even if a computer or a video communication application is reactivated to restart a video communication when a trouble has occurred in a video communication between the first and second computers.

Fourth, even if one of the first and second computers has not sent out a monitoring request after the first and second telephones have been rendered in a connected state, a video communication can be started between the first and second computers by sending out a state notice request in that state. For example, in a case where the second telephone is a cellular telephone of PHS or the like, a video communication can be performed between a nearby computer and the first computer by inputting the telephone number of the PHS telephone to the nearby computer.

Although in the 11th embodiment the process to be executed in reactivating the second computer 4105 has been described with reference to FIG. 51, it is easily understood that this process is also applicable to a case of stopping a video communication with the first computer 4104.

In the 11th embodiment, in a case where the second telephone 4103 is a cellular telephone of PHS or the like, a nearby computer is used as the second computer 4105 and the telephone number of the PHS telephone is input to the second computer 4105 through the user interface means 5605A. The following configuration and operation can easily be realized. That is, a faint radio wave (e.g., infrared light) communication means is provided in each of the PHS telephone and the second computer 4105. A video communication between the first computer 4104 and the second computer 4105 is started by the PHS telephone's sending its telephone number to the second computer 4105 without requiring the user to manipulate the user interface means 5605A.

In the 11th embodiment, the state report managing means 5507 of the state notification means 4106 manages a state report that is sent from the exchange 4101 and the first computer 4104 and the second computer 4105 send out state notice requests. This makes it possible to process a state notice request sent from a computer by the state notification apparatus 4106 without the need for providing the exchange 4101 with a means for holding state reports sent in the past. However, it is easily understood that the advantages of the invention can still be obtained by the following configuration and operation. That is, a state acquisition request processing means for generating a report of the current state of a telephone upon reception of a request is provided in the exchange 4101. When state notice requests have been sent from the first computer 4104 and the second computer 4105 to the state notification apparatus 4106, the state notification apparatus 4106 sends the exchange 4101 a state acquisition request for acquiring the current states of telephones. The state acquisition request processing means of the exchange 4101 sends out a report of the current states of the telephones.

For example, the 11th embodiment has not referred to the case where the circuit of the second telephone 4103 is disconnected when the second computer 4105 is reactivated. In this case, it is easily understood that a video communication can be avoided in such a manner that when the second computer 4105 has issued a. state notice request after the reactivation, the state notification apparatus 4106 sends out a state notice indicating that the circuit of the second telephone 4103 is disconnected.

Consider a case where there exist a third telephone and a third computer that has sent out a monitoring request for the third telephone, and a holding transfer operation is performed by manipulating the first telephone 4102 so as to establish a connected state between the second telephone 4103 and the third telephone when the second computer 4105 is reactivated. In this case, the state notification apparatus 4106 sends out a state notice indicating that the second telephone 4103 and the third telephone are in a connected state in response to a state notice request that is sent from the second computer 4105. Therefore, a video communication between the second computer 4103 and the third computer can easily be started automatically.

Embodiment 12

A communication system according to a 12th embodiment will be described below.

Since the configuration of the communication system according to the 12th embodiment is the same as that of the communication system according to the 11th embodiment, it is not described here.

The operation of the communication system according to the 12th embodiment will be described below with reference to FIG. 52, which is its signal diagram.

Figure 52:
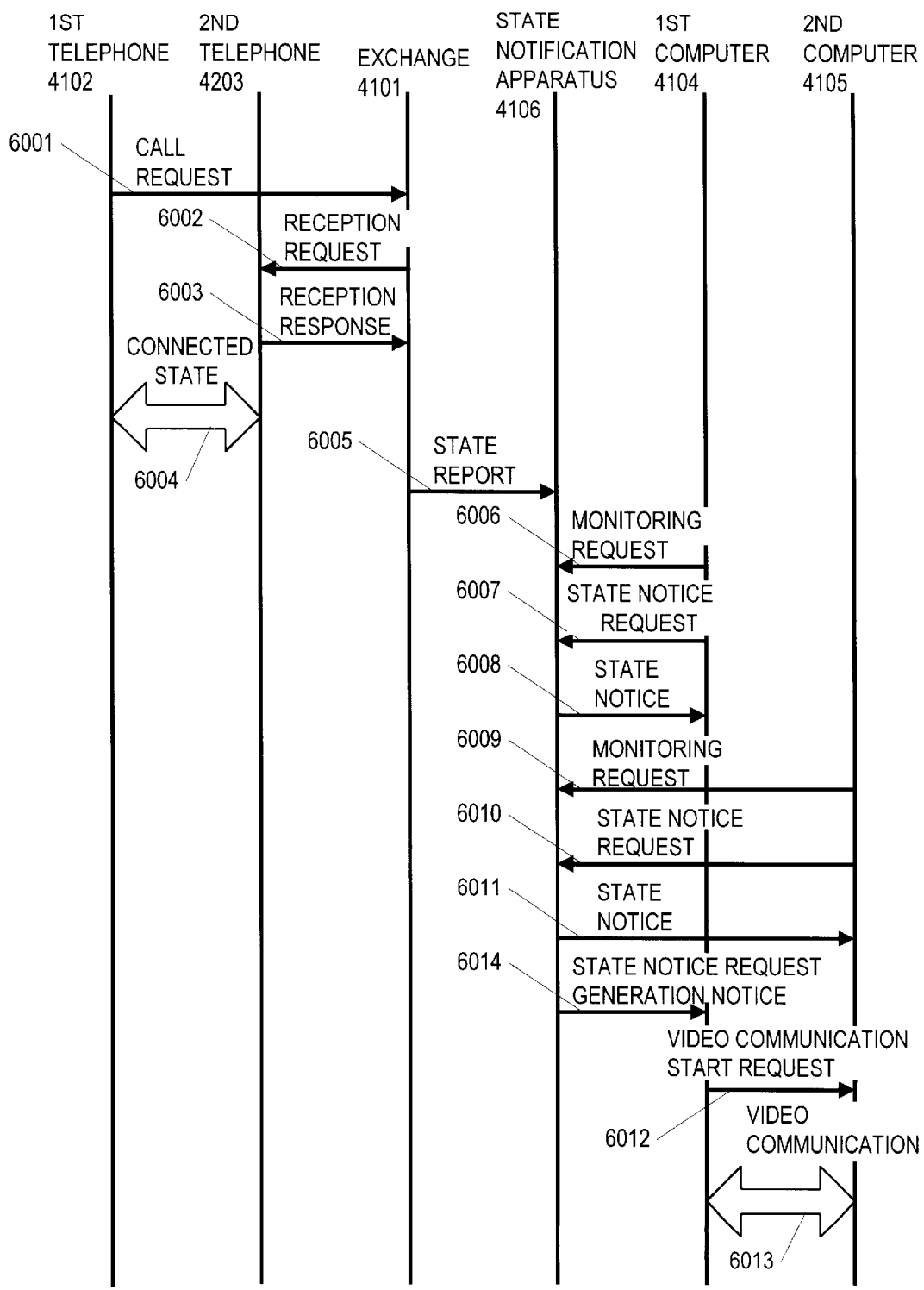
FIG. 52 is a signal diagram showing the operation of the communication system according to the 12th embodiment.

FIG. 52 corresponds to FIG. 49 (11th embodiment). FIG. 52 is different from FIG. 49 in that in FIG. 52 (12th embodiment) in response to a state notice request from the second computer 4105 the state notification apparatus 4106 sends the first computer 4104 a state notice request generation notice indicating that a state notice request has been sent from the second computer 4105.

The above operation of the communication system will be described below in detail. In the state notification apparatus 4106, when receiving a state notice request 6010 via the computer communication means 5503, the state notice request processing means 5508 acquires the last state report 6005 for the second telephone whose telephone number is accommodated in the state notice request 6010.

In the 11th embodiment, at this time, the state notice request processing means 5508 judges that the state notice request 6010 is one that has been sent from the second computer 4105 and sends only the second computer 4105 a state notice 1711 indicating establishment of a connected state. In contrast, in the 12th embodiment, the state notice request processing means 5508 sends, to the computer that is monitoring the telephone whose telephone number is accommodated in the state report 6005, a state notice request generation notice indicating occurrence of a state notice request. That is, in this case, a state notice request generation notice 6014 is sent to the first computer 4104.

Figure 53:
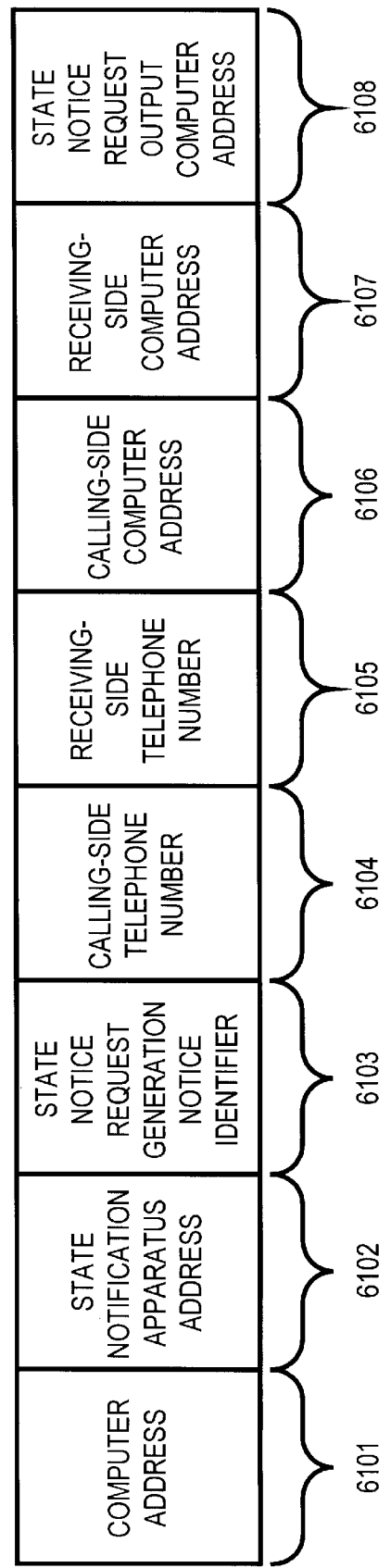
FIG. 53 is a format diagram showing the state notice request generation notice according to the 12th embodiment.
Figure 54:
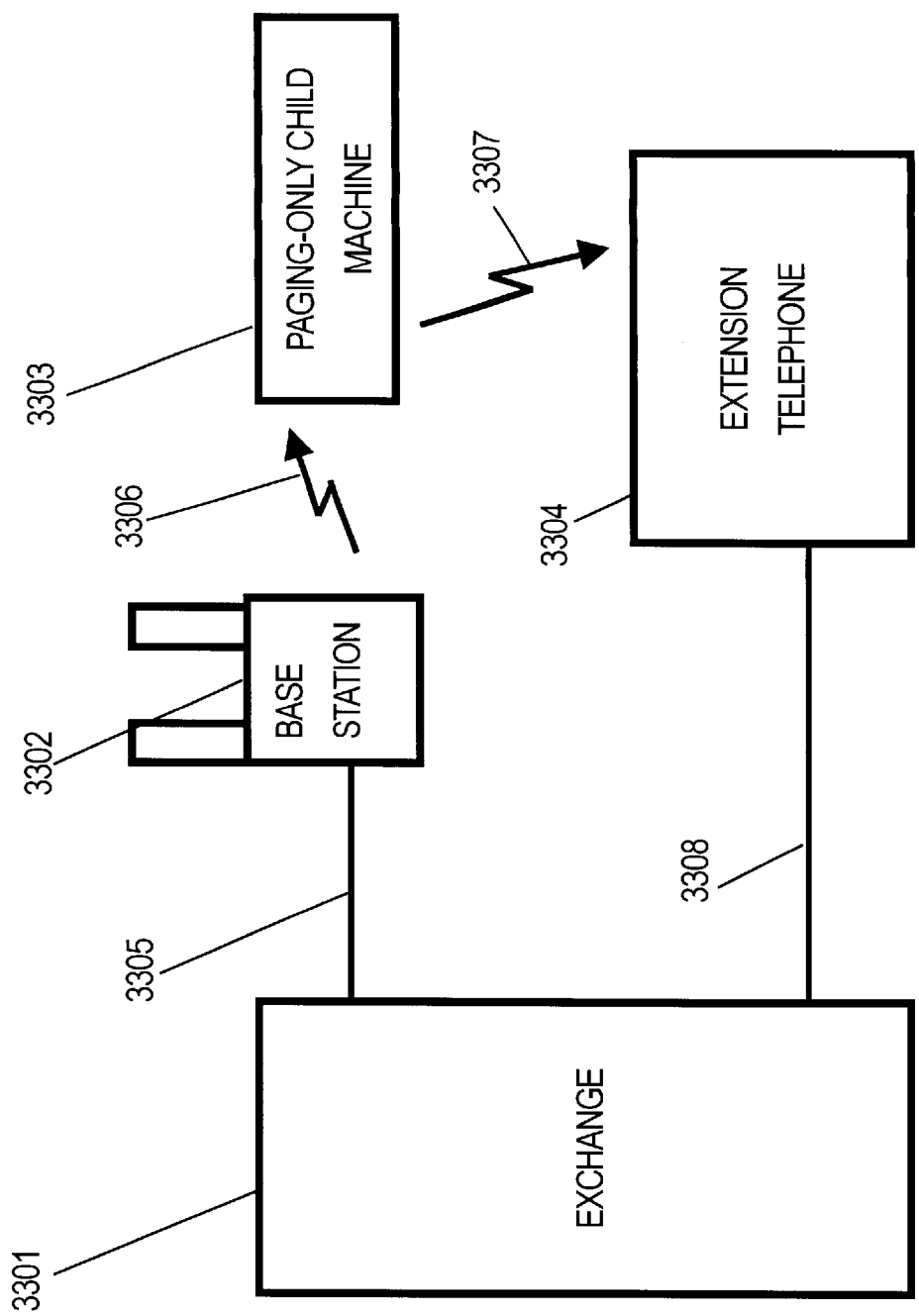
FIG. 54 is a block diagram showing the configuration of a conventional exchange system.
Figure 55:
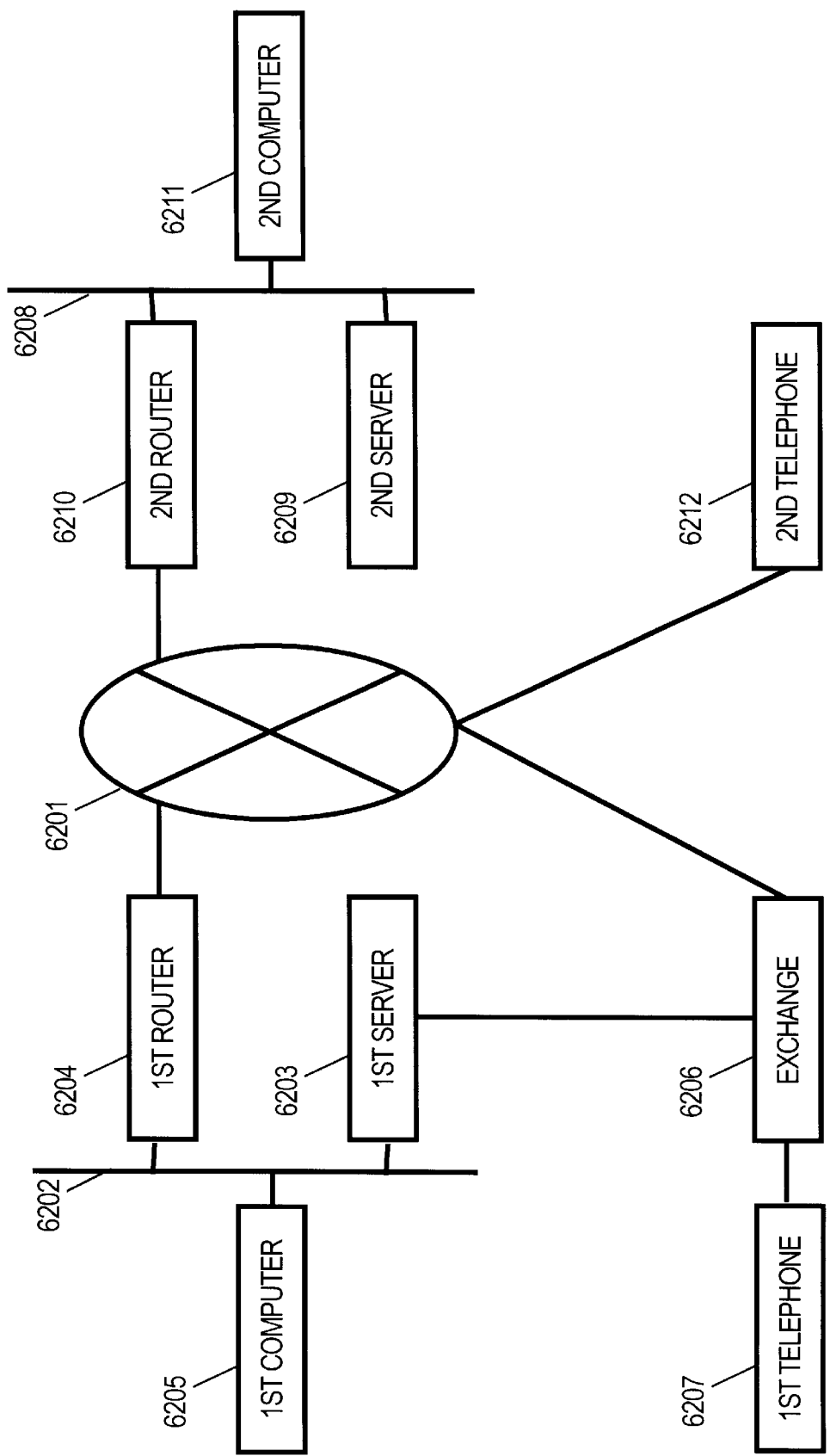
FIG. 55 a block diagram showing the configuration of a conventional communication system.
Figure 56:
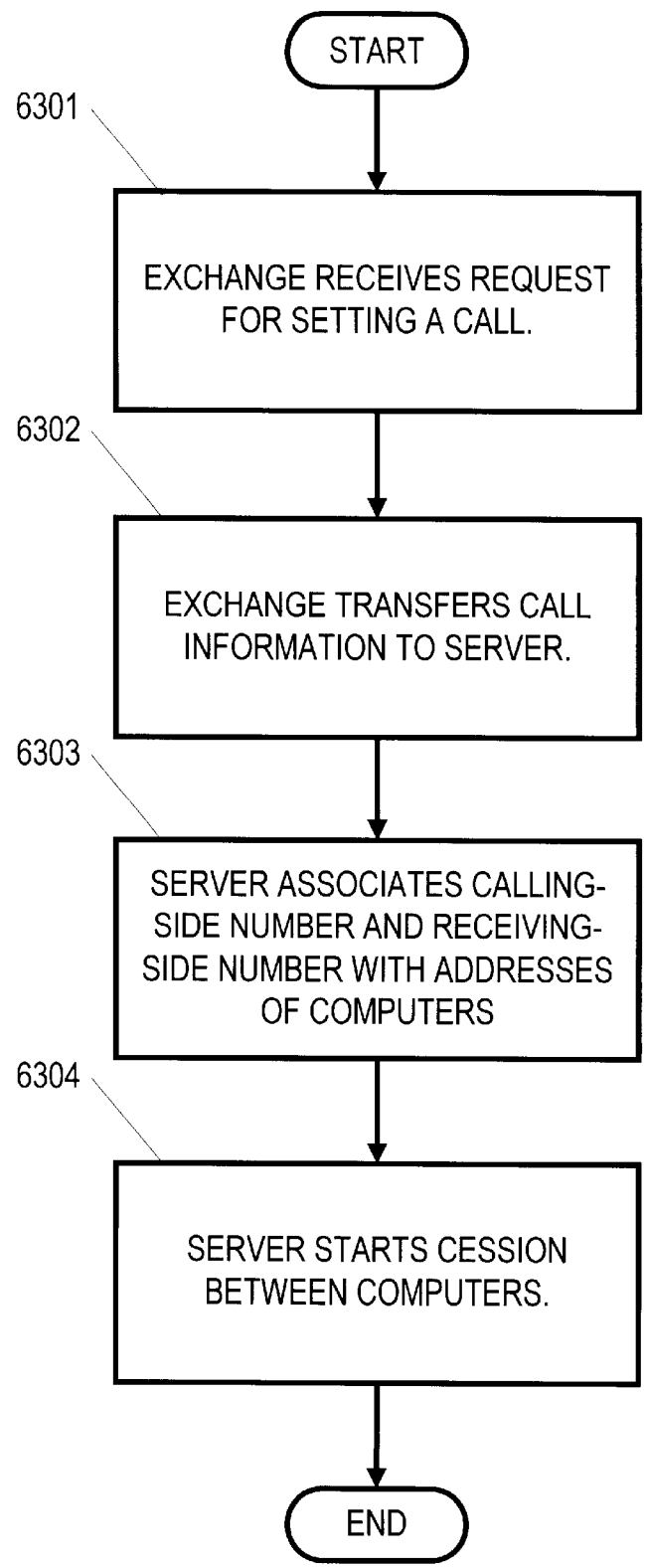
FIG. 56 is a flowchart showing the operation of the conventional communication system of FIG. 55.

The format of the state notice request generation notice 6014 will be described with reference to FIG. 53. In the state notice request generation notice 6014, field 6103 accommodates an identifier indicating that the signal is a state notice request generation notice. Field 6108 accommodates the address of a computer that has sent out a state notice request 6010, in this case, the address of the second computer 4105.

Although a state notice request 6007 is also sent from the first computer 4104, in this example no state notice request generation notice is sent to the second computer 4105. Tis is because the second computer 4105 has not sent out a monitoring request at this time point.

As described above, when th e second computer 4105 has sent a state notice request 6010 to the state notification apparatus 4106, the state notification apparatus 4106 s ends a state notice request generation notice 6014 to the first computer 4104. As a result, the first computer 4104 can judge that the second computer 4105 will send a video communication start request to the first computer 4104. In the 11th embodiment, upon reception of a state notice 6008, the first computer 4104 is rendered in a state of waiting for a video communication start request from another computer. In contrast, in the 12th embodiment, after reception of a state notice 6008, the first computer 4104 is rendered in a video communication start request waiting state at a time point when it receives a state notice request generation notice 6014. That is, the first computer 4104 does not start a video communication when receiving a state notice request generation notice from a computer other than the second computer after reception of a state notice 6008. This enables starting of a video communication only between the first computer 4104 and the second computer 4105.

The second computer 4105 sends out a state notice request 6010 to start a communication with another computer. Therefore, the communication counterpart of the second computer 4105, that is, the first computer 4104 is informed of the generation of the state notice request 6010. This notice is used not only in the first computer's making a judgment that it should not receive a communication from a computer other than the second computer 4105 as described above, but also in a communication preprocess, for example, a process of setting up the video communication means 5604 of the first computer 4104.

As described above, the communication system according to the 12th embodiment is provided with a state notification apparatus comprising a state notice generating means for sending, to a first computer that has sent out a monitoring request for a first telephone, a state notice request generation notice indicating that a second computer has sent out a state notice request if a state report corresponding to a state notice to be sent to the second computer accommodates the telephone number of the first telephone when receiving the state notice request from the second computer.

With the above configuration, the invention provides the following advantage.

Since the first computer can recognize from a state notice request generation notice that the second computer has sent out a state notice request, the first computer can start a process for a communication that will be started by the second computer. The process for a communication start includes not only a process for not receiving a video communication start request from a computer other than the second computer as explained in the above description of the operation of the communication system of this embodiment, but also general preprocesses that are performed before the start of a communication between the first and second computers such as a set-up process for the start of a video communication in the video communication means of the first computer.

An operation can easily be realized that a state notice request that 6010 is sent from the second computer 4105 is caused to accommodate additional information as described in the 10th embodiment, whereby the additional information can be transmitted to the first computer 4104 in the form of a state notice request generation notice 6014. For example, it is easily understood that if information indicating the location of a document file, data, or the like is employed as the additional information, the document file, data, or the like can be transmitted from the second computer 4105 to the first computer 4104 in a state that a circuit connection is established between the first telephone 4102 and the second telephone 4103.

What is claimed is:

1. A communication system comprising:
    an exchange;
    a first telephone connected to the exchange via a telephone circuit network; and
    a first computer connected to the exchange at least via the telephone circuit network, wherein:
        the first telephone is correlated with the first computer;
        the first telephone sends the first computer a first call reception state report indicating a call reception state of the first telephone;
        the first computer, when receiving the first call reception state report, sends the exchange a telephone circuit control instruction for a call directed to the first telephone; and
        the exchange, when receiving the telephone circuit control instruction, converts the call directed towards the first telephone as a call directed to the first computer according to the telephone circuit control instruction.

2. The communication system according to claim 1, wherein the prescribed telephone circuit control instruction is a reception call conversion request for requesting conversion of the call directed to the first telephone to a call to the first computer.

3. The communication system according to claim 1, wherein:

the first telephone comprises telephone faint radio wave communication means for performing a communication by faint radio waves;

the first computer comprises computer faint radio wave communication means for performing a communication by faint radio waves; and the first route is formed by the telephone faint radio wave communication means and the computer faint radio wave communication means.

4. The communication system according to claim 1, wherein the first telephone is a cellular telephone that is connected to the telephone circuit network by a radio communication.

5. The communication system according to claim 1, wherein:

a second telephone that is different from the first telephone is correlated with a second computer that is different from the first computer, and the exchange sends out a fist circuit state report relating to circuit switching between the first telephone and the second telephone, the communication system further comprising:

circuit state reporting means for receiving the first circuit state report and for sending the first computer a second circuit state report formed by adding an address of the second computer to the first circuit state report; and a data communication network for enabling a data communication at least between the first computer and the second computer, wherein the first computer stars, when receiving the second circuit state report, a data communication with the second computer via the data communication network by using the address of the second computer that is accommodated in the second circuit state report.

6. The communication system according to claim 1, wherein:

there exist a bird telephone that is different from the first telephone and a third computer that is different from the first computer;

the third computer sends the exchange a state report request that accommodates a telephone number of the third telephone; and the exchange sends out, when receiving the state report request, a third circuit state report for the first telephone and the third telephone in a state that the first telephone and the third telephone are in a circuit-connected state, the communication system further comprising:

circuit state reporting means for receiving the third circuit state report, and for sending the third computer a fourth circuit state report formed by adding an address of the first computer to the third circuit state report and a data communication network for enabling a data communication at least between the first and third computers, wherein the third computer starts, when receiving the fourth circuit state report, a data communication with the flat computer via the data communication network by using the address of the first computer that is accommodated in the fourth circuit state report.

7. The communication system according to claim 6, wherein:

the third telephone comprises telephone faint radio wave communication means for performing a communication by faint radio waves;

the third computer comprises computer faint radio wave communication means for performing a communication by faint radio waves; and the third telephone informs the third computer of the telephone number of the third telephone via a route formed by the telephone faint radio wave communication means and the computer faint radio wave communication means.

8. The communication system according to claim 1, further comprising an office apparatus having office apparatus faint radio wave communication means fir performing a communication by faint radio waves, wherein:

there exist a fourth telephone that is different from the first telephone and a fourth computer that is different from the first computer, the fourth telephone comprises telephone faint radio wave communication means for performing a communication by faint radio waves;

the office apparatus performs an information data communication with the fourth telephone via a route formed by the telephone faint radio wave communication means and the office apparatus faint radio wave communication means;

the fourth telephone performs an information data communication with the fourth computer, and an information data communication is performed between the office apparatus and the fourth computer.

9. The communication system according to claim 4, wherein the cellular telephone comprises cellular telephone user interface means as a user interface, radio communication means for performing a radio communication with a base station, cellular telephone faint radio wave communication means for communicating with the first computer by faint radio waves, and call reception state report generating means for generating the first call reception state report.

10. The communication system according to claim 9, wherein the cellular telephone comprises a main body having a cellular telephone user interface for performing display, and a wrist band for mounting the main body on a wrist, the wrist band being mounted with the cellular telephone faint radio wave communication means.

11. The communication system according to claim 10, wherein the cellular telephone faint radio wave communication means is located on the side of a palm of a hand when the wrist band of the cellular telephone is mounted around the wrist like a wrist watch.

12. The communication system according to claim 3, wherein the computer faint radio wave communication means is provided on a keyboard of the first computer.

13. The communication system according to claim 2, wherein the first computer comprises computer user interface means as a user interface, computer faint radio wave communication means for communicating with the first telephone by faint radio waves, exchange communication means for communicating with the exchange, reception call conversion request generating means for generating the reception call conversion request when receiving the first call reception state report, and voice communication control means for controlling a voice communication that is performed between the exchange and the first computer.

14. The communication system according to claim 13, wherein the voice communication control means is activated when the first call reception state report has been input to the first computer.

15. The communication system according to claim 2, wherein when receiving the reception call conversion request, the exchange performs a process of establishing a circuit connection between the first computer and a terminal that has called the first telephone, whereby the first computer and the terminal are rendered in a communicable state.

16. The communication system according to claim 2, wherein the reception call conversion request accommodates an address of the first computer.

17. The communication system according to claim 1, wherein the first call reception state report accommodates a calling party number of a terminal that has called the first telephone.

18. The communication system according to claim 17, wherein the first computer displays the calling party number when receiving the first call reception state report.

19. The communication system according to claim 1, wherein the first call reception state report accommodates information indicating a communication protocol of the call directed to the first telephone.

20. The communication system according to claim 19, wherein the information indicating the communication protocol is information indicating whether the call directed to the first telephone is a voice call or a data communication call.

21. The communication system according to claim 20, wherein the first computer comprises voice communication control means for controlling a voice communication that is performed with the exchange, and data communication control means for controlling a data communication that is performed with the exchange, and wherein when receiving the first call reception state report accommodating the information indicating the communication protocol, the first computer communicates with the exchange by using the voice communication control means if the call directed to the first telephone is a voice call, and communicates with the exchange by using the data communication control means if the call directed to the first telephone is a data communication call.

22. The communication system according to claim 2, wherein the reception call conversion request accommodates information indicating a communication protocol to be used for a communication between the first computer and the exchange, and wherein the communication protocol can be different from a communication protocol that is used when the first computer sends the reception call conversion request to the exchange.

23. The communication system according to claim 2, wherein when receiving the reception call conversion request, the exchange causes both of the first telephone and the first computer to perform a call reception operation, and wherein the exchanges perform such a control as to cause the first telephone to process the call if the first telephone has responded to the call, and cause the first computer to process the call if the first computer has responded to the call.

24. The communication system according to claim 2, wherein the exchange comprises call identifier generating means for generating a call identifier for identifying the call directed to the first telephone when the call has occurred, and wherein the exchange causes a call reception notice that will be sent to the first telephone to accommodate the call identifier generated by the call identifier generating means, the first telephone causes the first call reception state report to accommodate the call identifier that is acquired from the call reception notice, the first computer causes the reception call conversion request to accommodate the call identifier that is acquired from the first call reception state report, and the exchange judges whether to convert the call directed to the first telephone to a call to the first computer by collating the call identifier generated by the call identifier generating means and the call identifier accommodated in the reception call conversion request.

25. The communication system according to claim 4, wherein the cellular telephone comprises a main body having a cellular telephone user interface for performing display, and a wrist band for mounting the main body on a wrist, the wrist band being mounted with cellular telephone faint radio wave communication means for communicating with the first computer by faint radio waves.

26. The communication system according to claim 25, wherein the cellular telephone faint radio wave communication means is located on the side of a palm of a hand when the wrist band of the cellular telephone is mounted around the wrist like a wrist watch.

27. The communication system according to claim 26, wherein the cellular telephone further comprises a communication connection section for enabling a communication between the cellular telephone faint radio wave communication means and the main body, the communication connection section having a shape that varies in accordance with a shape of the wrist band.

28. The communication system according to claim 26, wherein the cellular telephone further comprises voice input means for allowing input of a voice, voice output means for outputting a voice, and extendable connecting means for connecting the voice output means to the cellular telephone faint radio wave communication means.

29. The communication system according to claim 4, further comprising a fixed telephone having telephone faint radio wave communication means for performing a communication by faint radio waves, reception call conversion request generating means for generating and outputting a reception call conversion request for requesting conversion of the call directed to the cellular telephone to a call to the fixed telephone when receiving the first call reception report from the cellular telephone by faint radio waves, and off-hook notice generating means for generating and outputting an off-hook notice when an off-hook manipulation has been performed, and wherein the exchange performs a control of converting the call directed to the cellular telephone to a call to the fixed telephone and causing the fixed telephone to perform a call reception operation if the exchanges receives the reception call conversion request before the off-hook notice from the fixed telephone, and performs a control of making a circuit connection between the fixed telephone and a terminal that has called the cellular telephone and thereby renders the fixed telephone in a communicable state if the exchange receives the reception call conversion request after the off-hook notice from the fixed telephone.

30. The communication system according to claim 29, wherein the telephone faint radio wave communication means is provided in a handset of the fixed telephone.

31. The communication system according to claim 1, wherein the first computer sends out a call reception report request for requesting transmission of information relating to the call directed to the first telephone when receiving the first call reception state report from the first telephone, and the exchange sends the first computer information relating to the call directed to the first telephone when receiving the call reception report request from the first computer.

32. The communication system according to claim 31, wherein the information relating to the call is a calling party number of a terminal that has called the first telephone.

33. The communication system according to claim 8, wherein the fourth telephone comprises connection destination number, storing means for storing a connection destination number of a communication channel to be established with the exchange to transmit or receive, to or from the fourth computer, information to be input to or output from the office apparatus, wherein the fourth telephone dials the connection destination number stored in the connection destination number storing means to send the exchange information that has been sent from the office apparatus by faint radio waves.

34. The communication system according to claim 33, wherein an information storage location in the fourth computer is determined by a sub-address number of the connection destination number.

35. The communication system according to claim 33, wherein the fourth computer comprises connection destination registration request generating means for generating a connection destination registration request for requesting the exchange to register the connection destination number, and wherein the exchange comprises connection destination managing means for managing the connection destination registration request, and establishes, when the fourth telephone has dialed the connection destination number, a circuit connection to the fourth telephone and thereby sends the fourth computer information that is sent from the office apparatus via the fourth telephone.

36. The communication system according to claim 35, wherein the fourth computer sends the fourth telephone the connection destination number that is accommodated in the connection destination registration request generated by the connection destination registration request generating means by faint radio waves, and the connection destination number storing means of the fourth telephone stores the received connection destination number.

37. The communication system according to claim 8, wherein the fourth telephone and the exchange communicates with each other according to a packet communication scheme that does not require a circuit connection, and wherein the fourth telephone adds an address of the fourth computer to information that has been sent from the office apparatus and sends the address-added information to the exchange.

38. The communication system according to claim 6, wherein the third computer comprises user interface means through which the telephone number of the third telephone is input, and state report request generating means for generating the state report request accommodating the telephone number, and wherein a video communication between the first computer and the third computer is started when the telephone number is input to the third computer through the user interface means in a state that the first telephone and the third telephone are in a circuit-connected state.

39. The communication system according to claim 6, wherein the third telephone is a telephone that performs a voice communication by a radio communication, and video data communication is performed between the first computer and the third computer.

40. The communication system according to claim 5, wherein the circuit state reporting means comprises state report request processing means for sending circuit state reports to the first computer and the second computer if a circuit state report managed by state report managing means is one relating to circuit switching.

41. The communication system according to claim 40, wherein the first computer comprises state report processing means for requesting video communication means to execute a preprocess for a video communication started by the second computer, when receiving a circuit state report sent from the circuit state reporting means in response to a state report request sent from the second computer.

42. A communication system comprising:
an exchange;
a first telephone connected to the exchange via a telephone circuit network; and
a first computer connected to the exchange at least via the telephone circuit network, wherein:
the first telephone is correlated with the first computer;
the first telephone sends the first computer a first call reception state report indicating a call reception state of the first telephone;
the first computer, when receiving the first call reception state report, sends the exchange a telephone circuit control instruction for a call directed to the first telephone;
the exchange, when receiving the telephone circuit control instruction, performs a telephone circuit control for the call directed to the first according to the telephone circuit control instruction;
a second telephone that is different from the first telephone is correlated with a second computer that is different from the first computer; and
the exchange sends out a first circuit state report relating to circuit switching between the first telephone and the second telephone, the communication system further comprising:
circuit state reporting means for receiving the first circuit state report and for sending the first computer a second circuit state report formed by adding an address of the second computer to the first circuit state report; and
a data communication network for enabling a data communication at least between the first computer and the second computer, wherein
the first computer starts, when receiving the second circuit state report, a data communication with the second computer via the data communication network by using the address of the second computer that is accommodated in the second circuit state report.

43. A communication system comprising:
an exchange;
a first telephone connected to the exchange via a telephone circuit network;
a second telephone that is different than the first telephone
a fist computer connected to the exchange at least via the telephone circuit network, wherein:
the first telephone is correlated with the first computer;
the first telephone sends the first computer a first call reception sate report indicating a call reception state of the first telephone;
the first computer, when receiving the first call reception state report, sends the exchange a telephone circuit control instruction for a call directed to the first telephone;
the exchange, when receiving the telephone circuit control instruction, performs a telephone circuit control for the call directed to the first telephone according to the telephone circuit control instruction;
a second computer sends the exchanger a state report request that accommodates a telephone number of the second telephone; and
the exchange sends out, when receiving the state report request, a second circuit state report for the first telephone and the second telephone in a state that the first telephone and the second telephone are in a circuit-connected state, the communication system further comprising:

circuit state reporting means for receiving the second circuit state report, and for sending the second computer a third circuit state report formed by adding an address of the first computer to the second circuit state report; and a data communication network for enabling a data communication at least between the first and second computers wherein the second computer starts, when receiving the third circuit state report, a data communication with the first computer via the data communication network by using the address of the first computer that is accommodated in the third circuit state report.

44. A communication system comprising:

an exchange;

a first telephone connected to the exchange via a telephone circuit network; and a first computer connected to the exchange at least via the telephone circuit network, wherein:

the first telephone is correlated with the first computer;

the first telephone sends the first computer a first call reception state report indicating a call reception state of the first telephone;

the first computer, when receiving the first call reception state report, sends the exchange a telephone circuit control instruction for a call directed to the first telephone;

the exchange, when receiving the telephone circuit control instruction, converts the call directed towards the first telephone as a call directed to the first computer according to the telephone circuit control instruction; and an office apparatus having office apparatus faint radio wave communication means for performing a communication by faint radio waves, wherein:

there exist a second telephone that is different from the first telephone and a second computer that is different from the first computer;

the second telephone comprises telephone faint radio wave communication means for performing a communication by faint radio waves;

the office apparatus performs an information data communication with the second telephone via a route formed by the telephone faint radio wave communication means and the office apparatus faint radio wave communication means;

the second telephone performs an information data communication with the second computer, and an information data communication is performed between the office apparatus and the fourth computer.

* * * * *

UNITED STATES PATENT AND TRADEMARK OFFICE
CERTIFICATE OF CORRECTION

PATENT NO. : 6,421,536 B1
DATED : July 16, 2002
INVENTOR(S) : Hiroshi Uranaka et al.

It is certified that error appears in the above-identified patent and that said Letters Patent is hereby corrected as shown below:

Column 61,
Line 3, delete "star" and insert -- starts --;
Line 39, delete "bird" and insert -- third --;

Column 62,
Line 11, delete "fir" and insert -- for --; and

Column 66,
Line 45, delete "fist" and insert -- first --.

Signed and Sealed this

Fourth Day of March, 2003

JAMES E. ROGAN
*Director of the United States Patent and Trademark Office*